US010776006B2

(12) United States Patent
Marsden et al.

(10) Patent No.: US 10,776,006 B2
(45) Date of Patent: Sep. 15, 2020

(54) SYSTEMS AND METHODS FOR ACTIVATING AND USING A TRACKPAD AT AN ELECTRONIC DEVICE WITH A TOUCH-SENSITIVE DISPLAY AND NO FORCE SENSORS

(71) Applicant: Apple Inc., Cupertino, CA (US)

(72) Inventors: Randal J. Marsden, Saratoga, CA (US); Marcos Alonso Ruiz, San Francisco, CA (US); Morgan H. Winer, Sunnyvale, CA (US); Colin D. Munro, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/146,000

(22) Filed: Sep. 28, 2018

(65) Prior Publication Data
US 2019/0369870 A1 Dec. 5, 2019

Related U.S. Application Data

(60) Provisional application No. 62/679,964, filed on Jun. 3, 2018.

(51) Int. Cl.
*G06F 3/0489* (2013.01)
*G06F 3/01* (2006.01)
*G06F 3/0488* (2013.01)

(52) U.S. Cl.
CPC .......... *G06F 3/04892* (2013.01); *G06F 3/016* (2013.01); *G06F 3/04886* (2013.01)

(58) Field of Classification Search
CPC ... G06F 3/04892; G06F 3/016; G06F 3/04886
See application file for complete search history.

(56) References Cited

U.S. PATENT DOCUMENTS 10,175,774 B1 * 1/2019 Simjour ................ G06F 3/0213
2006/0125803 A1 6/2006 Westerman et al.
(Continued)

FOREIGN PATENT DOCUMENTS

WO WO 2014/062356 A1 4/2014

OTHER PUBLICATIONS

Cipriani, "Getting started with 3D Touch on the iPhone 6S, 6S Plus", published: Sep. 28, 2015, cnet.com, https://www.cnet.conn/how-to/getting-started-with-3d-touch-on-the-iphone-6s-6s-plus/ (Year: 2015).*

(Continued)

*Primary Examiner* — Seth A Silverman
(74) *Attorney, Agent, or Firm* — Kubota & Basol LLP

(57) ABSTRACT

Disclosed herein are single-finger gestures for activating a trackpad mode on a touch-sensitive device with no force sensors. An example method includes: displaying a virtual keyboard on a touch-sensitive display with a spacebar key and other keys. Detecting a first extended contact over the virtual keyboard and, in accordance with a determination that the first extended contact is over any of the respective displayed representations of the other keys, interpreting the first extended contact as a keyboard input and activating a corresponding extended keyboard function. The method also includes: detecting a second extended contact over the virtual keyboard. The method further includes: in accordance with a determination that the second extended contact is over a respective displayed representation of the spacebar key, interpreting the second extended contact as a mode-switching input that causes the electronic device to operate at least a portion of the touch-sensitive display as a trackpad.

29 Claims, 72 Drawing Sheets

(56) References Cited

U.S. PATENT DOCUMENTS

| | | | |
|---|---|---|---|
| 2010/0085313 A1* | 4/2010 | Rider | G06F 3/04886 345/173 |
| 2011/0078624 A1 | 3/2011 | Missig et al. | |
| 2011/0179386 A1 | 7/2011 | Shaffer et al. | |
| 2012/0242581 A1 | 9/2012 | Laubach | |
| 2013/0024820 A1* | 1/2013 | Kirkpatrick | G06F 3/04883 715/863 |
| 2013/0106700 A1* | 5/2013 | Sugiura | G06F 3/04886 345/168 |
| 2014/0306899 A1* | 10/2014 | Hicks | G06F 3/04883 345/173 |
| 2014/0361982 A1 | 12/2014 | Shaffer et al. | |
| 2017/0235483 A1 | 8/2017 | Alonso Ruiz et al. | |

OTHER PUBLICATIONS

Cunningham, "The power of two: use your phone as a keyboard and mouse", published: Jul. 16, 2012, ArsTechnica.com, https://arstechnica.com/information-technology/2012/07/the-power-of-two-use-your-phone-as-a-keyboard-and-mouse/ (Year: 2012).*

Karcz, "This One Unexpected Feature In Google Gboard Makes Me Love it Even More", https://www.forbes.com/sites/anthonykarcz/2017/gboard-tips/#5ee247dfa7e9, Apr. 7, 2017, 8 pages.

VTGeek, "Holding Down Space Bar!"; MacRumors, https://forums.macrumors.com/threads/holding-down-space-bar.2102039, Jan. 20, 2018, 8 pages.

Office Action, dated Nov. 16, 2018, received in Danish Patent Application No. 201870337, which corresponds with U.S. Appl. No. 16/146,000, 5 pages.

Bradford, "15 Tips for Gboard, Google's Supersmart Android Keyboard", https://www.cnet.com/how-to/heres-how-to-use-gboards-features, Jun. 12, 2017, 6 pages.

Epson, "20 Tips to Help You Master Gboard for Android", https://android.gadgethacks.com/how-to/20-tips-help-you-master-gboard-for-android-0176623, Mar. 28, 2017, 22 pages.

Ravencraft, "Swipe Across the Space Bar in Google Keyboard to Move the Cursor", https://lifehacker.com/swipe-across-the-space-bar-in-google-keyboard-to-move-t-1784220445, Jul. 24, 2016, 4 pages.

Invitation to Pay Additional Fees, dated Aug. 28, 2019, received in International Patent Application No. PCT/US2019/034827, which corresponds with U.S. Appl. No. 16/146,000, 18 pages.

International Search Report and Written Opinion, dated Oct. 21, 2019, received in International Patent Application No. PCT/US2019/034827, which corresponds with U.S. Appl. No. 16/146,000, 20 pages.

Certificate of Grant, dated Jun. 26, 2019, received in Australian Patent Application No. 2019100594, which corresponds with U.S. Appl. No. 16/146,000, 4 pages.

Office Action, dated May 29, 2019, received in Danish Patent Application No. 201870337, which corresponds with U.S. Appl. No. 16/146,000, 3 pages.

* cited by examiner

600

```
┌─────────────────────────────────────────────────────────────────┐
│ While operating as the trackpad:                                │  614
│   Detect a lift-off of the second extended contact from the     │
│   touch-sensitive display; and                                  │
│                                                                 │
│   In response to detecting the lift-off of the second extended  │
│   contact, determine whether any movement of the second         │
│   extended contact across the touch-sensitive display prior to  │
│   the lift-off satisfies a movement parameter                   │
│                                                                 │  616
│   ┌─────────────────────────────────────────────────────────┐   │
│   │ Determine that movement of the second extended contact  │   │
│   │ across the touch-sensitive display prior to the lift-off│   │
│   │ does not satisfy the movement parameter and, in         │   │
│   │ response, cease to operate the portion of the           │   │
│   │ touch-sensitive display as the trackpad                 │   │
│   │                                                         │   │  618
│   │   ┌─────────────────────────────────────────────────┐   │   │
│   │   │ Determining that movement of the second extended│   │   │
│   │   │ contact across the touch-sensitive display prior│   │   │
│   │   │ to the lift-off does not satisfy the movement   │   │   │
│   │   │ parameter includes determining that the second  │   │   │
│   │   │ extended contact moved less than a predetermined│   │   │
│   │   │ distance across the touch-sensitive display     │   │   │
│   │   │ prior to the lift-off                           │   │   │
│   │   └─────────────────────────────────────────────────┘   │   │
│   │                                                         │   │  620
│   │   ┌─────────────────────────────────────────────────┐   │   │
│   │   │ Determining that movement of the second extended│   │   │
│   │   │ contact across the touch-sensitive display prior│   │   │
│   │   │ to the lift-off does not satisfy the movement   │   │   │
│   │   │ parameter includes determining that the second  │   │   │
│   │   │ extended contact moved at less than a           │   │   │
│   │   │ predetermined speed across the touch-sensitive  │   │   │
│   │   │ display prior to the lift-off                   │   │   │
│   │   └─────────────────────────────────────────────────┘   │   │
│   └─────────────────────────────────────────────────────────┘   │
│                                                                 │  622
│   ┌─────────────────────────────────────────────────────────┐   │
│   │ Determine that movement of the second extended contact  │   │
│   │ across the touch-sensitive display prior to the lift-off│   │
│   │ satisfies the movement parameter and, in response,      │   │
│   │ continue to operate the portion of the touch-sensitive  │   │
│   │ display as the trackpad for at least a predetermined    │   │
│   │ amount of time                                          │   │
│   └─────────────────────────────────────────────────────────┘   │
└─────────────────────────────────────────────────────────────────┘
```

┌─────────────────────────────────────────────────────────────────────┐
│ Continue to operate the portion of the touch-sensitive display as the │ ─ 624
│ trackpad for at least a predetermined amount of time after detecting a lift-off │
│ of the second extended contact from the touch-sensitive display      │
│                                                                      │
│  ┌───────────────────────────────────────────────────────────────┐   │ ─ 626
│  │ The trackpad is invoked after the second extended contact has │   │
│  │ remained in contact with the touch-sensitive display for at least a │ │
│  │ second predetermined amount of time; and the second predetermined │ │
│  │ amount of time is less than the predetermined amount of time  │   │
│  └───────────────────────────────────────────────────────────────┘   │
└─────────────────────────────────────────────────────────────────────┘

┌─────────────────────────────────────────────────────────────────────┐ ─ 628
│ In accordance with a determination that no input is detected over the │
│ portion of the touch-sensitive display for the predetermined amount of time │
│ after detecting the lift-off of the second extended contact, cease to operate │
│ the portion of the touch-sensitive display as the trackpad            │
└─────────────────────────────────────────────────────────────────────┘

┌─────────────────────────────────────────────────────────────────────┐ ─ 630
│ Detect a double-tap input on the touch-sensitive display while operating the │
│ portion of the touch-sensitive display as the trackpad, the double-tap input │
│ being detected within a certain amount of time after detecting the lift-off of │
│ the second extended contact; and, in response to detecting the double-tap │
│ input, select an object that is displayed on the touch-sensitive display │
└─────────────────────────────────────────────────────────────────────┘

┌─────────────────────────────────────────────────────────────────────┐ ─ 632
│ Detect a drag gesture after the double-tap input and, in response, select │
│ more of the object as the drag gesture moves                          │
└─────────────────────────────────────────────────────────────────────┘

┌─────────────────────────────────────────────────────────────────┐
│  Detect a third extended contact over a part of the virtual keyboard  │ ─── 634
│  below the displayed representation of the spacebar key, where the part of  │
│  the virtual keyboard does not include any of the other keys  │
└─────────────────────────────────────────────────────────────────┘

┌─────────────────────────────────────────────────────────────────┐
│  In accordance with a determination that the third extended contact is  │ ─── 636
│  over the part of the virtual keyboard, interpret the third extended contact as  │
│  a mode-switching input that causes the electronic device to operate at least  │
│  a portion of the touch-sensitive display as a trackpad  │
└─────────────────────────────────────────────────────────────────┘

638 — An extended contact over any of the respective displayed representations of the other keys causes activation of a corresponding extended keyboard function and does not cause the electronic device to operate any portion of the touch-sensitive display as the trackpad 640 — At least some of the other keys of the virtual keyboard is respectively associated with a corresponding keyboard function that is activated in response to a momentary contact over the key and with a corresponding extended keyboard function that is activated in response to an extended contact over the key 642 — The displayed virtual keyboard does not include a function (fn) key

The virtual keyboard is displayed in an area of the touch-sensitive display and each of the displayed representations of the other keys includes a respective displayed symbol, and wherein operating at least the portion of the touch-sensitive display as the trackpad includes (i) operating the area as part of the trackpad, and (ii) ceasing to display at least some of the displayed symbols of the virtual keyboard — 644

While operating as the trackpad, any input at the touch-sensitive display over at least the portion controls movement of a cursor that is displayed in another portion of the touch-sensitive display — 646

Provide haptic feedback in conjunction with invoking operation of the portion of the touch-sensitive display as the trackpad — 648

Figure 6F

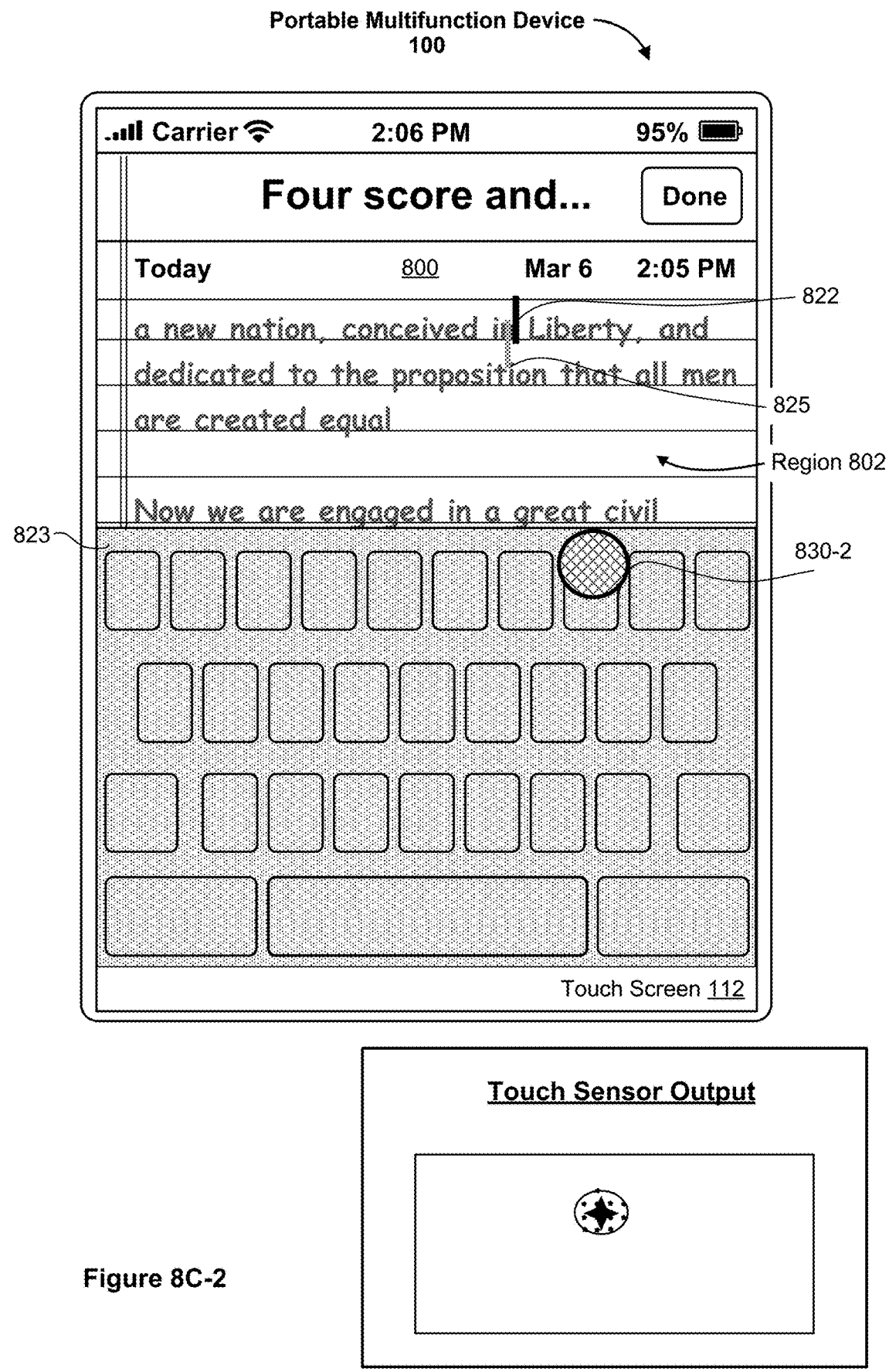

900

```
┌──────────────────────────────────────────────────────────────────┐
│ Text is displayed on the touch-sensitive display in an area of the touch-   │⎤ 912
│ sensitive display that is adjacent to the displayed virtual keyboard, a cursor │
│ is displayed at a position within the text.                                  │
│                                                                              │
│ While continuing to operate the portion of the touch-sensitive display as the │
│ trackpad:                                                                    │
│     Detect an additional change in the output from at least one of the       │
│ plurality of touch sensors, the change in the output indicating that the area │
│ of the contact has reduced and the centroid has moved; and                   │
│     In response to detecting the additional change in the output,            │
│ maintaining display of the cursor at the position within the text            │
│                                                                              │
│   ┌────────────────────────────────────────────────────────────┐ ⎤ 914       │
│   │ After detecting the additional change and while continuing to operate │  │
│   │ the portion of the touch-sensitive display as the trackpad, movement  │  │
│   │ of the contact across the touch-sensitive display causes the cursor to│  │
│   │ move to different positions within the text                           │  │
│   └────────────────────────────────────────────────────────────┘          │
└──────────────────────────────────────────────────────────────────┘

┌──────────────────────────────────────────────────────────────────┐ ⎤ 916
│ While continuing to operate the portion of the touch-sensitive display as the │
│ trackpad:                                                                    │
│     Detect one more change in the output from at least one of the            │
│ plurality of touch sensors, the one more change in the output indicating that │
│ the area of the contact has expanded and the centroid has moved; and         │
│     In response to detecting the one more change, select at least a part     │
│ of the text.                                                                 │
└──────────────────────────────────────────────────────────────────┘

┌──────────────────────────────────────────────────────────────────┐ ⎤ 918
│ Detect a lift-off of the contact from the touch-sensitive display and, in    │
│ response, cease to operate the portion of the touch-sensitive display as the │
│ trackpad                                                                     │
└──────────────────────────────────────────────────────────────────┘
```

920 — The output and the change in the output are detected based at least in part on capacitance signals registered by at least one of the plurality of touch sensors 922 — The change in the output is detected based on one or more of: (i) a velocity of movement of the centroid; (ii) change in size of the area; (iii) saturation level of at least one of the plurality of touch sensors; and (iv) a calculated angle of a user's finger making the contact relative to the touch-sensitive display 924 — The change in the output is further detected based on a velocity of movement of the centroid 926 — The change in the output is further detected based on a change in size of the area 928 — The change in the output is further detected based on a saturation level of at least one of the plurality of touch sensors 930 — The change in the output is further detected based on a calculated angle of a user's finger making the contact relative to the touch-sensitive display

Figure 9C

SYSTEMS AND METHODS FOR ACTIVATING AND USING A TRACKPAD AT AN ELECTRONIC DEVICE WITH A TOUCH-SENSITIVE DISPLAY AND NO FORCE SENSORS

RELATED APPLICATIONS

This application claims priority to U.S. Provisional Application Ser. No. 62/679,964, filed Jun. 3, 2018, which is hereby incorporated by reference herein in its entirety.

TECHNICAL FIELD

The embodiments disclosed herein generally relate to electronic devices with touch-sensitive displays and no force sensors and, more specifically, to systems and methods for activating and using a trackpad at an electronic device with a touch-sensitive display and no force sensors.

BACKGROUND

The use of touch-sensitive surfaces as input devices for computers and other electronic computing devices has increased significantly in recent years. Example touch-sensitive surfaces include touch pads and touch screen displays. Such surfaces are widely used to review and edit electronic documents by manipulating a cursor within the electronic document presented on a display. These electronic documents are viewed or edited within applications having viewing and editing capabilities (e.g., drawing applications, presentation applications (e.g., Apple's KEYNOTE, or Microsoft's POWERPOINT), word processing applications (e.g., Apple's PAGES or Microsoft's WORD), website creation applications, spreadsheet applications (e.g., Apple's NUMBERS or Microsoft's EXCEL)).

Some conventional cursor manipulation methods on touch-sensitive devices require the use of force sensors and/or require that a user provide a multi-finger gesture (e.g., a gesture that requires a user to use two of their fingers, such as a two-finger tap). For touch-sensitive devices that do not include force sensors, pressure/force-sensitive gestures are not available. Additionally, such devices can also have a small amount of display screen area (e.g., the displays on these devices are generally small) and, thus, use of multi-finger gestures are inefficient and obscure too much of the already-small amount of display screen area. Some other conventional cursor manipulation methods on touch-sensitive devices require users to precisely place their finger at a desired location within text and, because many of these devices have a small amount of display screen area, these methods often result in inaccurate placement of the cursor.

As such, it is desirable to provide single-finger gestures for activating a trackpad mode (and accurately placing a cursor) for use on an electronic device with a touch-sensitive display and no force sensors.

SUMMARY

Accordingly, there is a need for single-finger gestures for activating a trackpad mode for use on an electronic device with a touch-sensitive display and no force sensors. The single-finger gestures discussed herein can also be implemented on devices that do include force sensors, but detection of these single-finger gestures does not require use any of the force signals that might be generated by such force sensors (stated another way, even if the device did have force sensors, such force sensors are not required to detect the single-finger trackpad-activation gestures discussed herein, e.g., the tip-to-print roll gesture and the extended contact over a predetermined mode-switching area of a virtual keyboard (examples of the mode-switching area include a spacebar key or an area of the virtual keyboard that is below the spacebar key)).

The embodiments described herein address the above shortcomings by providing devices and methods that allow users to provide single-finger gestures to activate a trackpad mode for use on an electronic device with a touch-sensitive display and no force sensors. On devices that do not include force sensors, devising a single-finger gesture that allows for switching to a trackpad mode, while also avoiding unnecessary confusion with other gestures is a very difficult task.

One example single-finger gesture described below is an extended contact over a spacebar key on a virtual keyboard (or over another designated area of the virtual keyboard, such as a bottom portion of the virtual keyboard that does not include keys). Allowing a user to provide an extended contact over a spacebar key (or over another designated area of the virtual keyboard, such as a bottom portion of the virtual keyboard that does not include keys) to then operate the electronic device as a trackpad affords the user with a convenient way to quickly switch from a keyboard-input mode and to a trackpad mode using only a single finger. Providing this interaction at electronic devices that do not include force sensors enhances operability of these devices and makes the human-machine interfaces on these devices more efficient (e.g., by allowing users to easily switch to a trackpad mode using a simple gesture without having to waste time trying to place a cursor without using a trackpad mode or having to waste time using a complicated sequence of user inputs or menu options to activate the trackpad mode).

Another example single-finger gesture described below is a tip-to-print (also referred to as a finger roll) gesture over a virtual keyboard. Allowing a user to roll a single finger over the virtual keyboard to then operate the electronic device as a trackpad affords the user with a convenient way to quickly switch from a keyboard-input mode and to a trackpad mode using only a single finger. Providing this interaction at electronic devices that do not include force sensors enhances operability of these devices and makes the human-machine interfaces on these devices more efficient (e.g., by allowing users to easily switch to a trackpad mode using a simple gesture without have to waste time trying to place a cursor without using a trackpad mode or having to waste time using a complicated sequence of user inputs or menu options to activate the trackpad mode).

By providing more efficient human-machine interfaces, the devices and methods described herein also reduce power usage (e.g., because users provide less inputs overall and spend less time performing manipulating cursor locations) and, thereby, improve battery life of electronic devices, and also use finite computing resources in a more efficient manner.

(A1) In accordance with some embodiments, a method is performed at an electronic device that includes a touch-sensitive display coupled with a plurality of touch sensors, wherein the touch-sensitive display is not coupled with any force sensors. The method includes: displaying a virtual keyboard on the touch-sensitive display, the virtual keyboard including displayed representations of a spacebar key and other keys. The method further includes: detecting a first extended contact over the virtual keyboard; and in accordance with a determination that the first extended contact is over any of the respective displayed representations of the other keys, interpreting the extended contact as a keyboard input and activating a corresponding extended keyboard function. The method also includes: detecting a second extended contact over the virtual keyboard; and in accordance with a determination that the second extended contact is over a respective displayed representation of the spacebar key, interpreting the second extended contact as a mode-switching input that causes the electronic device to operate at least a portion of the touch-sensitive display as a trackpad.

On devices that do not include force sensors, devising a single-finger gesture that allows for switching to a trackpad mode, while also avoiding unnecessary confusion with other gestures is a very difficult task. Allowing a user to provide an extended contact over a spacebar key (or over another designated area of the virtual keyboard, such as a bottom portion of the virtual keyboard that does not include keys) to then operate the electronic device as a trackpad affords the user with a convenient way to quickly switch from a keyboard-input mode and to a trackpad mode. Providing this interaction at electronic devices that do not include force sensors enhances operability of these devices and makes the human-machine interfaces on these devices more efficient (e.g., by allowing users to easily switch to a trackpad mode using a simple gesture without have to waste time trying to place a cursor without using a trackpad mode or having to waste time using a complicated sequence of user inputs or menu options to activate the trackpad mode).

(A2) In some embodiments of the method of A1, the method further includes: while operating as the trackpad: detecting a lift-off of the second extended contact from the touch-sensitive display; and in response to detecting the lift-off of the second extended contact, determining whether any movement of the second extended contact across the touch-sensitive display prior to the lift-off satisfies a movement parameter.

Use of the movement parameter can allow the electronic device to accurately determine when to continue operating in the trackpad mode or when to exit the trackpad mode. By making the determination as to whether any movement of the second extended contact across the touch-sensitive display satisfies the movement parameter in response to detecting lift-off, the device preserves computing resources and only uses them to make this determination when the determination is immediately needed. In this way, operability of these devices is enhanced and the human-machine interfaces on these devices operates more efficiently (e.g., by avoiding wasting resources by making determinations before they are needed).

(A3) In some embodiments of the method of A2, the method also includes: determining that movement of the second extended contact across the touch-sensitive display prior to the lift-off does not satisfy the movement parameter and, in response, ceasing to operate the portion of the touch-sensitive display as the trackpad.

Ceasing to operate the portion of the touch-sensitive display as the trackpad once it is determined that movement prior to the lift-off does not satisfy the movement parameter ensures that the trackpad mode is invoked only as long as the user needs it. By ensuring that the trackpad mode is invoked only as long as the user needs it, operability of the device is enhanced and the human-machine interfaces on this device operates more efficiently (e.g., by ensuring that the user is presented with the interface controls that they need and avoiding having users waste time trying to find the interface controls that they need).

(A4) In some embodiments of the method of A3, the determining that movement of the second extended contact across the touch-sensitive display prior to the lift-off does not satisfy the movement parameter includes determining that the second extended contact moved less than a predetermined distance across the touch-sensitive display prior to the lift-off.

Ceasing to operate the portion of the touch-sensitive display as the trackpad once it is determined that the second extended contact moved less than a predetermined distance across the touch-sensitive display prior to the lift-off ensures that the trackpad mode is invoked only as long as the user needs it. If the user moved the second extended contact a very short distance (or no distance at all), then this is an indication that the user has placed the cursor in a desired position and no longer needs to use the trackpad mode (or, when the contact moves no distance at all, this is an indication that the user accidentally invoked the trackpad mode). By ensuring that the trackpad mode is invoked only as long as the user needs it, operability of the device is enhanced and the human-machine interfaces on this device operates more efficiently (e.g., by ensuring that the user is presented with the interface controls that they need and avoiding having users waste time trying to find the interface controls that they need).

(A5) In some embodiments of the method of A3, the determining that movement of the second extended contact across the touch-sensitive display prior to the lift-off does not satisfy the movement parameter includes determining that the second extended contact moved at less than a predetermined speed across the touch-sensitive display prior to the lift-off.

Ceasing to operate the portion of the touch-sensitive display as the trackpad once it is determined that the second extended contact moved at less than a predetermined speed across the touch-sensitive display prior to the lift-off ensures that the trackpad mode is invoked only as long as the user needs it. If the user moved the second extended contact a slow speed, then this is an indication that the user has placed the cursor in a desired position and no longer needs to use the trackpad mode. By ensuring that the trackpad mode is invoked only as long as the user needs it, operability of the device is enhanced and the human-machine interfaces on this device operates more efficiently (e.g., by ensuring that the user is presented with the interface controls that they need and avoiding having users waste time trying to find the interface controls that they need).

(A6) In some embodiments of the method of A2, the method includes: determining that movement of the second extended contact across the touch-sensitive display prior to the lift-off satisfies the movement parameter and, in response, continuing to operate the portion of the touch-sensitive display as the trackpad for at least a predetermined amount of time.

Continuing to operate the portion of the touch-sensitive display as the trackpad once it is determined that the second extended contact satisfies the movement parameter ensures that the trackpad mode is invoked as long as the user needs it. If the user moved the second extended contact in a downward direction or at a quicker speed, then this is an indication that the user's lift-off of the second extended contact was done to allow the user to reposition their finger in order to continue moving the cursor (e.g., if they moved in a downward direction, they could run out of space and will need to lift-off to reposition their finger for continued movement of the cursor). By ensuring that the trackpad mode is invoked as long as the user needs it and without interrupting the user's movement of the cursor, operability of the device is enhanced and the human-machine interfaces on this device operates more efficiently (e.g., by ensuring that the user is presented with the interface controls that they need and avoiding having users waste time trying to find the interface controls that they need).

(A7) In some embodiments of the method of any one of A1-A6, the method includes: continuing to operate the portion of the touch-sensitive display as the trackpad for at least a predetermined amount of time (e.g., 0.5 seconds) after detecting a lift-off of the second extended contact from the touch-sensitive display.

(A8) In some embodiments of the method of A7, the trackpad is invoked after the second extended contact has remained in contact with the touch-sensitive display for at least a second predetermined amount of time; and the second predetermined amount of time is less than the predetermined amount of time.

(A9) In some embodiments of the method of any one of A7-A8, the method includes: in accordance with a determination that no input is detected over the portion of the touch-sensitive display for the predetermined amount of time after detecting the lift-off of the second extended contact, ceasing to operate the portion of the touch-sensitive display as the trackpad.

(A10) In some embodiments of the method of any of A6 or A7, the method includes: detecting a double-tap input on the touch-sensitive display while operating the portion of the touch-sensitive display as the trackpad, the double-tap input being detected within a certain amount of time after detecting the lift-off of the second extended contact; and, in response to detecting the double-tap input, selecting an object that is displayed on the touch-sensitive display.

Allowing users to perform a double-tap input to select an object ensures that the users are able to select objects (e.g., text, images, multiple words, or a combination of both) while in the trackpad mode. By ensuring that the trackpad mode allows for selection of objects, operability of the device is enhanced and sustained interactions with the device are then created.

(A11) In some embodiments of the method of A10, the method includes: detecting a drag gesture after the double-tap input and, in response, selecting more of the object as the drag gesture moves.

Allowing users to perform a drag gesture after a double-tap input to select more (or less) of an object ensures that the users are able to select only those portions of the object that they would like to select (e.g., portions of text, images, or a combination of both) while in the trackpad mode. By ensuring that the trackpad mode allows for fine-grained selection of objects, operability of the device is enhanced and sustained interactions with the device are then created.

(A12) In some embodiments of the method of any of A1-A11, an extended contact (or a momentary contact) over any of the respective displayed representations of the other keys causes activation of a corresponding extended keyboard function and does not cause the electronic device to operate any portion of the touch-sensitive display as the trackpad.

(A13) In some embodiments of the method of A12, the virtual keyboard is displayed in an area of the touch-sensitive display and each of the displayed representations of the other keys includes a respective displayed symbol, and operating at least the portion of the touch-sensitive display as the trackpad, includes (i) operating the area as part of the trackpad and (ii) ceasing to display at least some of the displayed symbols of the virtual keyboard.

Operating a same area of the display that was used for the virtual keyboard as the trackpad allows users to immediately begin using the trackpad without having to relocate/reposition their finger after invoking the trackpad, instead they simply begin moving their finger as desired to move a cursor and/or to select objects (e.g., using the double-tap and double-tap-and-drag gestures discussed above). Additionally, ceasing to display at least some of the displayed symbols of the virtual keyboard provides users with a clear visual indication that trackpad mode has been invoked. By providing these features, operability of the device is enhanced and sustained interactions with the device are then created (e.g., users do not need to waste time with finger repositioning and will not be confused as to when the trackpad has been invoked, thereby allowing for the sustained interactions with the device).

(A14) In some embodiments of the method of any of A1-A13, the method includes: detecting a third extended contact over a part of the virtual keyboard below the displayed representation of the spacebar key, where the part of the virtual keyboard does not include any of the other keys; and in accordance with a determination that the third extended contact is over the part of the virtual keyboard, interpreting the third extended contact as a mode-switching input that causes the electronic device to operate at least a portion of the touch-sensitive display as a trackpad.

(A15) In some embodiments of the method of any of A1-A14, while operating as the trackpad, any input at the touch-sensitive display over at least the portion controls movement of a cursor that is displayed in another portion of the touch-sensitive display.

(A16) In some embodiments of the method of any of A1-A15, at least some of the other keys of the virtual keyboard is respectively associated with a corresponding keyboard function that is activated in response to a momentary contact over the key and with a corresponding extended keyboard function that is activated in response to an extended contact over the key.

(A17) In some embodiments of the method of any of A1-A16, the first and second extended contacts last for at least an extended-contact-detection-time threshold.

(A18) In some embodiments of the method of any of A1-A17, haptic feedback is provided in conjunction with invoking operation of the portion of the touch-sensitive display as the trackpad.

(A19) In some embodiments of the method of any of A1-A18, the displayed virtual keyboard does not include a function (fn) key.

(A20) A non-transitory computer-readable storage medium storing executable instructions that, when executed by one or more processors of an electronic device with a touch-sensitive display, wherein the electronic device is not coupled with any force sensors, cause the electronic device to perform the method of any one of claims A1-A19.

(A21) An electronic device, that includes one or more processors; a touch-sensitive display; and memory storing one or more programs that are configured for execution by the one or more processors, the one or more programs include instructions for performing the method of any one of A1-A19, and the electronic device is not coupled with any force sensors.

(A22) An electronic device with a touch-sensitive secondary display, wherein the electronic device is not coupled with any force sensors and the electronic device comprises: means for performing the method of any one of A1-A19.

(A23) An information processing apparatus for use in an electronic device that includes a touch-sensitive secondary display, wherein the electronic device is not coupled with any force sensors, the information processing apparatus comprising: means for performing the method of any one of A1-A19.

(A24) A graphical user interface for an electronic device with one or more processors, memory, and a touch-sensitive secondary display, wherein the electronic device is not coupled with any force sensors, and the one or more processors execute one or more programs stored in the memory, the graphical user interface comprising user interfaces displayed in accordance with any one of the methods of A1-A19.

(A25) An electronic device that includes a touch-sensitive display coupled with a plurality of touch sensors, wherein the touch-sensitive display is not coupled with any force sensors, the electronic device also including memory and one or more processors coupled with the plurality of touch sensors and the touch-sensitive display, the memory including executable instructions that, when executed by the one or more processors, cause the electronic device to: display a virtual keyboard on the touch-sensitive display, the virtual keyboard including displayed representations of a spacebar key and other keys; detect an extended contact at the touch-sensitive display; in accordance with a determination that the extended contact is over any of the respective displayed representations of the other keys, interpret the extended contact as a keyboard input and activate a corresponding keyboard function; and in accordance with a determination that the extended contact is over a respective displayed representation of the spacebar key, interpret the extended contact as a mode-switching input that causes the electronic device to operate at least a portion of the touch-sensitive display as a trackpad.

(A26) In some embodiments of the electronic device of A25, the executable instructions, when executed by the one or more processors, also cause the electronic device to perform the method of any one of A1-A19.

In another aspect, methods, devices, and other components for implementing the single-finger roll/tip-to-print gesture are also provided.

(B1) In accordance with some embodiments, a method is performed at an electronic device that includes a touch-sensitive display coupled with a plurality of touch sensors, and the touch-sensitive display is not coupled with any force sensors. The method includes: displaying a virtual keyboard on the touch-sensitive display; detecting an output from at least one of the plurality of touch sensors, the output indicating a contact with the touch-sensitive display over at least part of the virtual keyboard, where the contact comprises an area of the touch-sensitive display that has a centroid; detecting a change in the output from at least one of the plurality of touch sensors, the change in the output indicating that the area of the contact has expanded and the centroid has moved; and in accordance with detecting the change, operating at least a portion of the touch-sensitive display as a trackpad and ceasing to operate the virtual keyboard.

Allowing a user to roll a single finger over the virtual keyboard to then operate the electronic device as a trackpad affords the user with a convenient way to quickly switch from a keyboard-input mode and to a trackpad mode using only a single finger; and detecting that roll by monitoring both expansion of the area and movement of the centroid ensures that the gesture is accurately detected and is not confused with other types of gestures. Providing this interaction at electronic devices that do not include force sensors enhances operability of these devices and makes the human-machine interfaces on these devices more efficient (e.g., by allowing users to easily switch to a trackpad mode using a simple gesture without have to waste time trying to place a cursor without using a trackpad mode or having to waste time using a complicated sequence of user inputs or menu options to activate the trackpad mode).

(B2) In some embodiments of the method of B1, the output and the change in the output are detected based at least in part on capacitance signals registered by at least one of the plurality of touch sensors.

Detecting the output and the change in the output based at least in part on capacitance signals helps to ensure that the gesture is accurately detected and is not confused with other types of gestures, and enables devices that do not include force sensors to accurately detected new gesture types, such as the roll/tip-to-print gesture discussed herein. Providing this accurate detection at electronic devices that do not include force sensors enhances operability of these devices and makes the human-machine interfaces on these devices more efficient (e.g., by allowing users to easily switch to a trackpad mode using a simple gesture without have to waste time trying to place a cursor without using a trackpad mode or having to waste time using a complicated sequence of user inputs or menu options to activate the trackpad mode).

(B3) In some embodiments of the method of any of B1-B2, the change in the output is detected based on one or more of: (i) a velocity of movement of the centroid; (ii) change in size of the area; (iii) a saturation level of at least one of the plurality of touch sensors; and (iv) a calculated angle of a user's finger making the contact relative to the touch-sensitive display.

(B4) In some embodiments of the method of any of B1-B2, the change in the output is further detected based on a velocity of movement of the centroid.

(B5) In some embodiments of the method of any of B1-B2 or B4, the change in the output is further detected based on a change in size of the area.

(B6) In some embodiments of the method of any of B1-B2 or B4-B5, the change in the output is further detected based on a saturation level of at least one of the plurality of touch sensors.

(B7) In some embodiments of the method of any of B1-B2 or B4-B6, the change in the output is further detected based on a calculated angle of a user's finger making the contact relative to the touch-sensitive display.

(B8) In some embodiments of the method of any of B1-B7, the method includes providing, by the electronic device, haptic feedback in conjunction with invoking operation of the portion of the touch-sensitive display as the trackpad.

Monitoring the other pieces of data discussed above (in B3-B8) to detect the output and the change in the output helps to ensure that the gesture is accurately detected and is not confused with other types of gestures, and enables devices that do not include force sensors to accurately detected new gesture types, such as the roll/tip-to-print gesture discussed herein. Adding on the monitoring of these other pieces of data helps to improve accuracy of detecting this new gesture at electronic devices that do not include force sensors, thereby enhancing operability of these devices and making the human-machine interfaces on these devices more efficient (e.g., by ensuring that the gesture is accurately detected, users will not have to waste time reversing activation of undesired functions).

(B9) In some embodiments of the method of any of B1-B8, text is displayed on the touch-sensitive display in an area of the touch-sensitive display that is adjacent to the displayed virtual keyboard, a cursor is displayed at a position within the text, and the method further includes: while continuing to operate the portion of the touch-sensitive display as the trackpad: detecting an additional change in the output from at least one of the plurality of touch sensors, the change in the output indicating that the area of the contact has reduced and the centroid has moved; and in response to detecting the additional change in the output, maintaining display of the cursor at the position within the text.

Ensuring that the cursor does not move (e.g., maintains its position) as a user un-rolls their finger over the touch-sensitive display, helps to ensure that the cursor is accurately placed based on the user's intent. When the user is just un-rolling their finger, they are doing so before they have started moving the cursor. By keeping the cursor in place during the un-roll, therefore, operability of the device is enhanced and the human-machine interface is made to operate more efficiently (e.g., by ensuring that the user need not waste time reversing unintended cursor movements).

(B10) In some embodiments of the method of B9, after detecting the additional change and while continuing to operate the portion of the touch-sensitive display as the trackpad, movement of the contact across the touch-sensitive display causes the cursor to move to different positions within the text.

(B11) In some embodiments of the method of B9, the method includes: while continuing to operate the portion of the touch-sensitive display as the trackpad: detecting one more change in the output from at least one of the plurality of touch sensors, the one more change indicating that the area of the contact has expanded and the centroid has moved; and in response to detecting the one more change, selecting at least a part of the text.

(B12) In some embodiments of the method of B11, the method includes: detecting a lift-off of the contact from the touch-sensitive display and, in response, ceasing to operate the portion of the touch-sensitive display as the trackpad.

(B13) A non-transitory computer-readable storage medium storing executable instructions that, when executed by one or more processors of an electronic device with a touch-sensitive display, wherein the electronic device is not coupled with any force sensors, cause the electronic device to perform the method of any one of claims B1-B12.

(B14) An electronic device, that includes one or more processors; a touch-sensitive display; and memory storing one or more programs that are configured for execution by the one or more processors, the one or more programs include instructions for performing the method of any one of B1-B12, and the electronic device is not coupled with any force sensors.

(B15) An electronic device with a touch-sensitive secondary display, wherein the electronic device is not coupled with any force sensors and the electronic device comprises: means for performing the method of any one of B1-B12.

(B16) An information processing apparatus for use in an electronic device that includes a touch-sensitive secondary display, wherein the electronic device is not coupled with any force sensors, the information processing apparatus comprising: means for performing the method of any one of B1-B12.

(B17) A graphical user interface for an electronic device with one or more processors, memory, and a touch-sensitive secondary display, wherein the electronic device is not coupled with any force sensors, and the one or more processors execute one or more programs stored in the memory, the graphical user interface comprising user interfaces displayed in accordance with any one of the methods of B1-B12.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6F are flowcharts illustrating a method of activating a trackpad mode using an extended contact over a virtual keyboard, in accordance with some embodiments.

FIGS. 8A-1 to 8F illustrate example user interfaces for activating a touchpad mode using a single-finger roll gesture, in accordance with some embodiments.

FIGS. 9A-9D are flowcharts illustrating a method of activating a touchpad mode using a single-finger roll gesture, in accordance with some embodiments.

DESCRIPTION OF EMBODIMENTS

FIGS. 1A-1B, 2A-2B, and 3 show example devices and systems on which the methods and techniques described herein can be implemented.

FIGS. 5A-1 to 5K-6 are schematics of a display used to illustrate example user interfaces for using an extended contact over a virtual keyboard to activate a trackpad on an electronic device with a touch-sensitive display and no force sensors, in accordance with some embodiments. FIGS. 4 and 6A-6F are flowcharts of methods of using an extended contact over a virtual keyboard to activate a trackpad on an electronic device with a touch-sensitive display and no force sensors, in accordance with some embodiments. The user interfaces in FIGS. 5A-1 to 5K-6 are used to illustrate the methods and/or processes in FIGS. 4 and 6A-6F.

Figures 1, 5A:
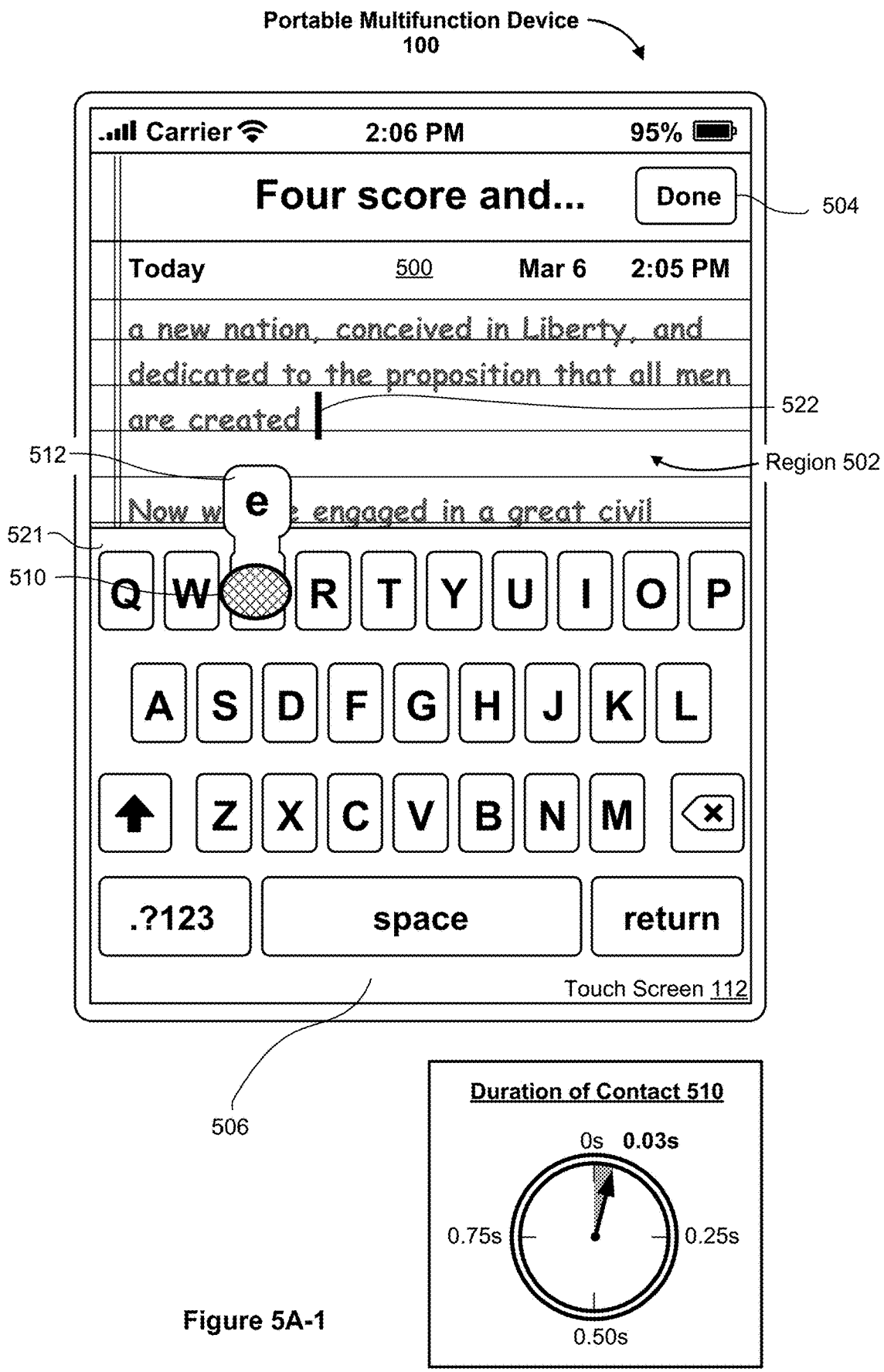
FIGS. 5A-1 to 5K-6 illustrate example user interfaces for activating a trackpad mode using an extended contact over a virtual keyboard (e.g., over a displayed representation of a spacebar key), in accordance with some embodiments.
Figure 7:
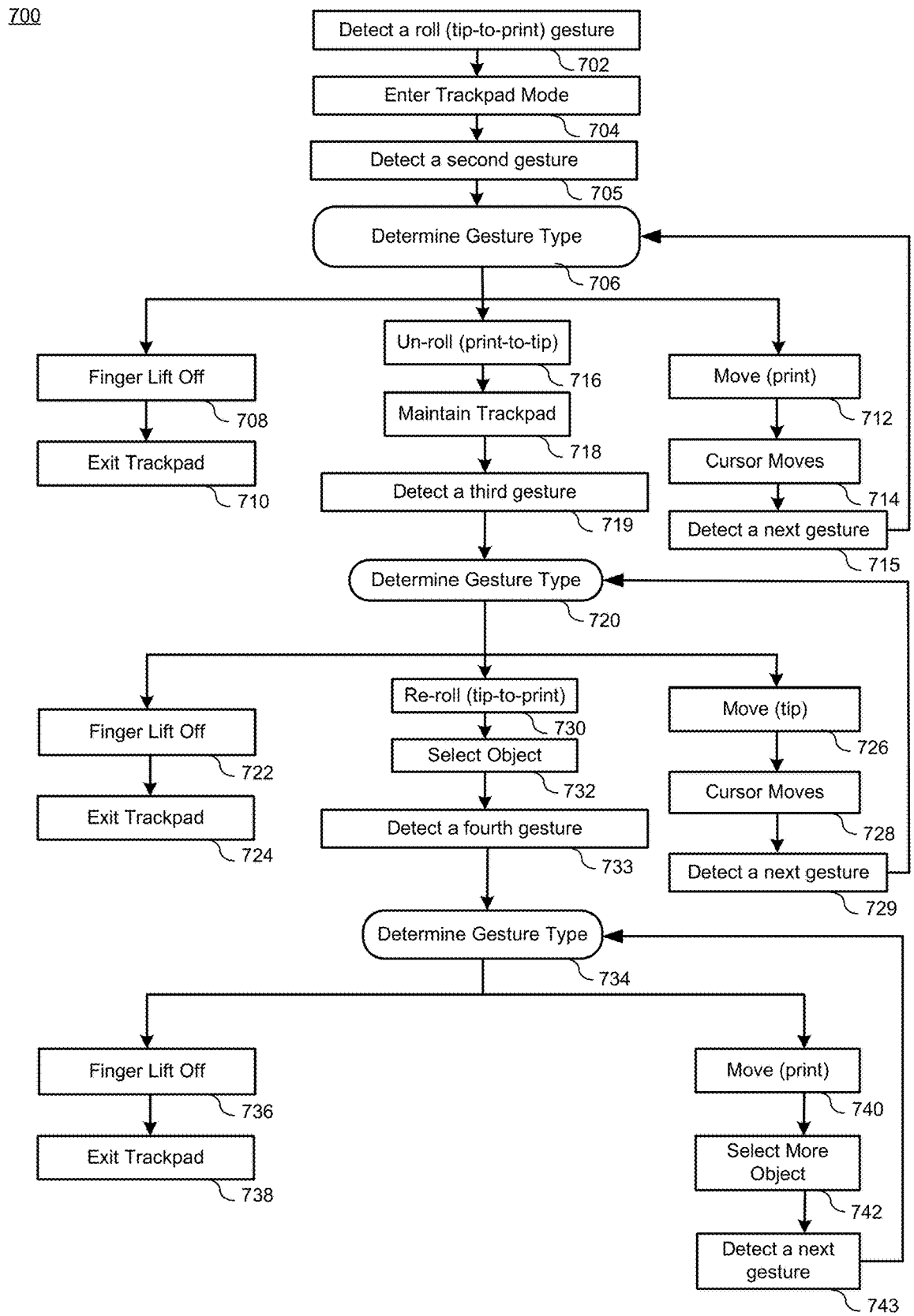
FIG. 7 is a flowchart illustrating a method of activating a trackpad mode using a single-finger roll gesture, in accordance with some embodiments.
Figures 1, 8A:
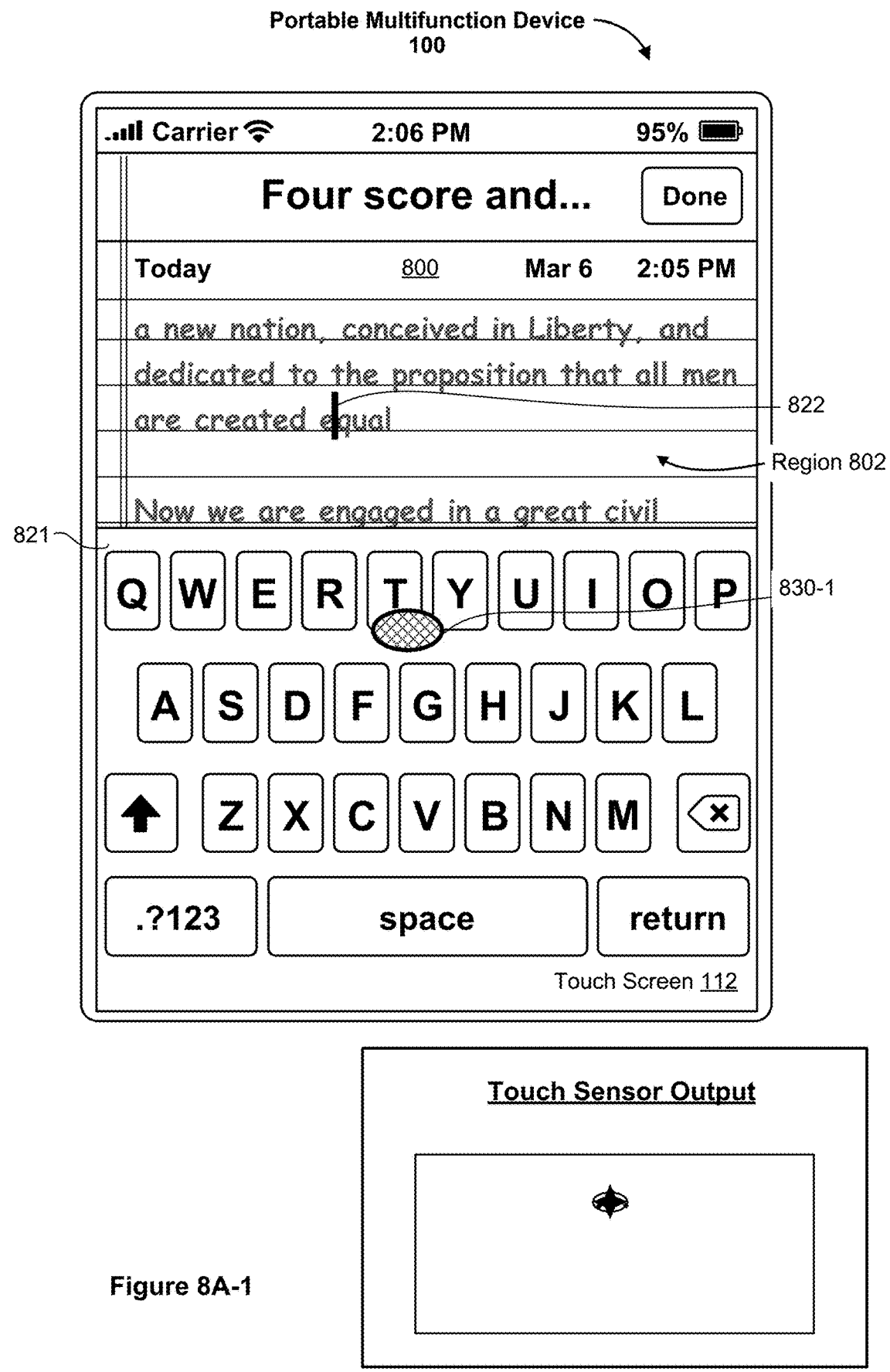
Figures 2, 8A:
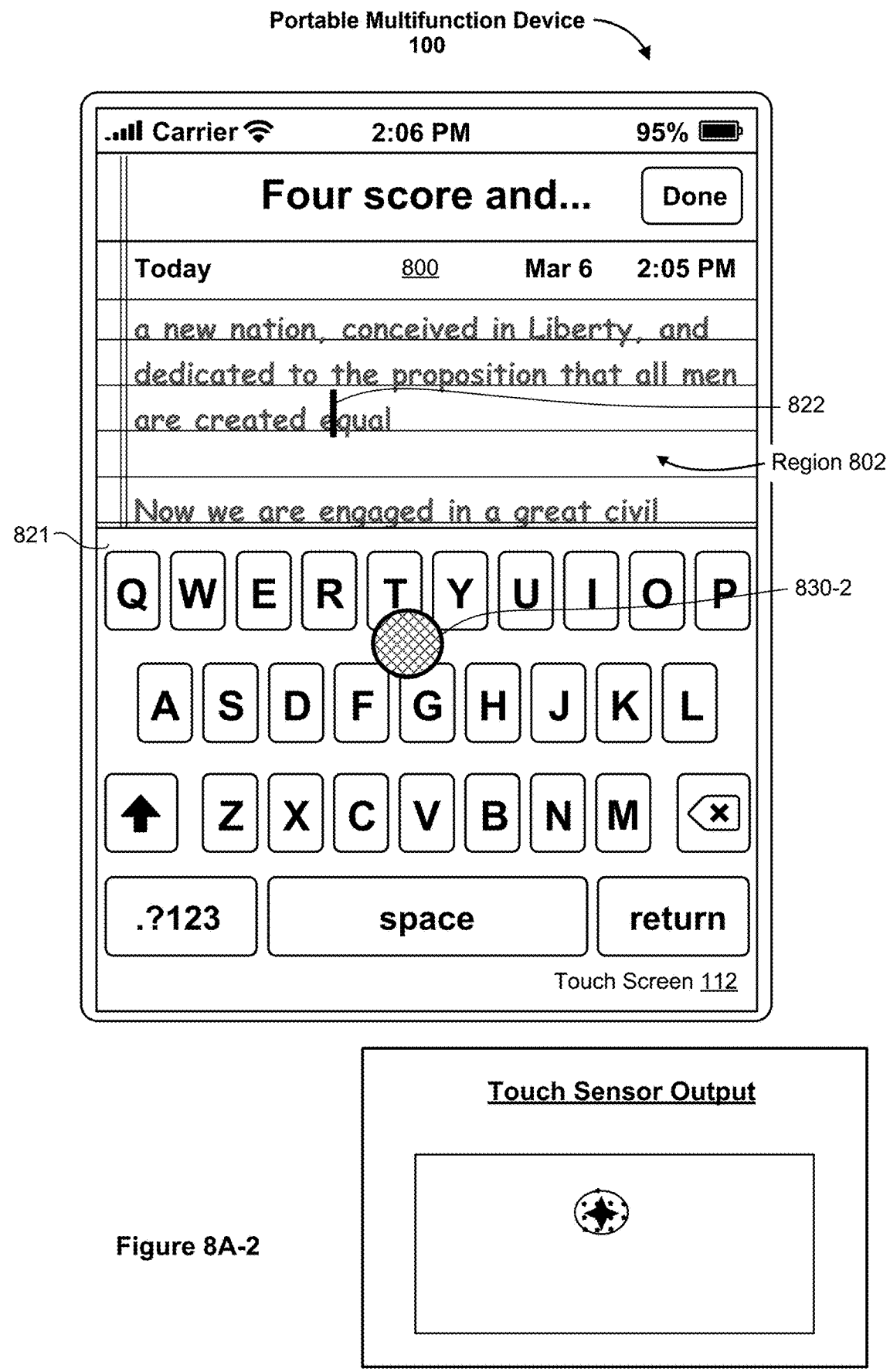
Figures 3, 8A:
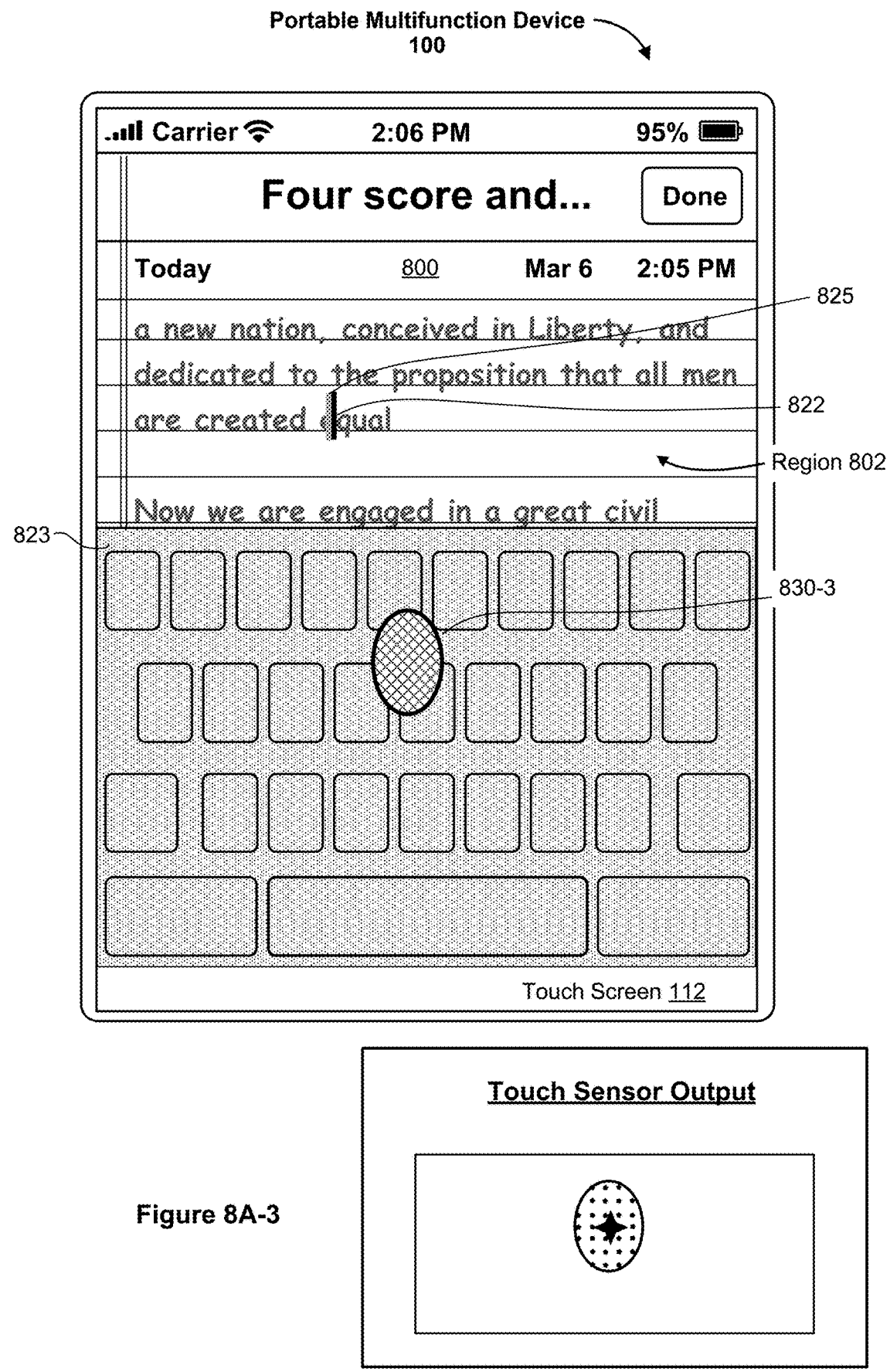
Figures 4, 8A:
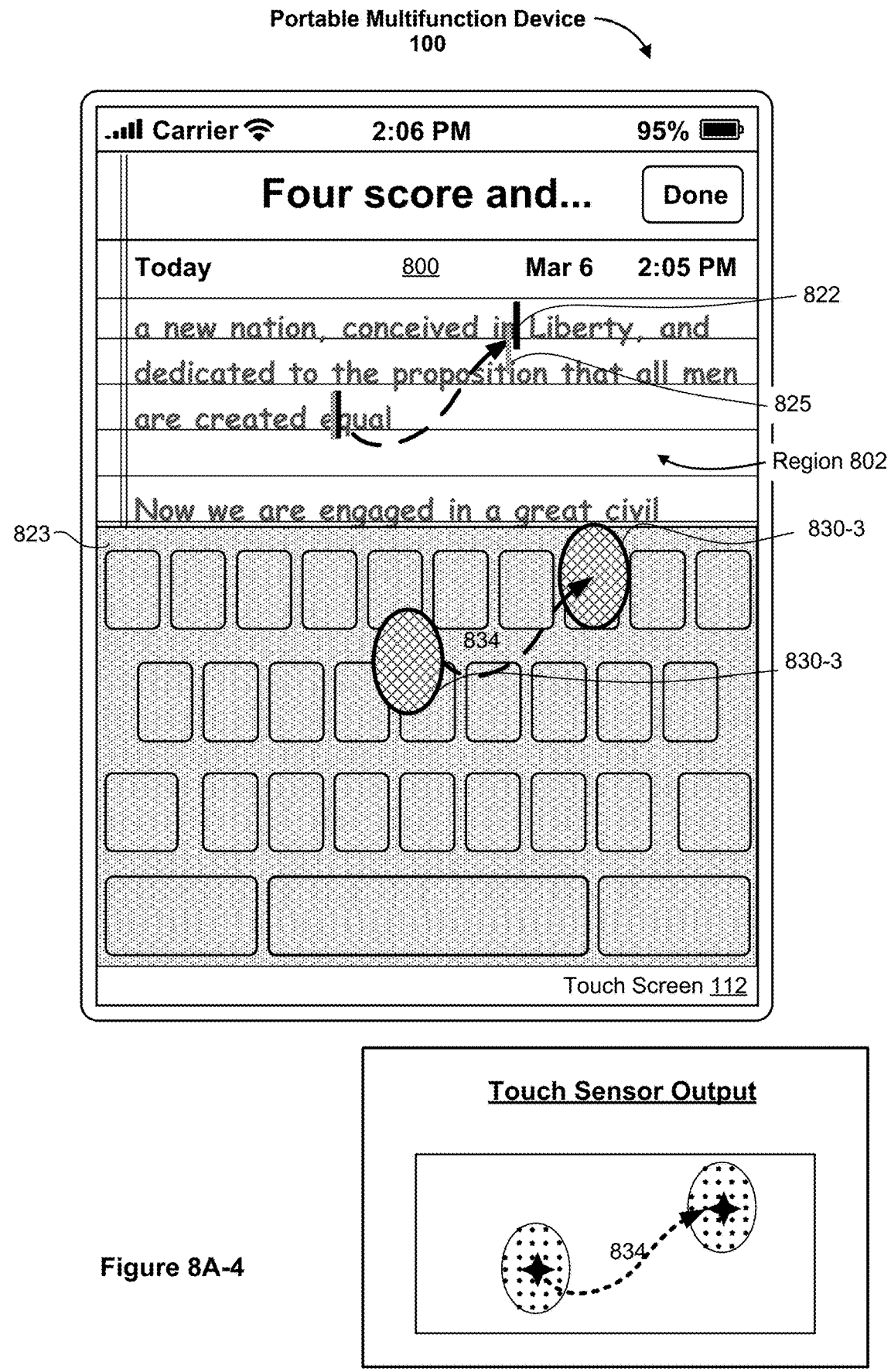
Figure 8B:
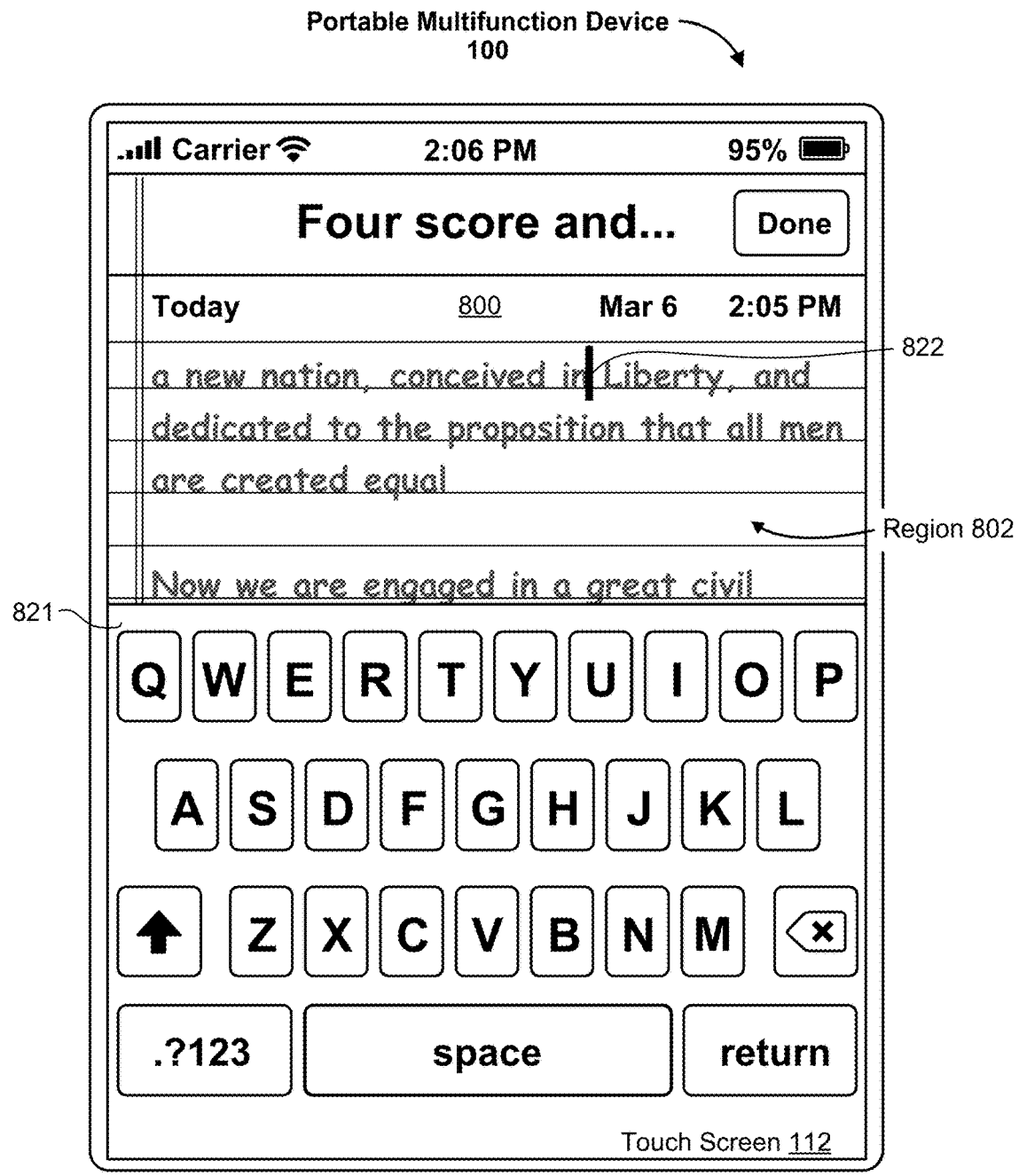
Figures 1, 8C:
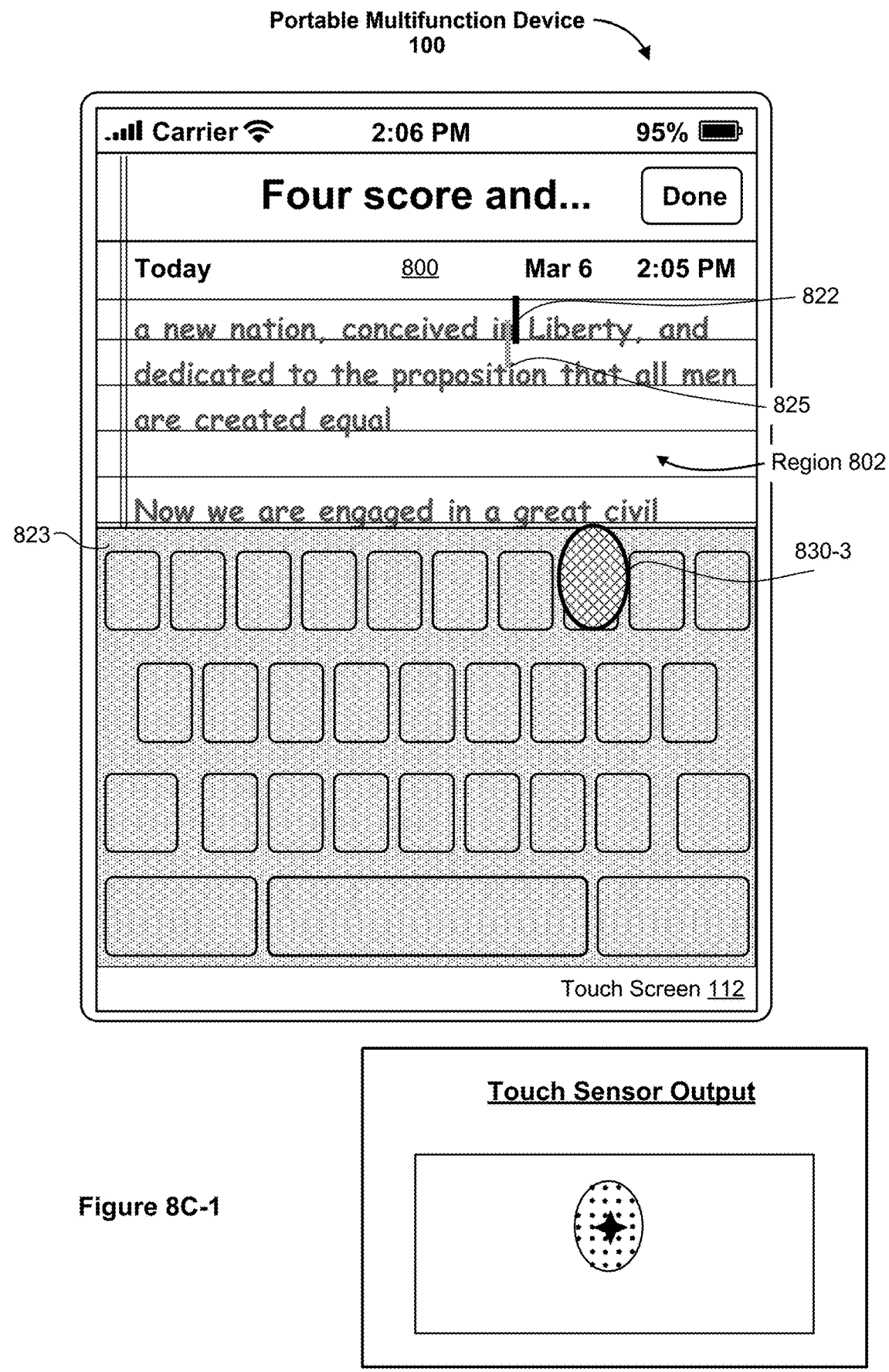
Figures 3, 8C:
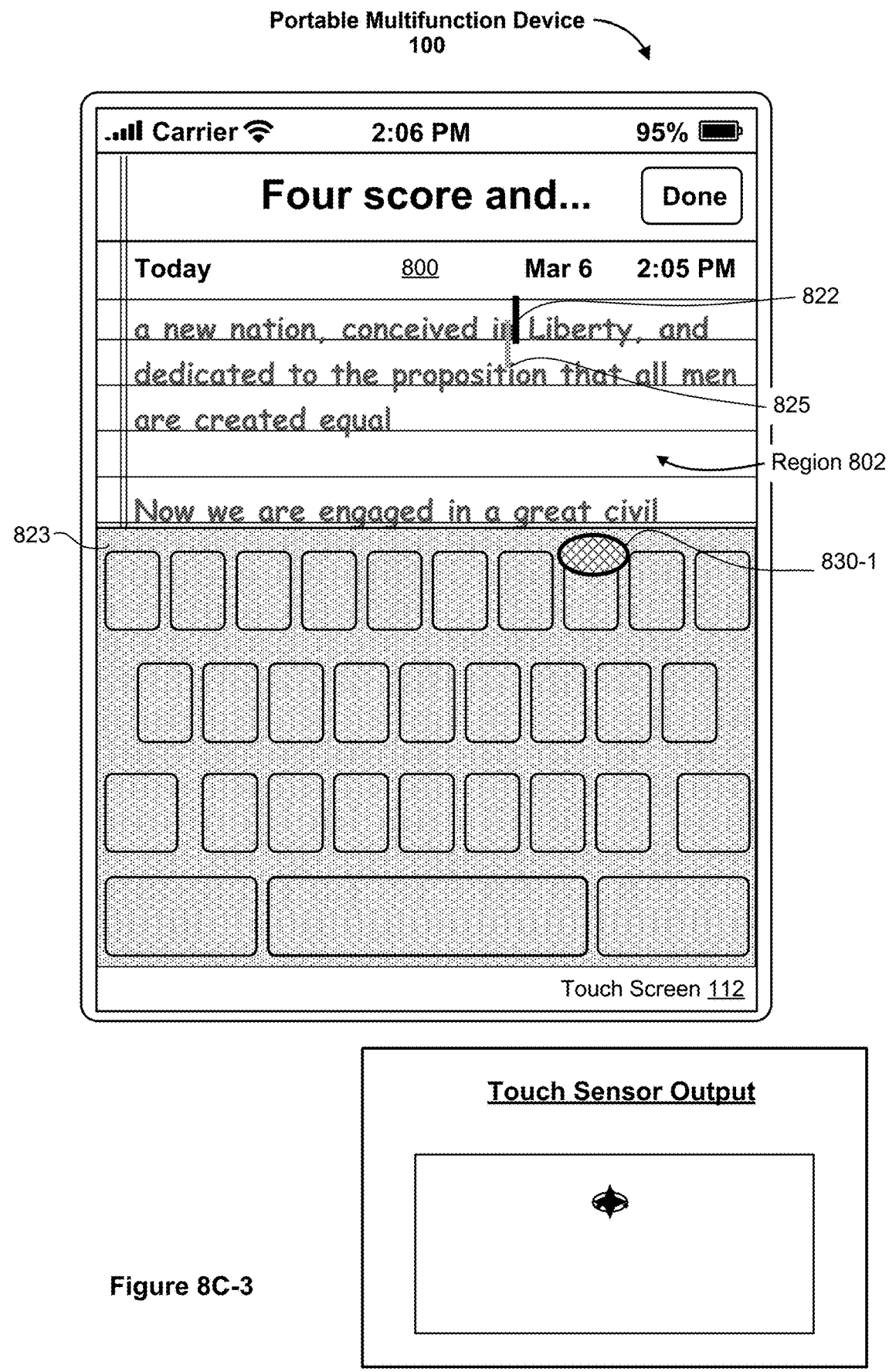
Figure 8C:
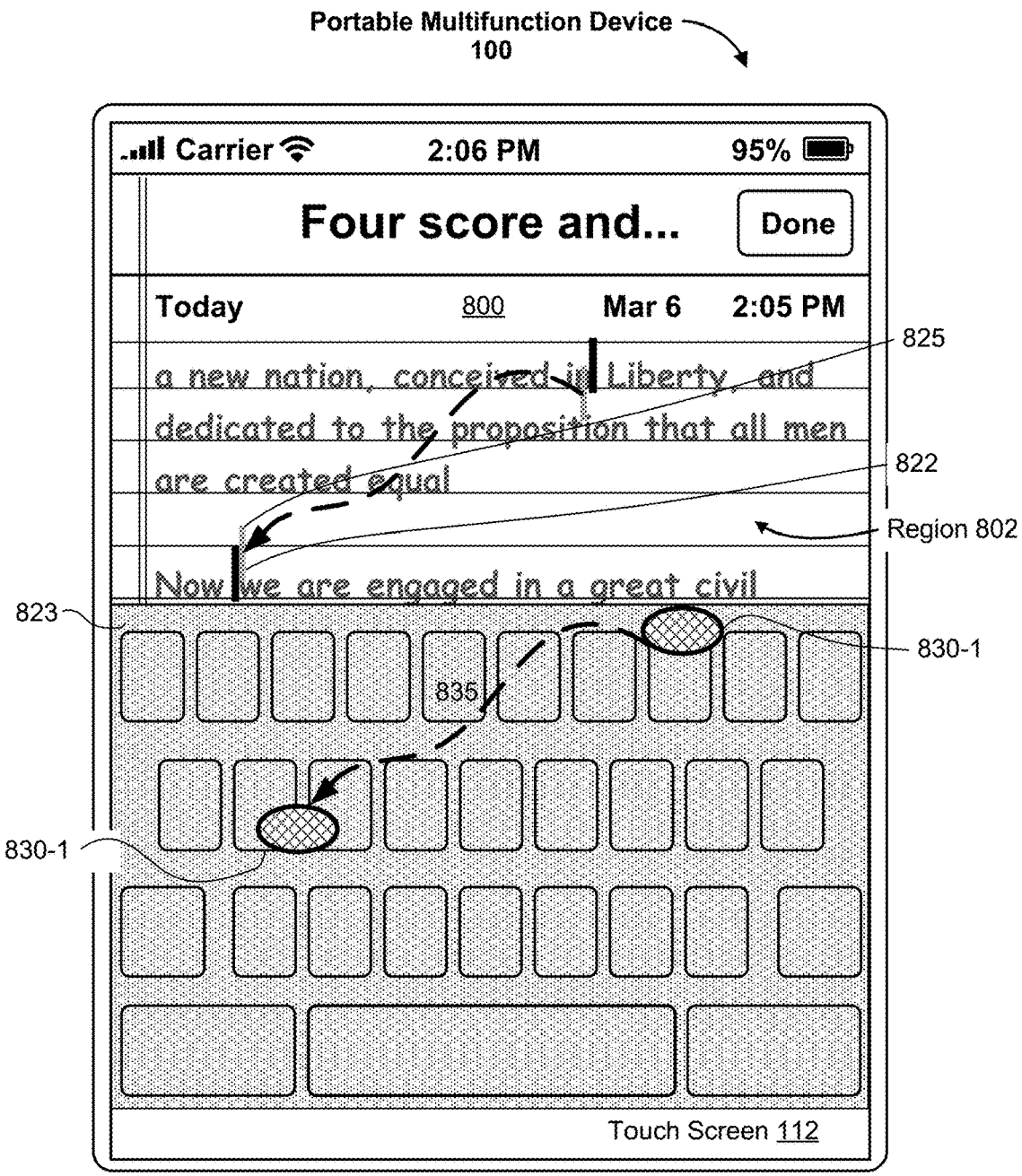
Figure 4:
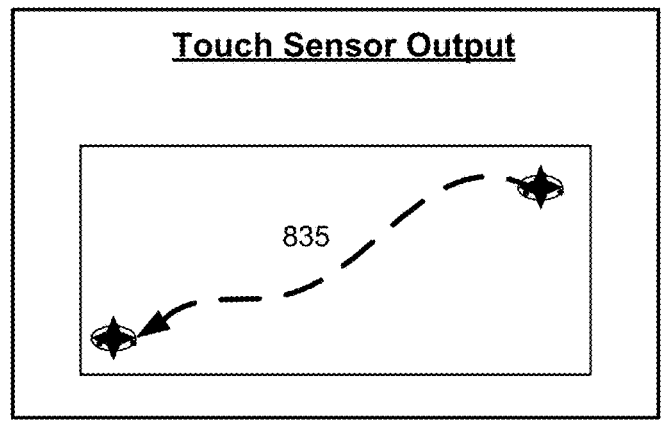
Figure 8D:
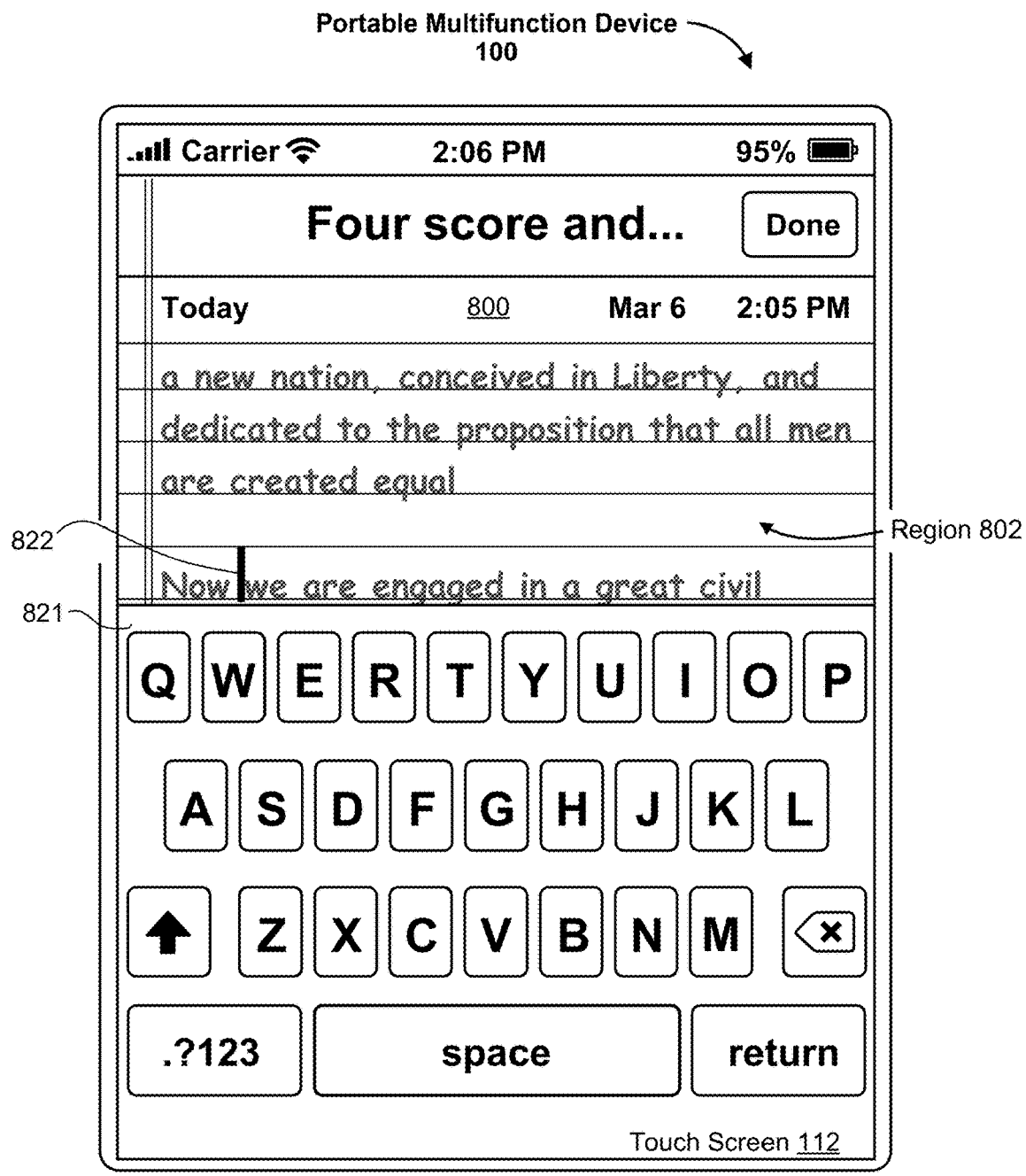
Figure 8D:
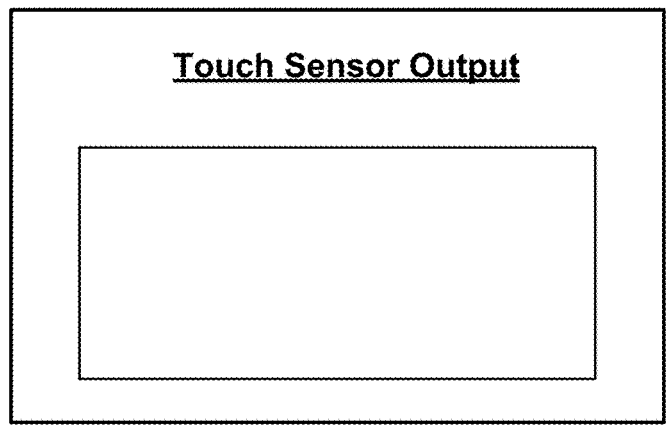
Figures 1, 8E:
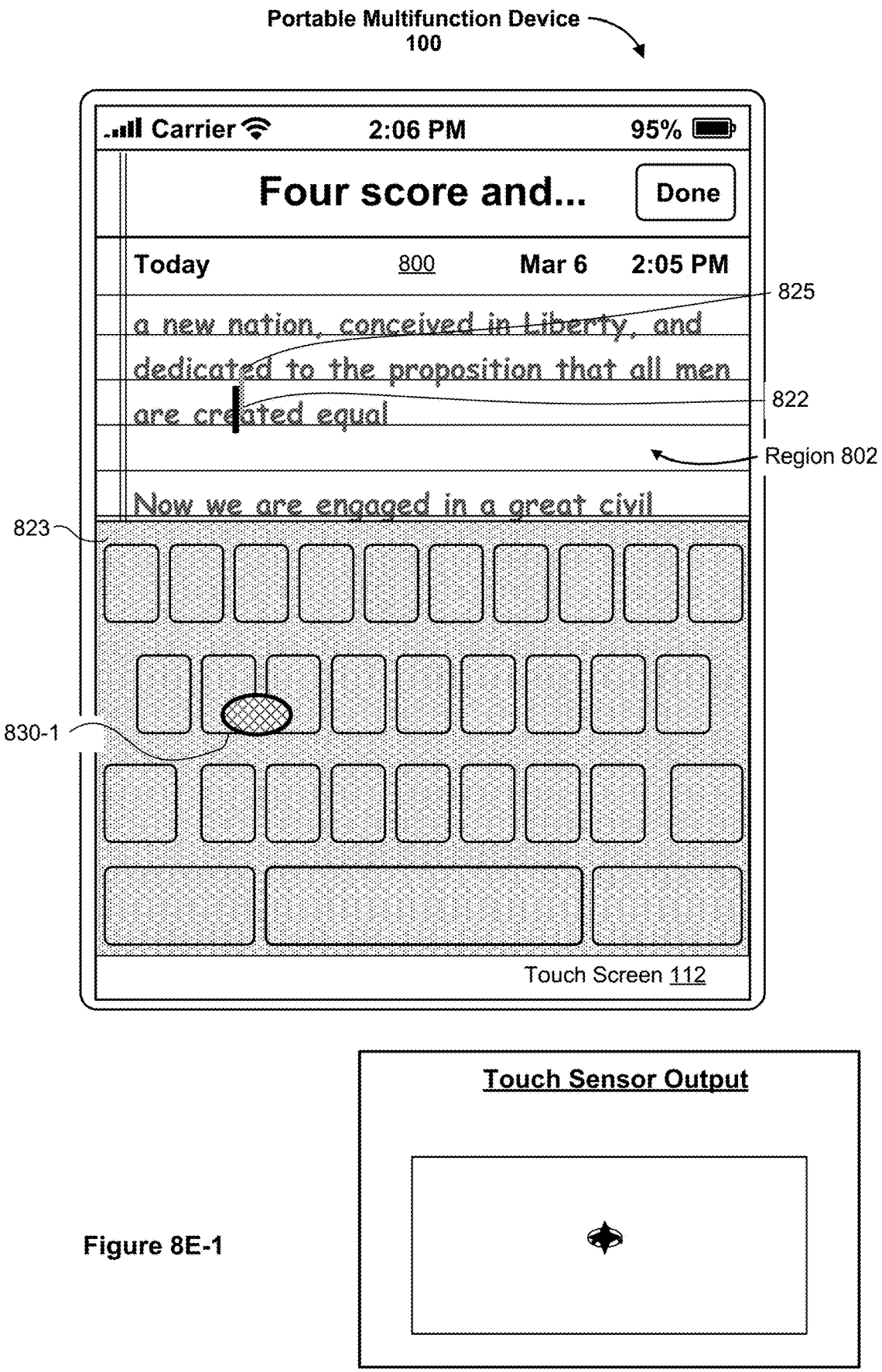
Figures 2, 8E:
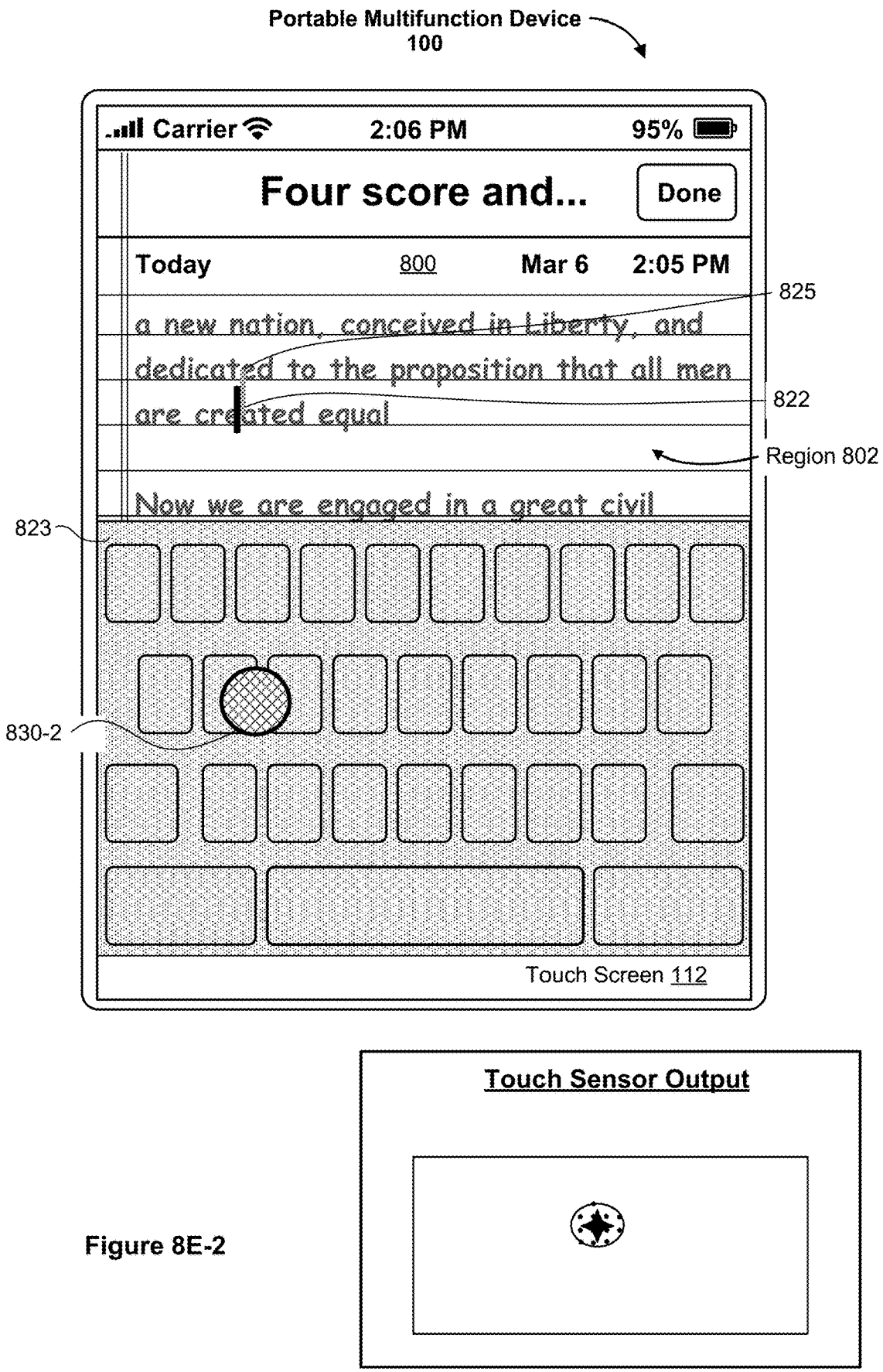
Figures 3, 8E:
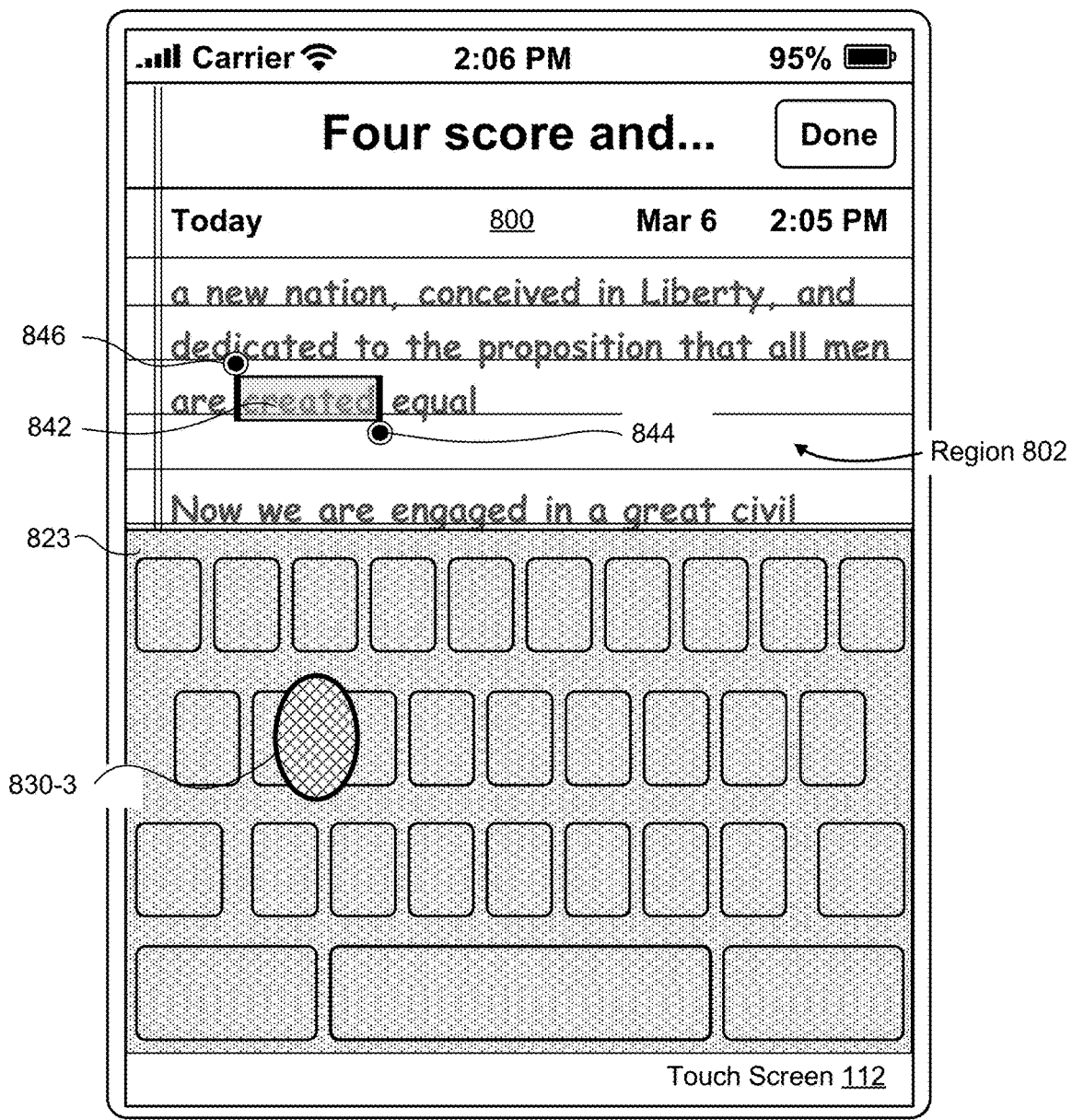
Figures 4, 8E:
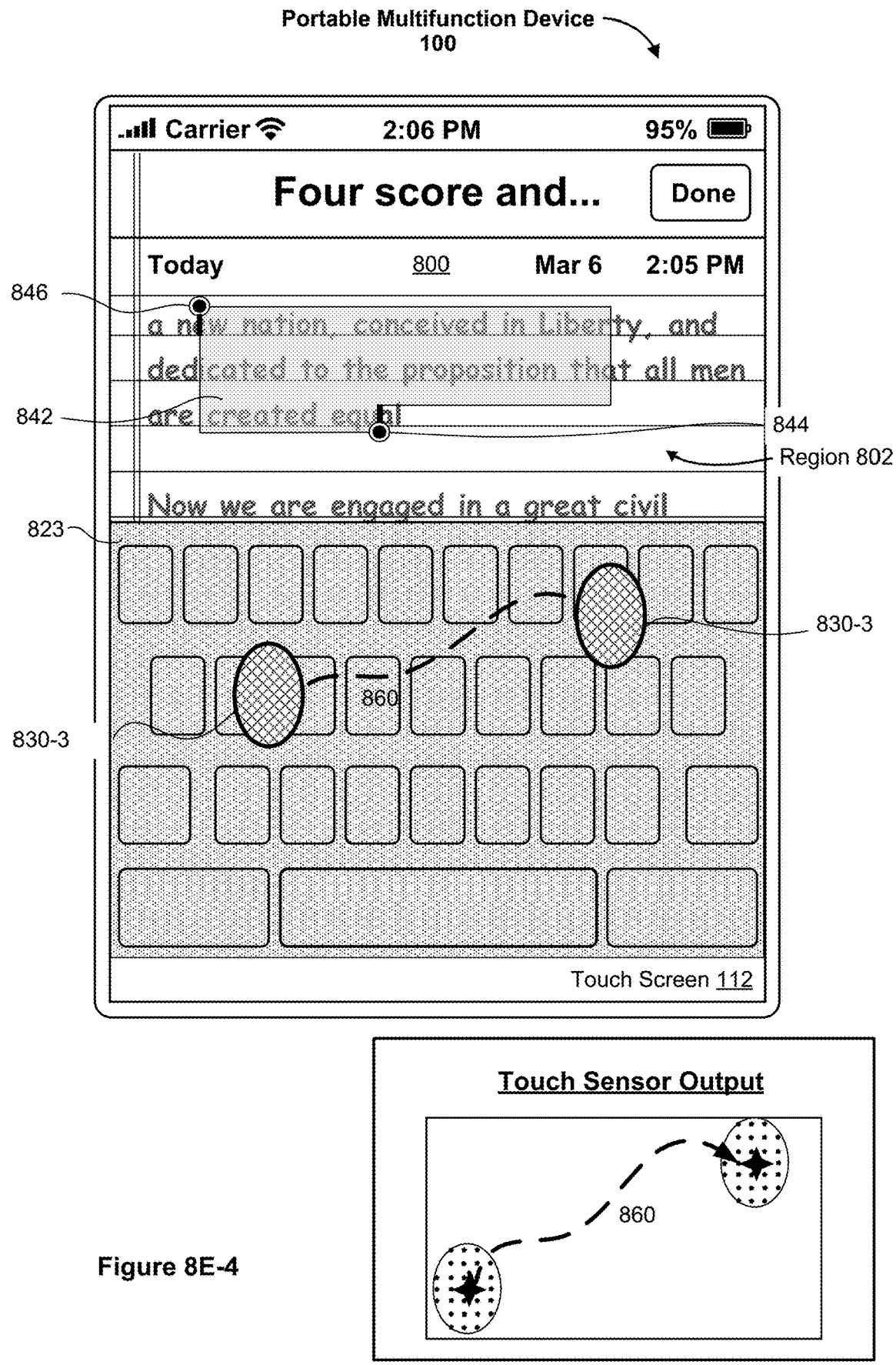
Figure 8F:
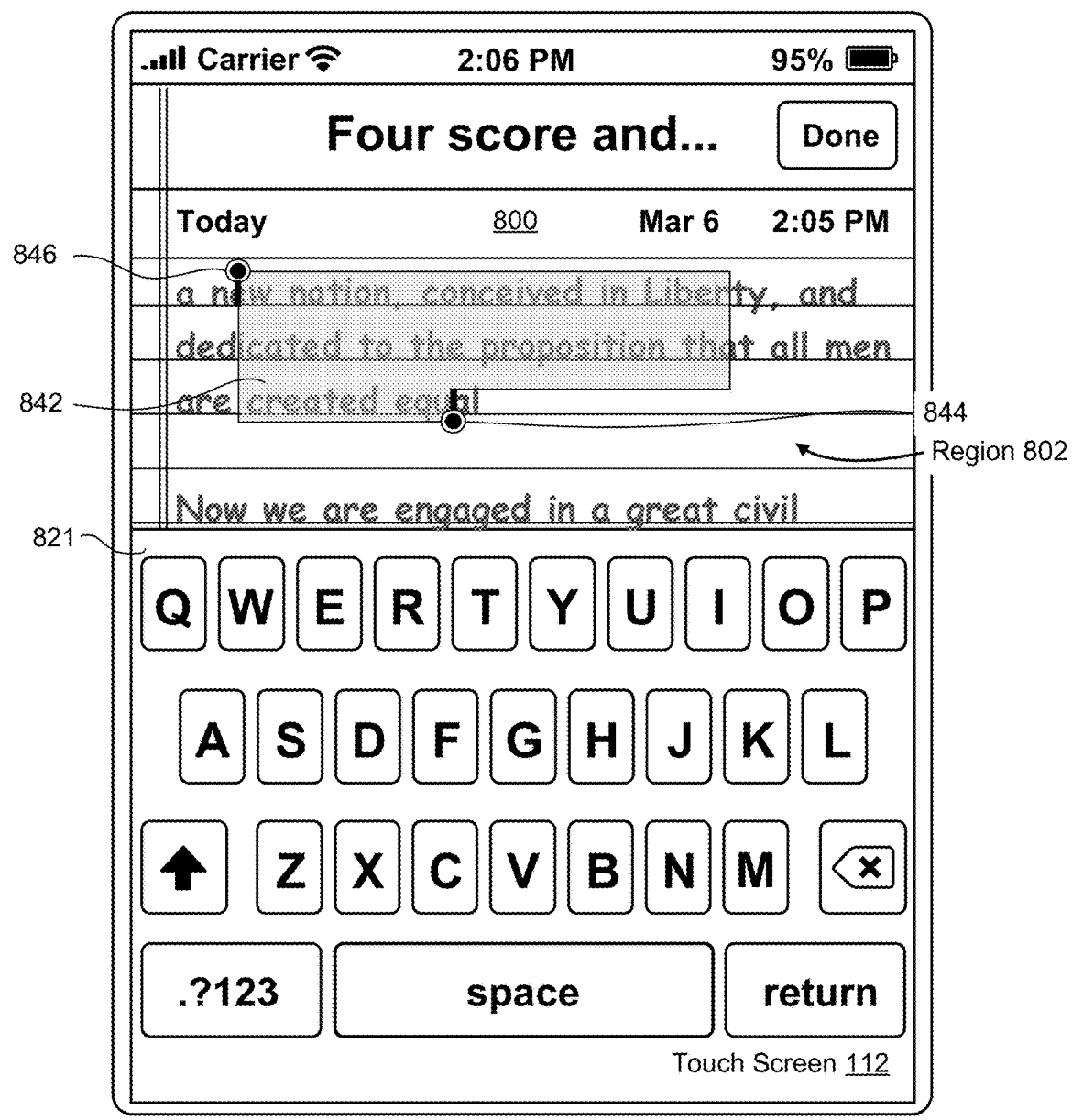

FIGS. 8A-1 to 8F illustrate example user interfaces for activating a touchpad mode using a single-finger roll gesture, in accordance with some embodiments. FIGS. 7 and 9A-9D are flowcharts of methods of activating a touchpad mode using a single-finger roll gesture, in accordance with some embodiments. The user interfaces in FIGS. 8A-1 to 8F are used to illustrate the methods and/or processes in FIGS. 7 and 9A-9D.

Example Devices and Systems

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The disclosure herein interchangeably refers to detecting a touch input on, at, over, on top of, or substantially within a particular user interface element or a particular portion of a touch-sensitive display. As used herein, a touch input that is detected "at" a particular user interface element could also be detected "on," "over," "on top of," or "substantially within" that same user interface element, depending on the context. In some embodiments and as discussed in more detail below, desired sensitivity levels for detecting touch inputs are configured by a user of an electronic device (e.g., the user could decide (and configure the electronic device to operate) that a touch input should only be detected when the touch input is completely within a user interface element).

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the IPHONE®, IPOD TOUCH®, and IPAD® devices from APPLE Inc. of Cupertino, Calif. Other portable electronic devices, such as laptops or tablet computers with touch-sensitive surfaces (e.g., touch-sensitive displays and/or touch pads), are, optionally, used. It should also be understood that, in some embodiments, the device is not a portable communications device, but is a desktop computer with a touch-sensitive surface (e.g., a touch-sensitive display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a health/fitness application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
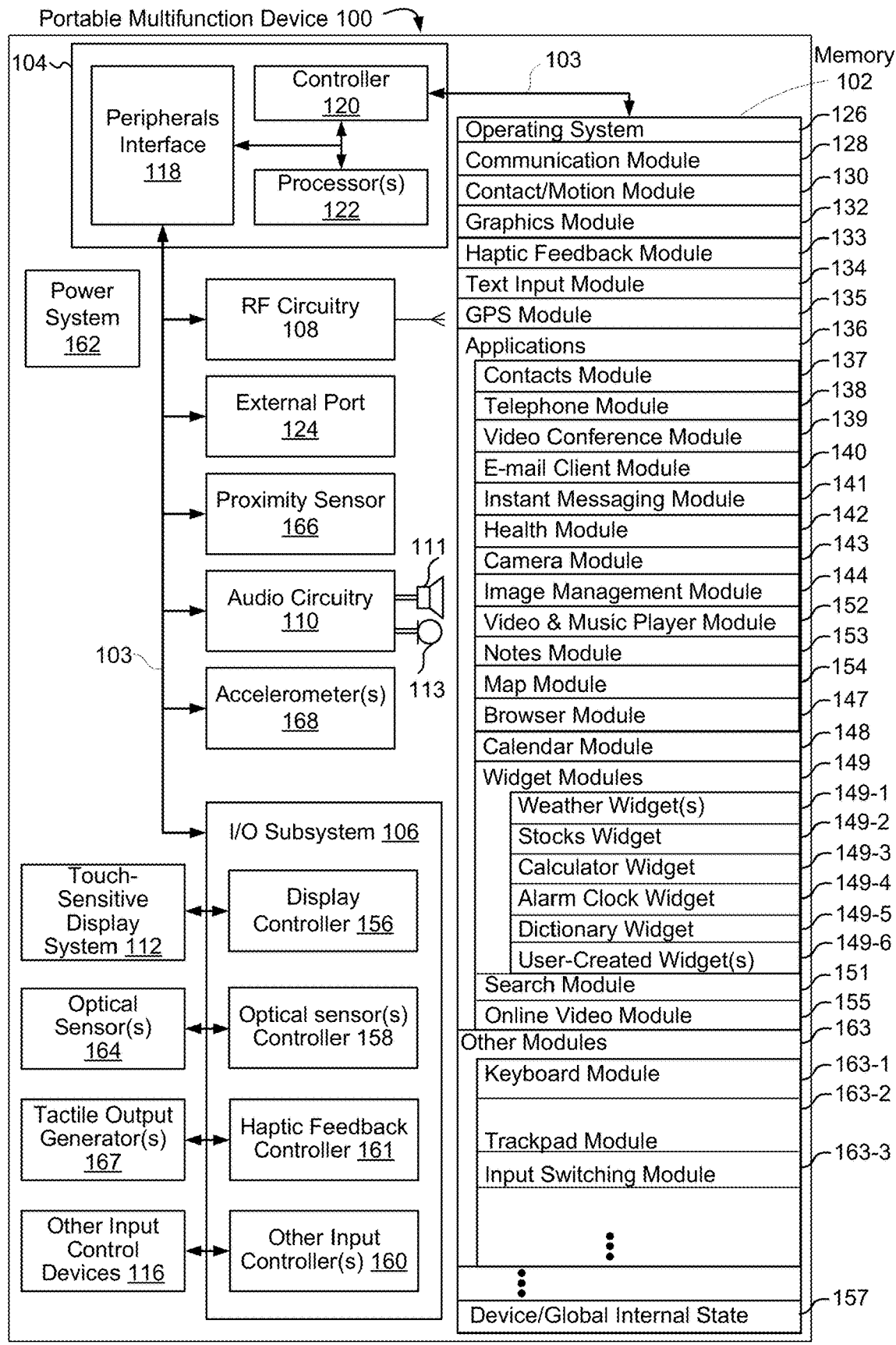
FIG. 1A is a high-level block diagram of a computing device with a touch-sensitive display, in accordance with some embodiments.

Attention is now directed toward embodiments of portable electronic devices with touch-sensitive displays. FIG. 1A is a block diagram illustrating portable multifunction device 100 (also referred to interchangeably herein as electronic device 100 or device 100) with touch-sensitive display 112 in accordance with some embodiments. Touch-sensitive display 112 is sometimes called a "touch screen" for convenience, and is sometimes known as or called a touch-sensitive display system. Device 100 includes memory 102 (which optionally includes one or more computer-readable storage mediums), controller 120, one or more processing units (CPU's) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more tactile output generators 167 for generating tactile outputs on device 100 (e.g., generating tactile outputs on a touch-sensitive surface such as touch-sensitive display system 112 of device 100 or a touchpad of device 100). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of hardware and software, including one or more signal processing and/or application specific integrated circuits.

Memory 102 optionally includes high-speed random access memory (e.g., DRAM, SRAM, DDR RAM or other random access solid state memory devices) and optionally also includes non-volatile memory, such as one or more magnetic disk storage devices, flash memory devices, or other non-volatile solid-state memory devices. Memory 102 optionally includes one or more storage devices remotely located from processor(s) 122. Access to memory 102 by other components of device 100, such as CPU 122 and the peripherals interface 118, is, optionally, controlled by controller 120.

Peripherals interface 118 can be used to couple input and output peripherals of the device to CPU 122 and memory 102. The one or more processors 122 run or execute various software programs and/or sets of instructions stored in memory 102 to perform various functions for device 100 and to process data.

In some embodiments, peripherals interface 118, CPU 122, and controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, and/or Wireless Fidelity (Wi-Fi) (e.g., IEEE 802.1 1 a, IEEE 802.1 1b, IEEE 802.11 g and/or IEEE 802.1 1 n).

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 connects input/output peripherals on device 100, such as touch screen 112 and other input control devices 116, to peripherals interface 118. I/O subsystem 106 optionally includes display controller 156, optical sensor controller 158, haptic feedback controller 161, and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons optionally include an up/down button for volume control of speaker 111 and/or microphone 113. The one or more buttons optionally include a push button.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, a sensor or a set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an example embodiment, a point of contact between touch screen 112 and the user corresponds to an area under a finger of the user.

Touch screen 112 optionally uses LCD (liquid crystal display) technology, LPD (light emitting polymer display) technology, or LED (light emitting diode) technology, or OLED (organic light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology is used, such as that found in the IPHONE®, IPOD TOUCH®, and IPAD® from APPLE Inc. of Cupertino, Calif.

Touch screen 112 optionally has a video resolution in excess of 400 dpi. In some embodiments, touch screen 112 has a video resolution of at least 600 dpi. In other embodiments, touch screen 112 has a video resolution of at least 1000 dpi. The user optionally makes contact with touch screen 112 using any suitable object or digit, such as a stylus or a finger. In some embodiments, the user interface is designed to work primarily with finger-based contacts and gestures. In some embodiments, the device translates the finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)), and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen 112 on the front of the device, so that the touch-sensitive display is enabled for use as a viewfinder for still and/or video image acquisition. In some embodiments, another optical sensor is located on the front of the device so that the user's image is, optionally, obtained for videoconferencing while the user views the other video conference participants on the touch-sensitive display.

Device 100 optionally also includes one or more proximity sensors 166. FIG. 1A shows proximity sensor 166 coupled to peripherals interface 118. Alternately, proximity sensor 166 is coupled to input controller 160 in 1/0 subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch-sensitive display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, proactive module 163 (optionally including one or more of keyboard module 163-1, trackpad module 163-2, input switching module 163-3 (e.g., keyboard to trackpad, or trackpad to keyboard), communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIG. 1A. Device/global internal state 157 includes one or more of: active application state, indicating which applications, if any, are currently active; display state, indicating what applications, views or other information occupy various regions of touch-sensitive display 112; sensor state, including information obtained from the device's various sensors and input control devices 116; and location information concerning the device's location and/or attitude (e.g., orientation of the device).

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on some embodiments of IPOD devices from APPLE Inc. In other embodiments, the external port is a multi-pin (e.g., 8-pin) connector that is the same as, or similar to and/or compatible with the 8-pin connector used in LIGHTNING connectors from APPLE Inc.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if the contact is extended (e.g., detecting a time of the finger-down event), determining if there is movement of the contact and tracking the movement across the touch-sensitive surface (e.g., detecting one or more finger-dragging events), and determining if the contact has ceased (e.g., detecting a finger-up event, a break in contact, or a finger lift-off event). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift-off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and, in some embodiments, subsequently followed by detecting a finger-up (lift-off) event. In yet another example, detecting a finger roll gesture on the touch-sensitive surface includes detecting a fingertip-down event, followed by detecting continuous increasing of a contact area between the finger and the touch-sensitive surface, and further followed by detecting a fingerprint contact with the touch-sensitive surface. Similarly, tap, swipe, drag, roll, and other gestures are optionally detected for a stylus by detecting a particular contact pattern for the stylus.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinating data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications ("apps") 136 optionally include the following modules (or sets of instructions), or a subset or superset thereof:
  contacts module 137 (sometimes called an address book or contact list);

telephone module 138;
video conferencing module 139;
e-mail client module 140;
instant messaging (IM) module 141;
health module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained or created by the user (149-6);
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, website creation applications, disk authoring applications, spreadsheet applications, JAVA-enabled applications, encryption, digital rights management, voice recognition, widget creator module for making user-created widgets 149-6, and voice replication.

In conjunction with touch screen 112, display controller 156, contact module 130, graphics module 132, and text input module 134, contacts module 137 is, optionally, used to manage an address book or contact list (e.g., stored in contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact module 130, graphics module 132, and text input module 134, telephone module 138 is, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and video and music player module 146, health module 142 includes executable instructions to create workouts (e.g., with time, distance, and/or calorie burning goals), communicate with workout sensors (sports devices such as a watch or a pedometer), receive workout sensor data, calibrate sensors used to monitor a workout, select and play music for a workout, and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, a widget creator module (not pictured) is, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions. In some embodiments, search module 151 further includes executable instructions for displaying a search entry portion and a predictions portion. In some embodiments, the search module 151, in conjunction with proactive module 163, also populates, prior to receiving any user input at the search entry portion, the predictions portion with affordances for suggested or predicted people, actions within applications, applications, nearby places, and/or news articles.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an IPOD from APPLE Inc.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 is, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

As pictured in FIG. 1A, portable multifunction device 100 also includes other modules 163 that are used for performing certain keyboard and trackpad functions, and that allow for switching between keyboard and trackpad functions. Other modules 163 optionally includes the following modules (or sets of instructions), or a subset or superset thereof:

keyboard module 163-1 for receiving user inputs at a displayed virtual keyboard and determining which keyboard functions to actuate in response to the user inputs (could be a keyboard function or an extended keyboard function depending on amount of time during which a respective input was in contact with the touch-sensitive display);

trackpad module 163-2 for receiving user inputs while at least a portion of the touch-sensitive display is operating as a trackpad; and input switching module 163-3 for detecting user inputs that cause switching between trackpad and keyboard modes (e.g., extended contacts discussed below or the tip-to-print/roll gesture discussed below, each of which cause switching from a keyboard to a trackpad mode).

Each of the above-identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
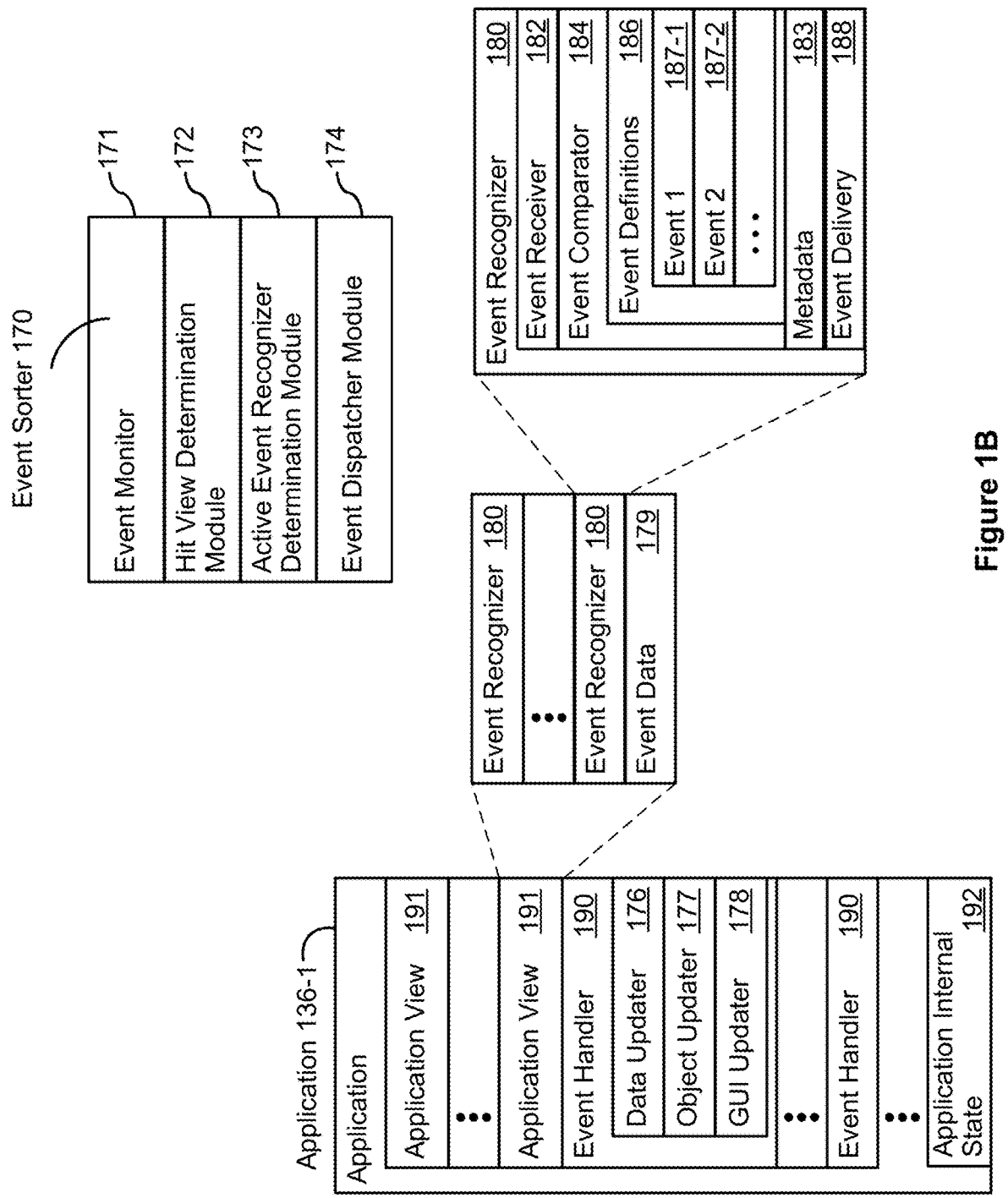
FIG. 1B is a block diagram of example components for event handling, in accordance with some embodiments.

FIG. 1B is a block diagram illustrating example components for event handling in accordance with some embodiments. In some embodiments, memory 102 (in FIG. 1A) includes event sorter 170 (e.g., in operating system 126) and a respective application 136-1 selected from among the applications 136 of portable multifunction device 100 (FIG. 1A) (e.g., any of the aforementioned applications stored in memory 102 with applications 136).

Event sorter 170 receives event information and determines the application 136-1 and application view 191 of application 136-1 to which to deliver the event information.

Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from portrait to landscape, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any remain active for the hit view, continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof is optionally utilized as inputs corresponding to sub-events which define an event to be recognized.

Figure 2A:
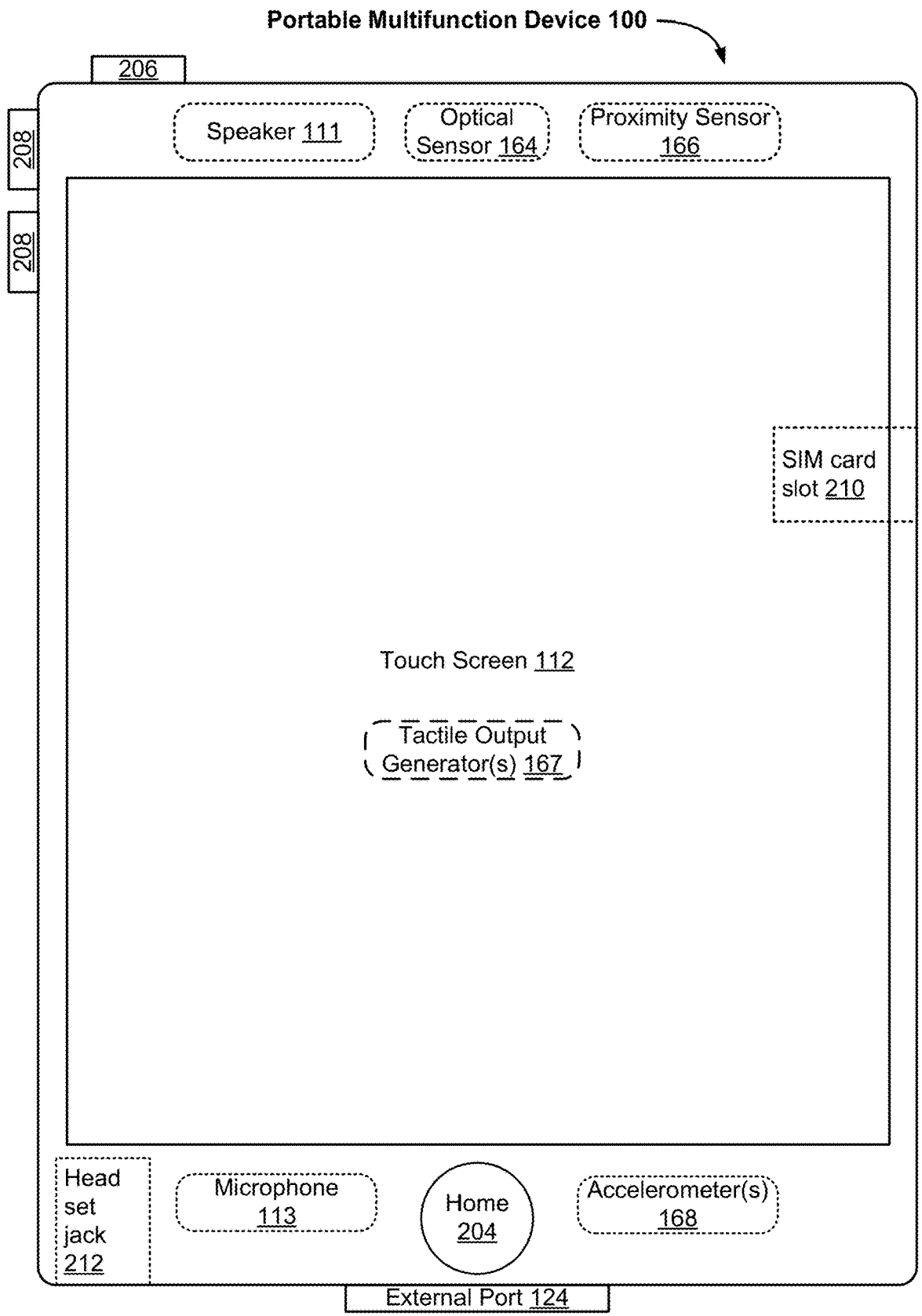
FIG. 2A is a schematic diagram of a portable multifunction device having a touch screen (also referred to interchangeably herein as a "touch-sensitive display"), in accordance with some embodiments.

FIG. 2A is a schematic of a portable multifunction device (e.g., portable multifunction device 100) having a touch-sensitive display (e.g., touch screen 112) in accordance with some embodiments. In this embodiment, as well as others described below, a user can select one or more of the graphics by making a gesture on the screen, for example, with one or more fingers or one or more styluses. In some embodiments, selection of one or more graphics occurs when the user breaks contact with the one or more graphics (e.g., by lifting a finger off of the screen). In some embodiments, the gesture optionally includes one or more tap gestures (e.g., a sequence of touches on the screen followed by lift-offs), one or more swipe gestures (continuous contact during the gesture along the surface of the screen, e.g., from left to right, right to left, upward and/or downward), and/or a rolling of a finger (e.g., from right to left, left to right, upward and/or downward) that has made contact with device 100. In some implementations or circumstances, inadvertent contact with a graphic does not select the graphic. For example, a swipe gesture that sweeps over an application affordance (e.g., an icon) optionally does not launch (e.g., open) the corresponding application when the gesture for launching the application is a tap gesture.

Device 100 optionally also includes one or more physical buttons, such as a "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more tactile output generators 167 for generating tactile outputs for a user of device 100.

Figure 2B:
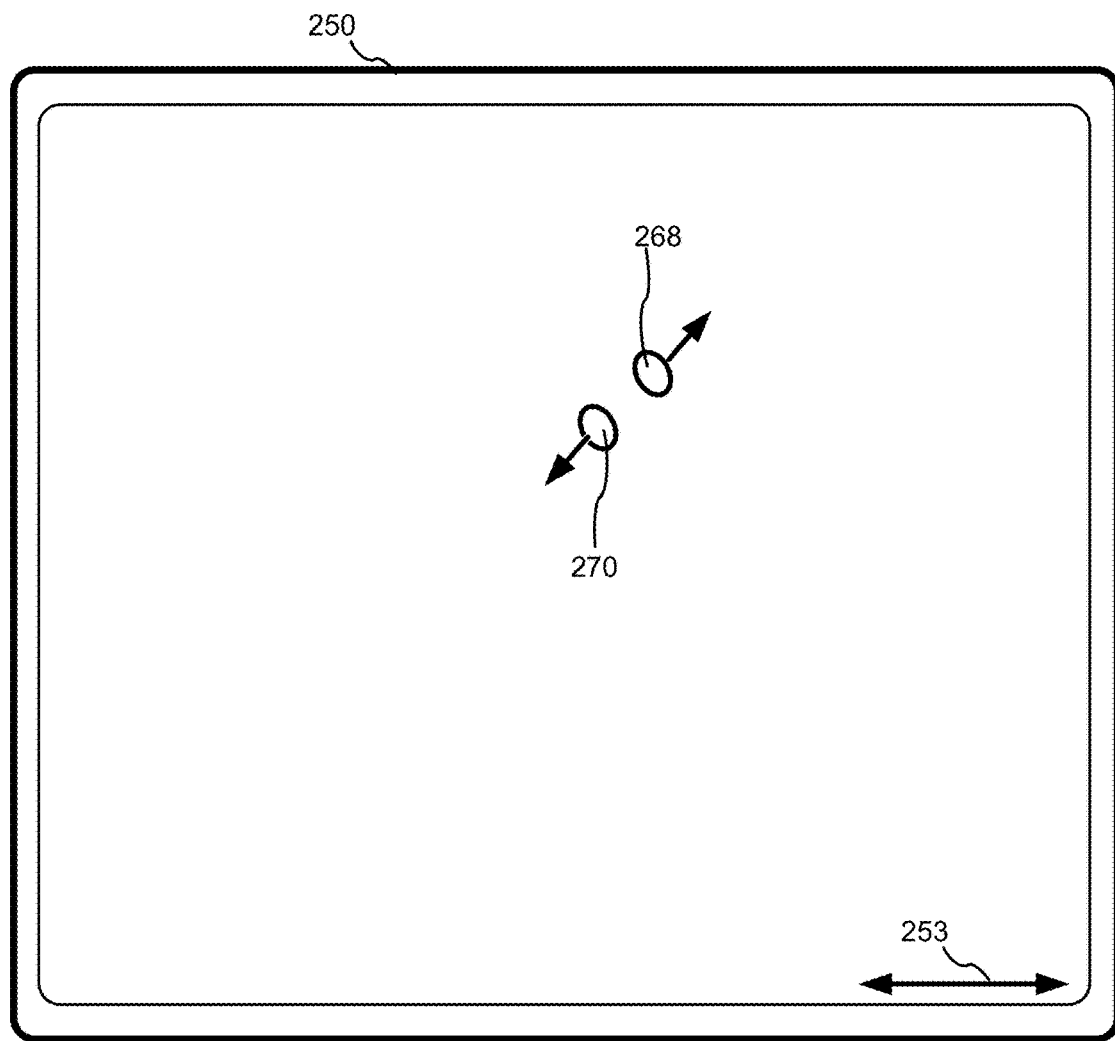
FIG. 2B illustrates an example user interface for a multifunction device with a touch-sensitive surface that is separate from the display in accordance with some embodiments.
Figure 2B:
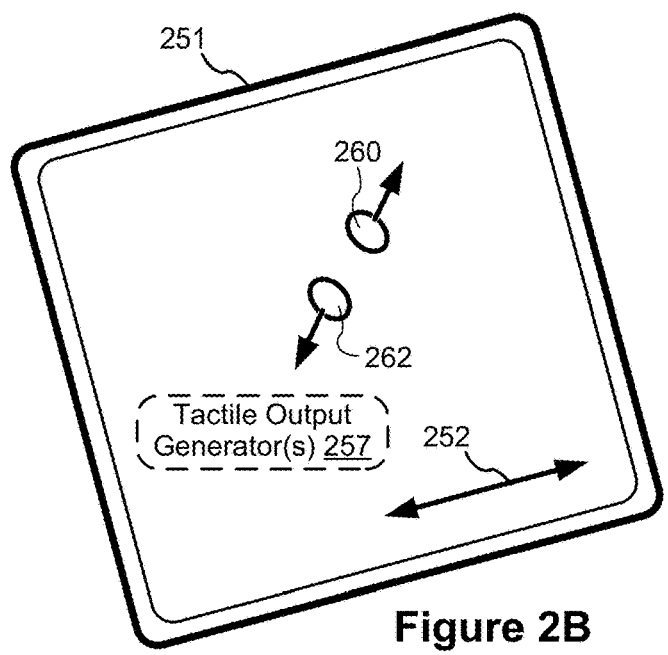

FIG. 2B is a schematic used to illustrate a user interface on a device (e.g., device 100, FIG. 1A) with a touch-sensitive surface 251 (e.g., a tablet or touchpad) that is separate from the display 250 (e.g., touch screen 112). In some embodiments, touch-sensitive surface 251 includes one or more tactile output generator(s) 257 for generating tactile outputs for a user of touch-sensitive surface 251.

Although some of the examples which follow will be given with reference to inputs on touch screen 112 (where the touch sensitive surface and the display are combined), in some embodiments, the device detects inputs on a touch-sensitive surface that is separate from the display, as shown in FIG. 2B. In some embodiments the touch sensitive surface (e.g., 251 in FIG. 2B) has a primary axis (e.g., 252 in FIG. 2B) that corresponds to a primary axis (e.g., 253 in FIG. 2B) on the display (e.g., 250). In accordance with these embodiments, the device detects contacts (e.g., 260 and 262 in FIG. 2B) with the touch-sensitive surface 251 at locations that correspond to respective locations on the display (e.g., in FIG. 2B, 260 corresponds to 268 and 262 corresponds to 270). In this way, user inputs (e.g., contacts 260 and 262, and movements thereof) detected by the device on the touch-sensitive surface (e.g., 251 in FIG. 2B) are used by the device to manipulate the user interface on the display (e.g., 250 in FIG. 2B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touch-sensitive surface 251 in FIG. 2B (touch-sensitive surface 251, in some embodiments, is a touchpad)) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch-sensitive display) will indicate that the user is intending to activate the respective button (as opposed to other user interface elements shown on a display of the device).

Figure 3:
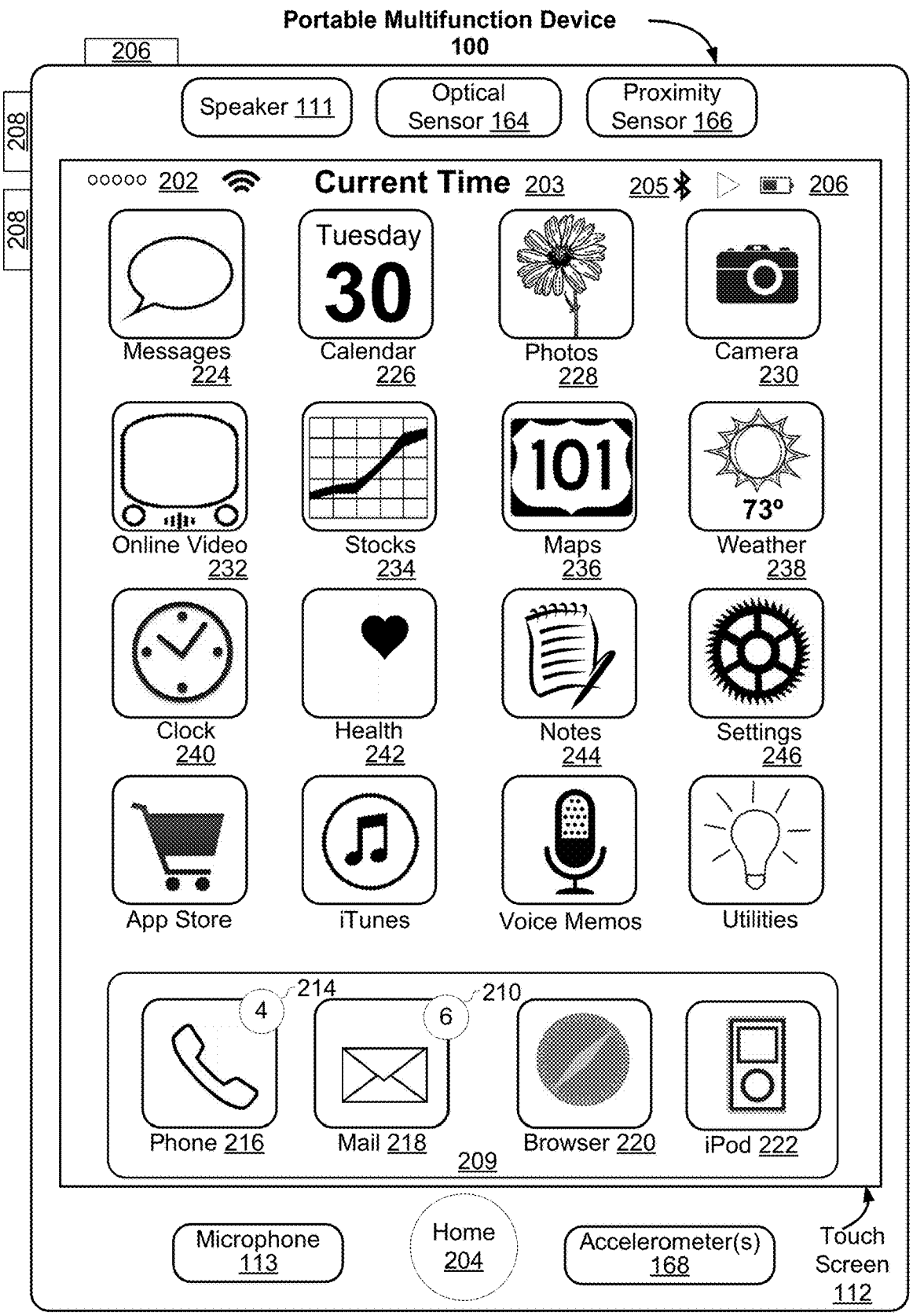
FIG. 3 is a schematic of a touch screen used to illustrate a user interface for a menu of applications, in accordance with some embodiments.

FIG. 3 is a schematic of a touch screen used to illustrate a user interface for a menu of applications, in accordance with some embodiments. Similar user interfaces are, optionally, implemented on device 100 (FIG. 1A). In some embodiments, the user interface displayed on the touch screen 112 includes the following elements, or a subset or superset thereof:

Signal strength indicator(s) 202 for wireless communication(s), such as cellular and Wi-Fi signals;
    Time 203;
    Bluetooth indicator 205;
    Battery status indicator 206;

Tray 209 with icons for frequently used applications, such as:
  Icon 216 for telephone module 138, labeled "Phone," which optionally includes an indicator 214 of the number of missed calls or voicemail messages;
  Icon 218 for e-mail client module 140, labeled "Mail," which optionally includes an indicator 210 of the number of unread e-mails;
  Icon 220 for browser module 147, labeled "Browser;" and
  Icon 222 for video and music player module 152, also referred to as IPOD (trademark of APPLE Inc.) module 152, labeled "iPod;" and
Icons for other applications, such as:
  Icon 224 for IM module 141, labeled "Messages;"
  Icon 226 for calendar module 148, labeled "Calendar;"
  Icon 228 for image management module 144, labeled "Photos;"
  Icon 230 for camera module 143, labeled "Camera;"
  Icon 232 for online video module 155, labeled "Online Video"
  Icon 234 for stocks widget 149-2, labeled "Stocks;"
  Icon 236 for map module 154, labeled "Maps;"
  Icon 238 for weather widget 149-1, labeled "Weather;"
  Icon 240 for alarm clock widget 149-4, labeled "Clock;"
  Icon 242 for health module 142, labeled "Health;"
  Icon 244 for notes module 153, labeled "Notes;"
  Icon 246 for a settings application or module, which provides access to settings for device 100 and its various applications; and
  Other icons for additional applications, such as App Store, iTunes, Voice Memos, and Utilities.

Figures 2, 5A:
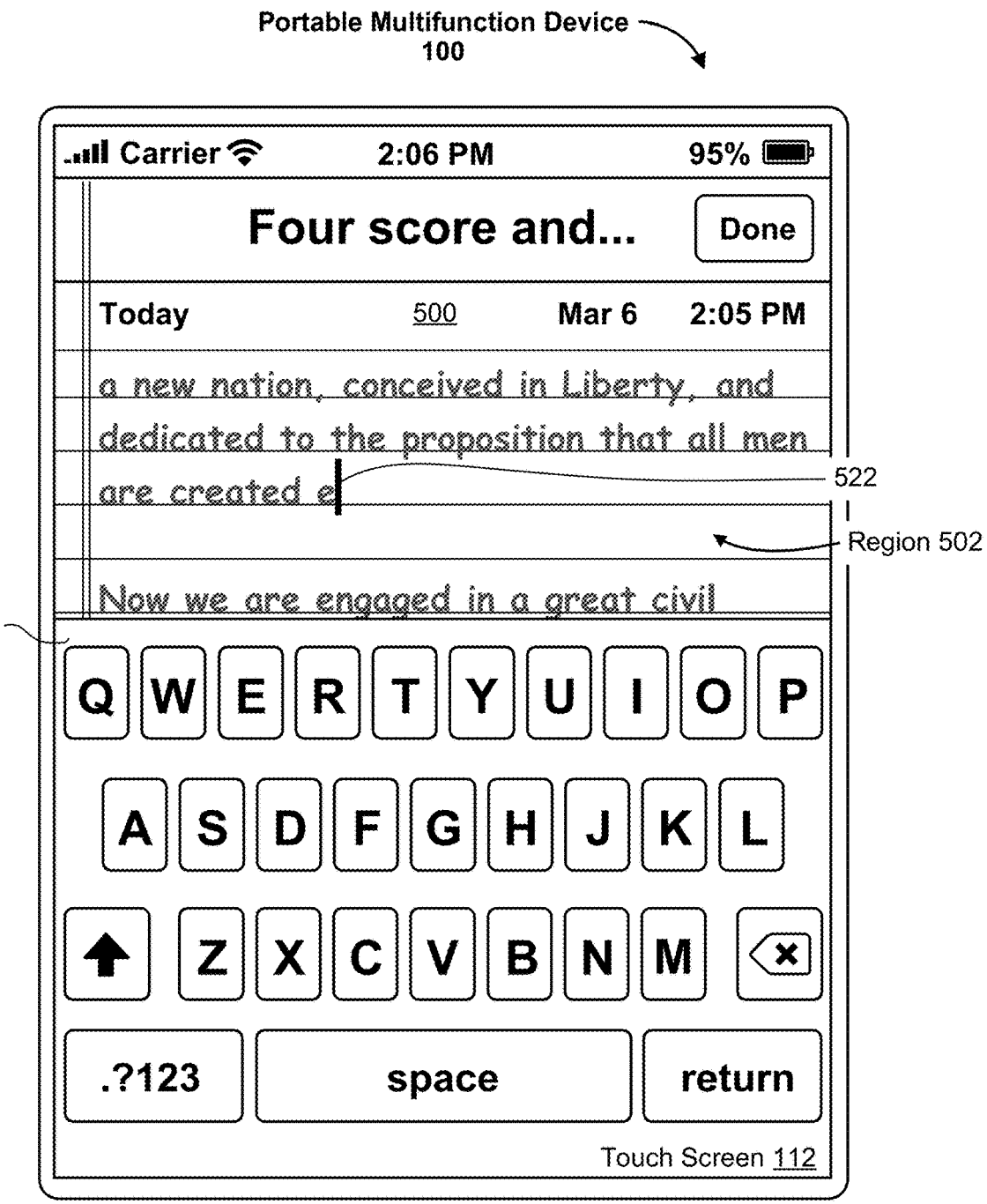

It should be noted that the icon labels illustrated in FIG. 2 are merely examples. Other labels are, optionally, used for various application icons. For example, icon 242 for health module 142 is alternatively labeled "Fitness Support," "Workout," "Workout Support," "Exercise," "Exercise Support," or "Fitness." In some embodiments, a label for a respective application icon includes a name of an application corresponding to the respective application icon. In some embodiments, a label for a particular application icon is distinct from a name of an application corresponding to the particular application icon.

User Interfaces and Associated Processes

Attention is now directed towards embodiments of processes and associated user interfaces ("UI") that may be implemented on an electronic device with a display, a touch-sensitive surface, and optionally one or more sensors to detect intensities of contacts with the touch-sensitive surface, such as the portable multifunction device 100.

Figure 4:
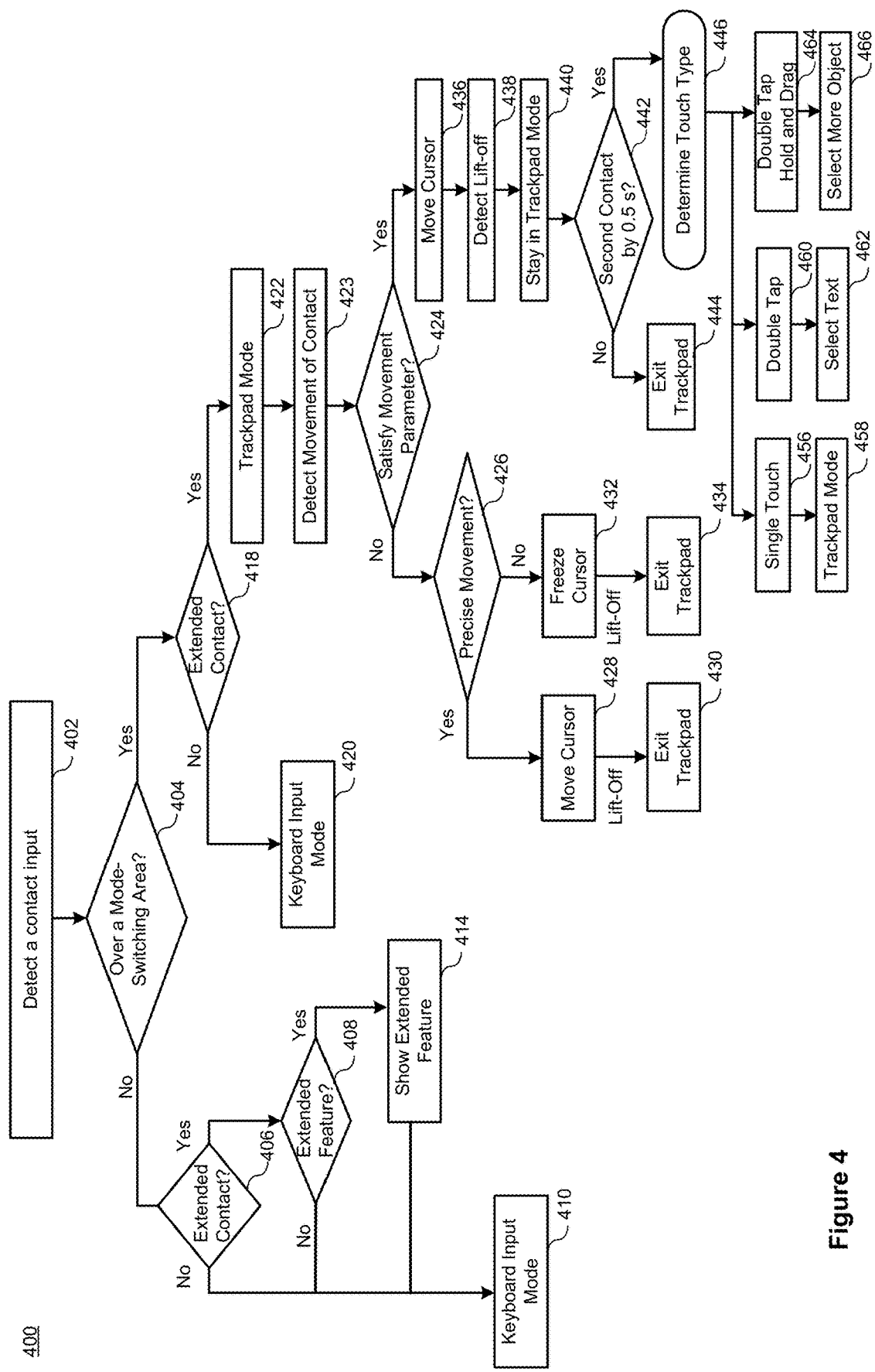
FIG. 4 is a flowchart illustrating a method of activating a trackpad mode using an extended contact over a virtual keyboard, in accordance with some embodiments.

FIG. 4 is a flow chart illustrating a method 400 of activating a trackpad mode using an extended contact over a virtual keyboard on a touch-sensitive display, in accordance with some embodiments. The method 400 is performed at a portable multifunction device (e.g., the device 100 in FIG. 1A) with a touch-sensitive display (e.g., the touch screen 112 in FIG. 1A). As described below, the method 400 does not require the portable multifunction device to include a contact intensity sensor (e.g., a force sensor, or a pressure sensor), thus reducing the cost for designing and manufacturing the portable multifunction device. The method is also intuitive to a user, thereby reducing the number, extent, and/or nature of the inputs from the user when activating the trackpad mode, and creating a more efficient human-machine interface. A more efficient input mechanism also requires less computing resources, thereby increasing battery life of the device.

FIGS. 5A-1 to 5K-6 illustrate example user interfaces for activating a trackpad mode using an extended contact over a virtual keyboard (e.g., over the spacebar key on the virtual keyboard), in accordance with some embodiments. The user interfaces in FIGS. 5A-1 to 5K-6 are used to illustrate the processes described with respect to FIG. 4 and FIGS. 6A-6F. Some of the FIGS. 5A-1 to 5K-6 further include schematic diagrams illustrating the passage of time to help explain certain time-dependent features, and this representation of passage of time is an example only and further is not something that is displayed on the electronic device during its operation.

In FIG. 5A-1, editable content 500 is displayed in a content presentation region 502 while an application (e.g., notes application 153 or message application 141) is in a text-editing mode. In some embodiments, the content 500 in the content presentation region 502 comprises text (e.g., plain text, unstructured text, formatted text, or text in a web page). In other embodiments, the content comprises graphics with or without text. Moreover, the content may be editable or read-only. In addition to displaying the content, when no content is selected, the device 100 may display a cursor (e.g., cursor 522) within the electronic document, e.g., for text entry, selection, and manipulation.

As shown in FIG. 5A-1, in the text-editing mode, an onscreen keyboard 521 (e.g., also referred to as a virtual keyboard, or a soft keyboard) is displayed for text inputs. A user may enter text by touch inputs (also referred to as contact inputs) on the virtual keyboard 521. The user may further confirm completion of the editing by performing another touch input (e.g., a tap on "done" button 504) to exit the text-editing mode and to cease displaying the virtual keyboard 521.

FIG. 5A-1 also shows display of an insertion marker (e.g., cursor 522), which indicates a current location to which input provided at the virtual keyboard will be directed. In some embodiments and as shown in FIG. 5A-1, the keyboard 521 has multiple virtual keys and each key has a respective symbol that describes the key's function. In addition, in some embodiments, each key is displayed in a way that simulates three-dimensional visual characteristics (e.g., a three-dimensional shape, drop shadow, etc.)

In some embodiments, the application runs on a device 100 that has one or more touch sensors (e.g., capacitive sensor(s)) for measuring proximity, position, or displacement, or acceleration of one or more contacts with the touch-sensitive display. In some embodiments, the device 100 continuously monitors touch inputs and continuous movements of the touch inputs on the touch screen 112. In some embodiments, the device 100 only has the touch sensors and does not include other sensors for detecting force or pressure of inputs.

Referring to FIGS. 4 and 5A-1, in some embodiments, while displaying the content of the electronic document, the device 100 detects (402) a contact input 510 on the touch-sensitive display of the device 100. The contact input can be made by the user using, e.g., their finger or by using a stylus.

In some embodiments, while displaying the virtual keyboard 521 on at least a portion of the touch screen display, the device 100 determines (404) whether the contact input is detected over a mode-switching area of the virtual keyboard 521 that is associated with activation of a trackpad mode. For example, upon detecting an extended contact (e.g., for at least an extended-contact-duration threshold, such as 0.25 seconds) over the mode-switching area, the device 100 (e.g., using the input switching module 163-3, FIG. 1A) switches the keyboard 521 to a soft trackpad (also referred to as a virtual trackpad, an onscreen trackpad.)

In some embodiments, the mode-switching area corresponds to a displayed representation of the spacebar key. In some embodiments, the mode-switching area corresponds to a non-character key (e.g., a language switching key or a microphone activation key) that is not associated with an extended keyboard function (e.g., an extended contact over the non-character key activates the same function as a momentary contact over that key). In some embodiments, a UI object (e.g., an affordance or a virtual button) displayed on the touch screen display of the device 100 and distinct from a key of the virtual keyboard is used as the mode-switching area. In some embodiments, an area that does not include any displayed representations of keys and that can be visually distinct from the displayed representations of the keys of the virtual keyboard, such as an area 506 between the spacebar on the virtual keyboard and the lower edge of the touch screen display, is used as the mode-switching area. In some embodiments, when the device 100 displays a non-alphanumeric virtual keyboard, such as an Emoji keyboard, the device 100 can use the area 506 as the mode-switching area (or a portion of the area 506, such as that portion that borders a bottom edge of the touch-sensitive display). For simplicity of illustration and explanation only, and without limiting the scope of this disclosure, the displayed representation of the spacebar key of the keyboard 521 is the primary example mode-switching area in FIGS. 5A-1 to 5K-6. The other examples described in this paragraph as mode-switching areas could be used in place of or in addition to use of the displayed representation of the spacebar key as a mode-switching area (e.g., in conjunction with the method 600 discussed in detail below). In some embodiments, the spacebar key includes a displayed symbol (e.g., "space") as shown in FIG. 5A-1. In some alternative embodiments, the spacebar key does not include a displayed symbol.

In some embodiments, upon detecting (402) the contact input 510, the device 100 determines that the contact input 510 is over a virtual key corresponding to letter "e," which is not part of the mode-switching area for activating the trackpad mode (404—No). As shown in FIG. 5A-1, in response to detecting the contact input 510 on the letter "e" key, the device 100 further displays a preview area 512 that extends from the corresponding key to provide a preview of an entry of the letter "e."

The device 100 further determines (406) whether the contact input is an extended contact. For example, the device 100 determines whether the contact input 510 has a duration for longer than or equal to an extended-contact-duration threshold. In some embodiments, the extended-contact-duration threshold is selected to be any suitable time period that allows the device to distinguish extended contacts from momentary contacts, one example of a suitable time period is 0.25 seconds. As shown in FIG. 5A-1, a timer is used for illustrating a duration of the contact input 510. In the current example, the device 100 detects that the contact input 510 has a duration of 0.03 seconds since the initial contact 510.

In some embodiments and as shown in FIG. 5A-2, in accordance with a determination that the contact input 510 is not an extended contact (406—No, FIG. 4), the keyboard input mode remains (410). For example, because the duration of the contact 510 is shorter than the extended-contact-duration threshold, the contact input 510 is determined to be a momentary contact (e.g., a short and single tap). In some embodiments, the keyboard input mode includes entering content corresponding to the contact input when the device detects that the contact input has ceased (e.g., a finger lift-off) within the predetermined time threshold. For example, as shown in FIG. 5A-2, when the device 100 determines that the contact input 510 has ceased (e.g., a finger lift-off) after the contact 510 was on the display for 0.03 seconds, the device 100 adds the letter "e" to the region 502.

Figure 5B:
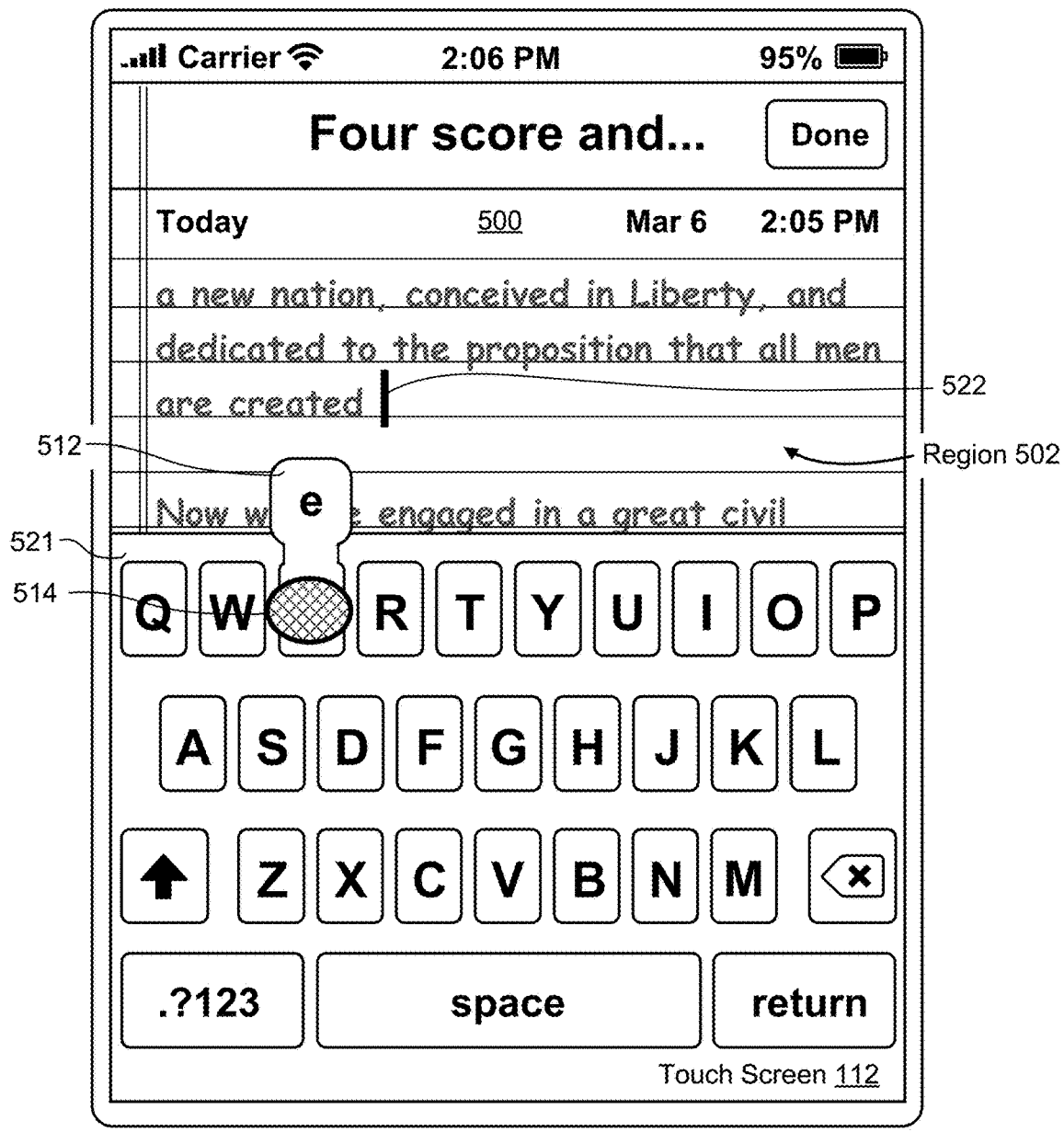
Figure 1:
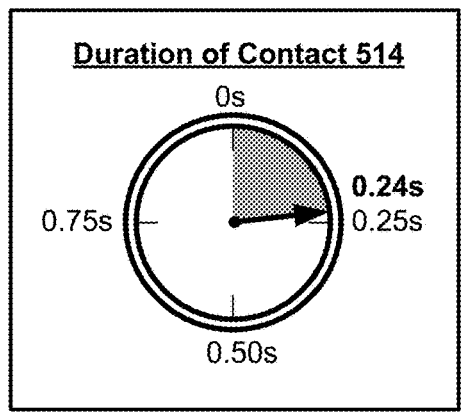
Figure 5B:
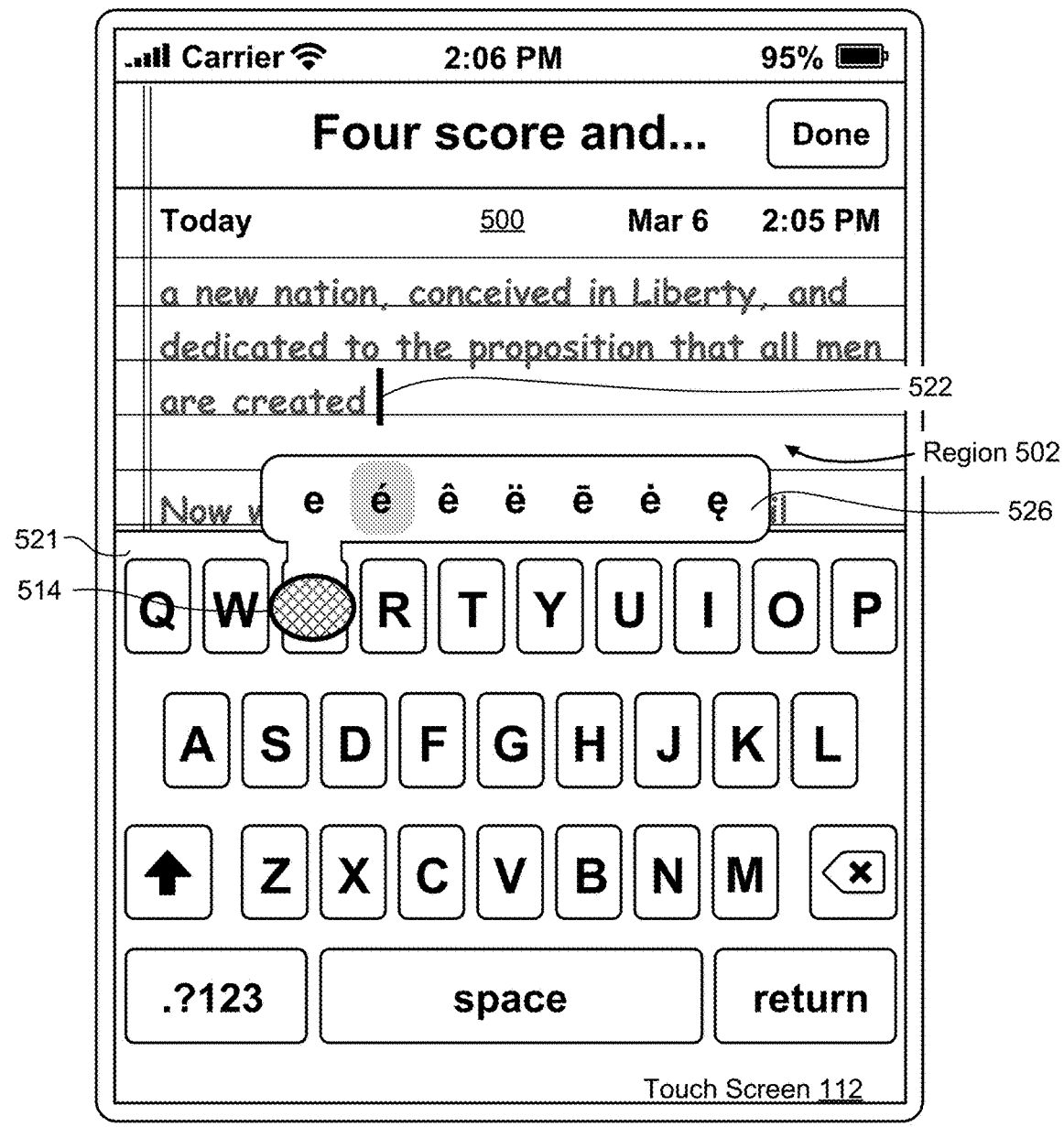
Figure 2:
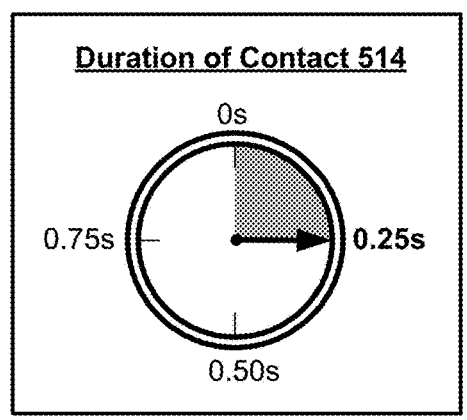
Figures 3, 5B:
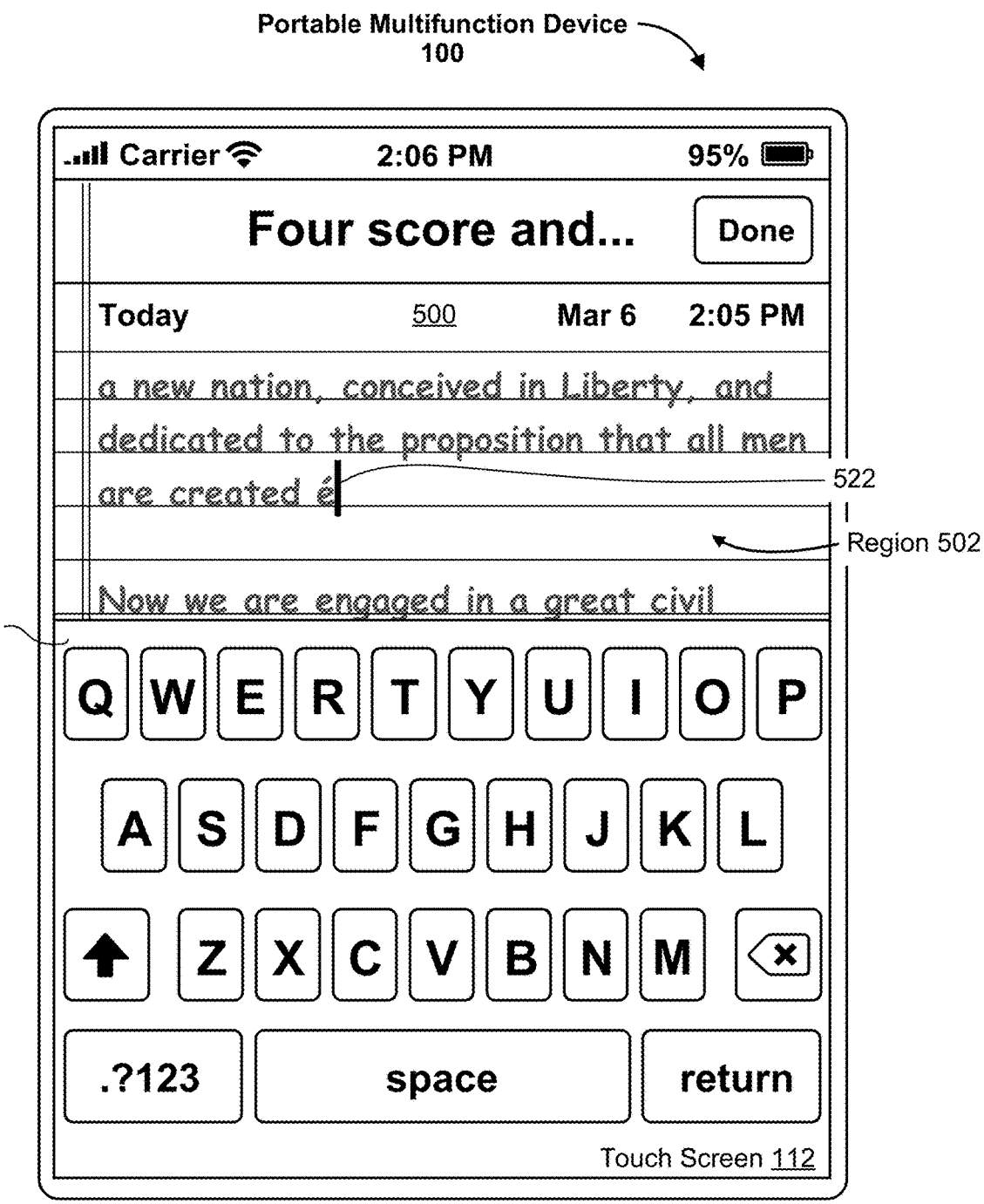

In some embodiments and as shown in FIG. 5B-1 when the device 100 detects that the duration of the contact input (e.g., contact input 514) on the touch-sensitive display is 0.24 seconds, the device 100 determines that the contact input 514 is still not an extended contact, and thus displays the preview area 512 of the letter (e.g., letter "e") of the corresponding touched key. When the contact input 514 lasts for more than or equal to the extended-contact-duration threshold, e.g., 0.25 seconds in FIG. 5B-2, the device 100 determines that the contact input (e.g., contact input 514, FIG. 5B-2) is an extended contact (406—Yes, FIG. 4). The device 100 then proceeds to determine (408) whether the key over which the contact 514 is received is associated with an extended keyboard function or not. In some embodiments, the extended keyboard function includes displaying a set of accented letters. The extended feature can include any other suitable features associated with different keys on the virtual keyboard.

In some embodiments, as shown in FIG. 5B-2, in accordance with a determination that the key (e.g., the "e" key in the depicted example) is associated with an extended keyboard function (408—Yes, FIG. 4), the device 100 displays (414) an extended feature bar 526 listing a set of accented marks associated with the "e" key. The device 100 is in keyboard input mode (410) to enter an accented letter selected from the extended feature bar 526. In some embodiments, the user can move the input 514 to select a certain accented letter within the extended feature bar 526. As shown in FIG. 5B-3, upon detecting a lift-off from the touch-sensitive display (and without the user having moved input 514 to select an accented letter option), the device 100 actuates the "e" key and ceases to display the extended feature bar 526 (as is shown in FIG. 5B-3).

Figure 5C:
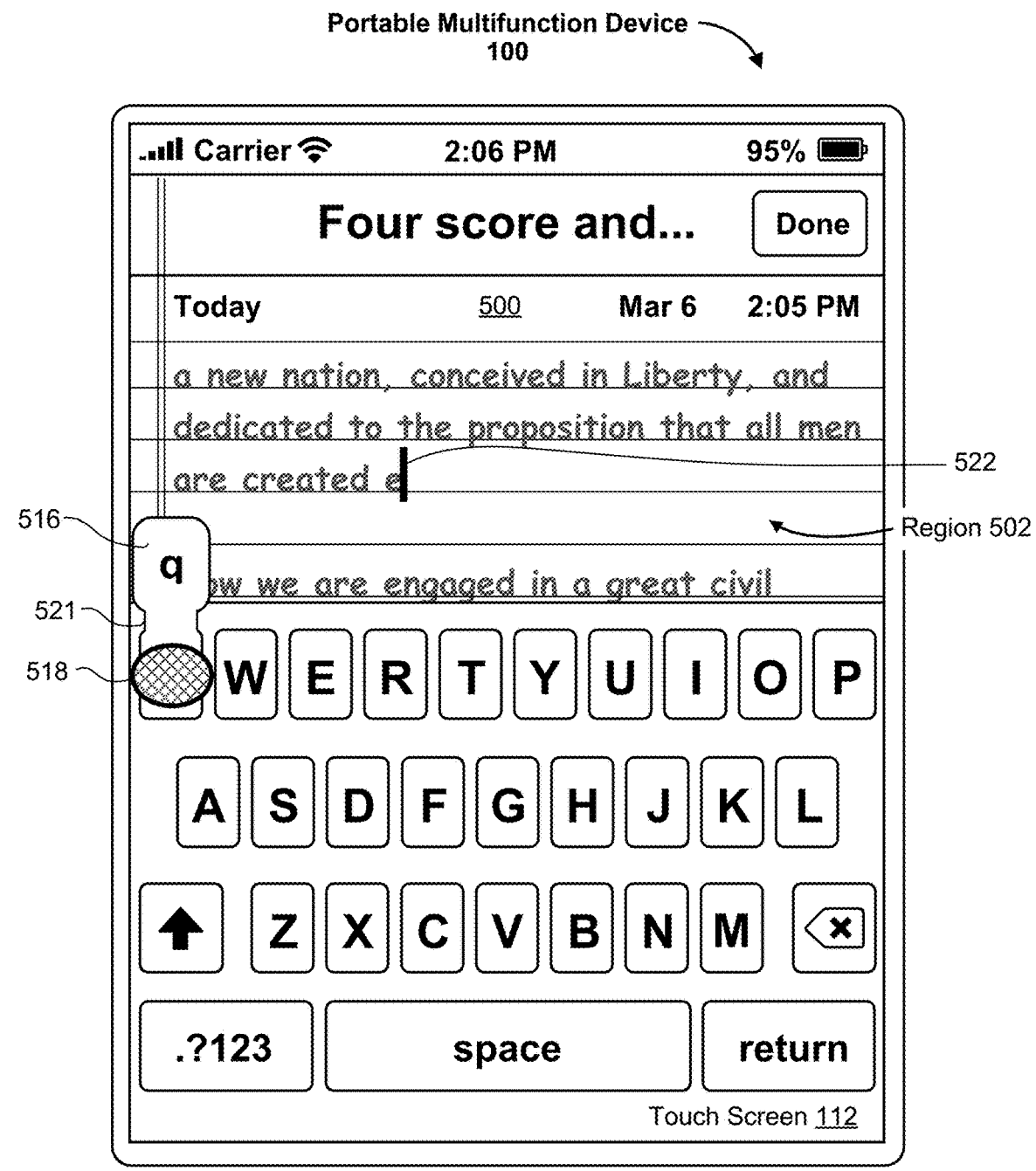
Figure 1:
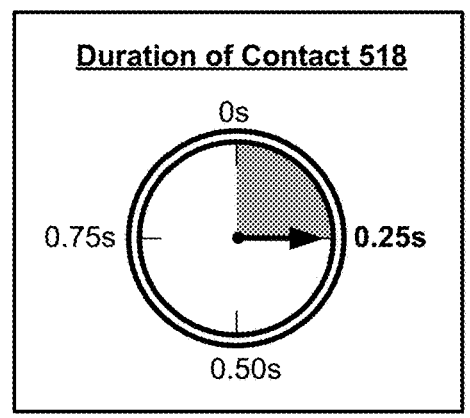
Figures 2, 5C:
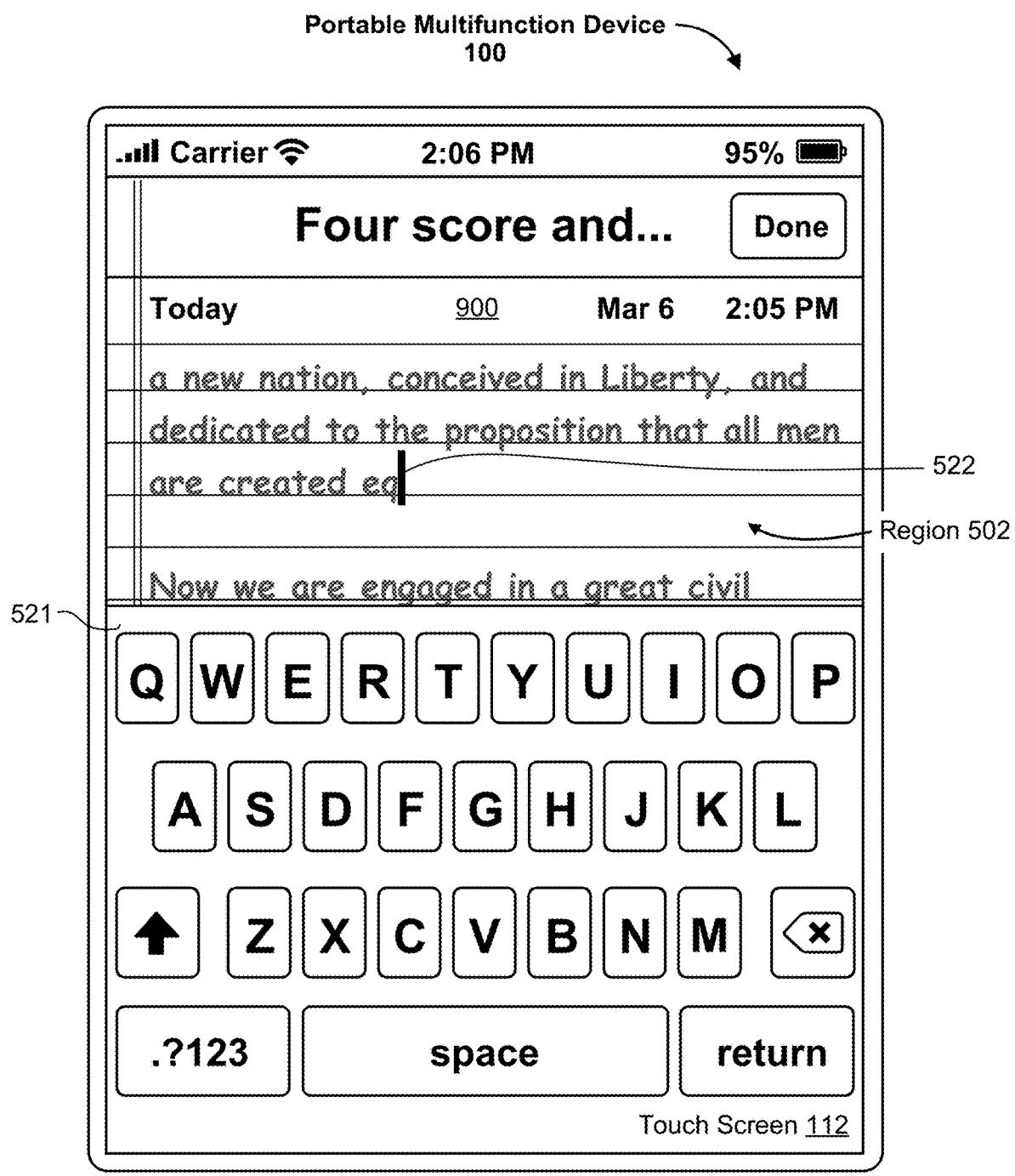

In some embodiments, as shown in FIG. 5C-1, in accordance with a determination that the letter corresponding to the contact input (e.g., contact input 518) does not have an associated extended keyboard function (408—No, FIG. 4), the device 100 remains in the keyboard input mode (410) and does not show any extended keyboard feature/function for that key. For example, although the contact input 518 on the virtual key corresponding to the letter "q" lasts for a duration of 0.25 seconds, which equals the example extended-contact-duration threshold discussed above, the device 100 still displays the preview area 516 of the letter "q" because the letter "q" is not associated with an extended keyboard function in this ongoing example. As shown in FIG. 5C-2, upon detecting a lift-off of the contact 518 from the touch-sensitive display, the device enters the adds "q" to the content presentation region 502.

In some embodiments, in response to detecting a contact input (e.g., contact input 530, FIG. 5D-1), the device 100 determines that the contact input 530 is over the mode-switching area (e.g., over a displayed representation of the spacebar key) on the virtual keyboard (404—Yes, FIG. 4). In some embodiments, as shown in FIG. 5D-1, upon a detection of the contact input 530 over the displayed representation of the spacebar, the device further highlights the spacebar (e.g., by changing edges of the spacebar to appear in bolded lines or changing a color of the spacebar).

In some embodiments, the device 100 determines (418) whether the contact input 530 on over the mode-switching area is an extended contact. In some embodiments, the device 100 compares a duration of the contact input 530 (e.g., 0.03 seconds in FIG. 5D-1) with an extended-contact-duration threshold to determine whether the contact input 530 is an extended contact or not.

Figures 1, 5D:
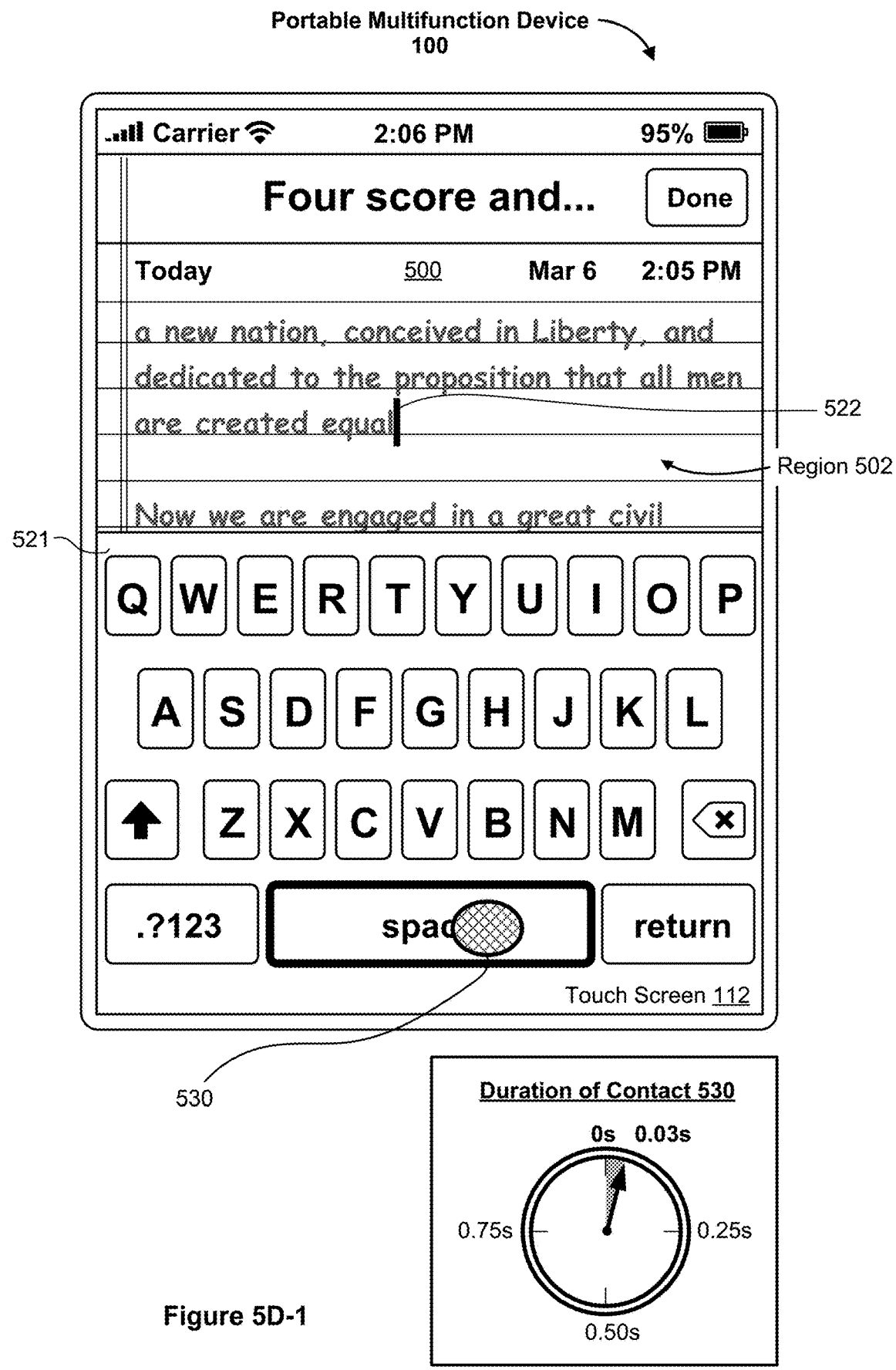
Figures 2, 5D:
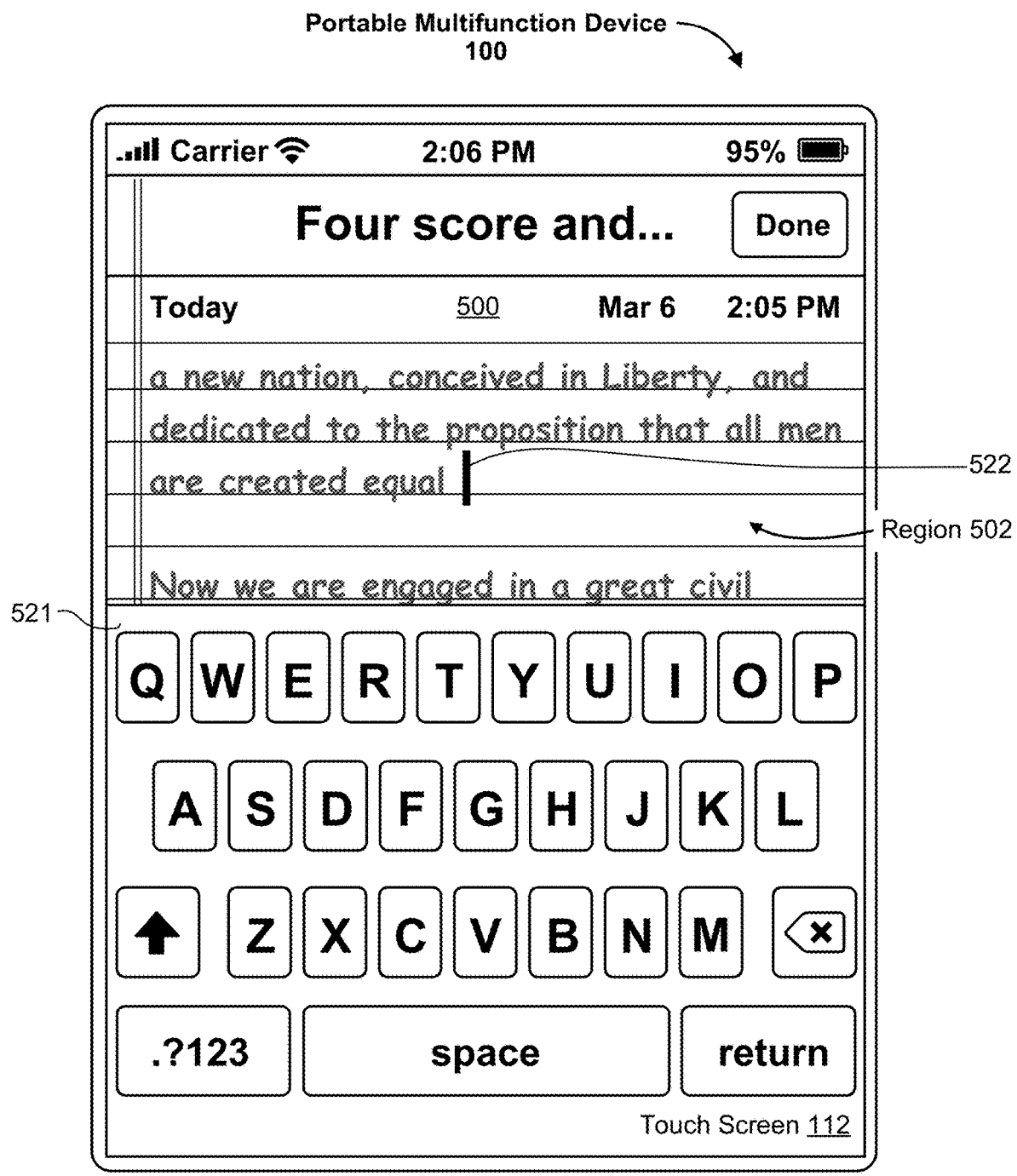

In some embodiments, as shown in FIG. 5D-2, the device detects a lift-off of the contact 530 from the touch-sensitive display. Because the duration of the contact input 530 in FIG. 5D-1 is shorter than the extended-contact-duration threshold, the device 100 determines that the contact input 530 is not an extended contact (418—No, FIG. 4). The device 100, therefore, remains in the keyboard input mode (420). For example, as shown in FIG. 5D-2, when the device 100 determines that the contact input 530 is a short and single tap on the spacebar, the device 100 adds a space into the content presentation region 502 and remains in the keyboard-input mode.

Figures 1, 5E:
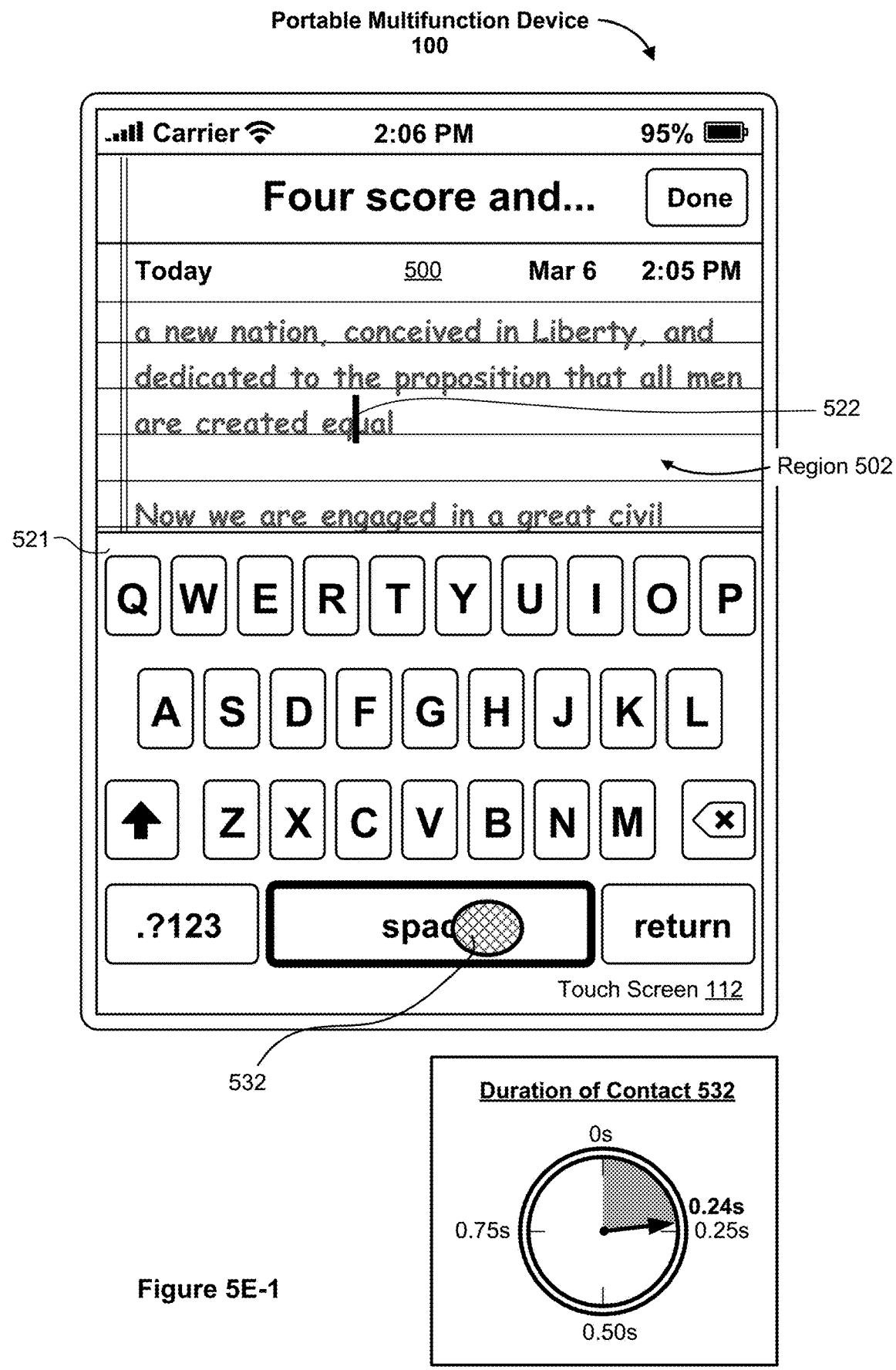
Figures 2A, 5E:
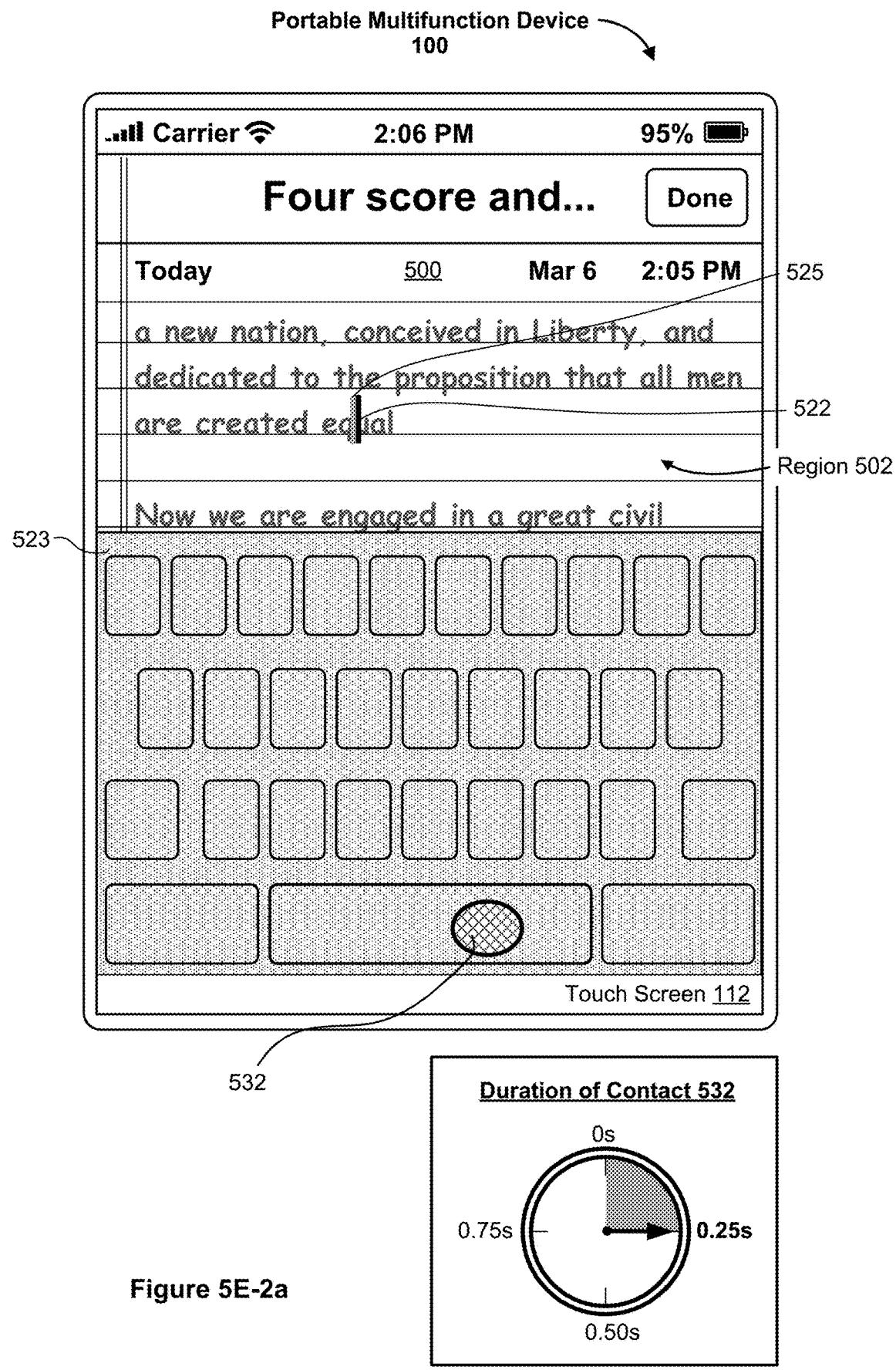
Figures 2B, 5E:
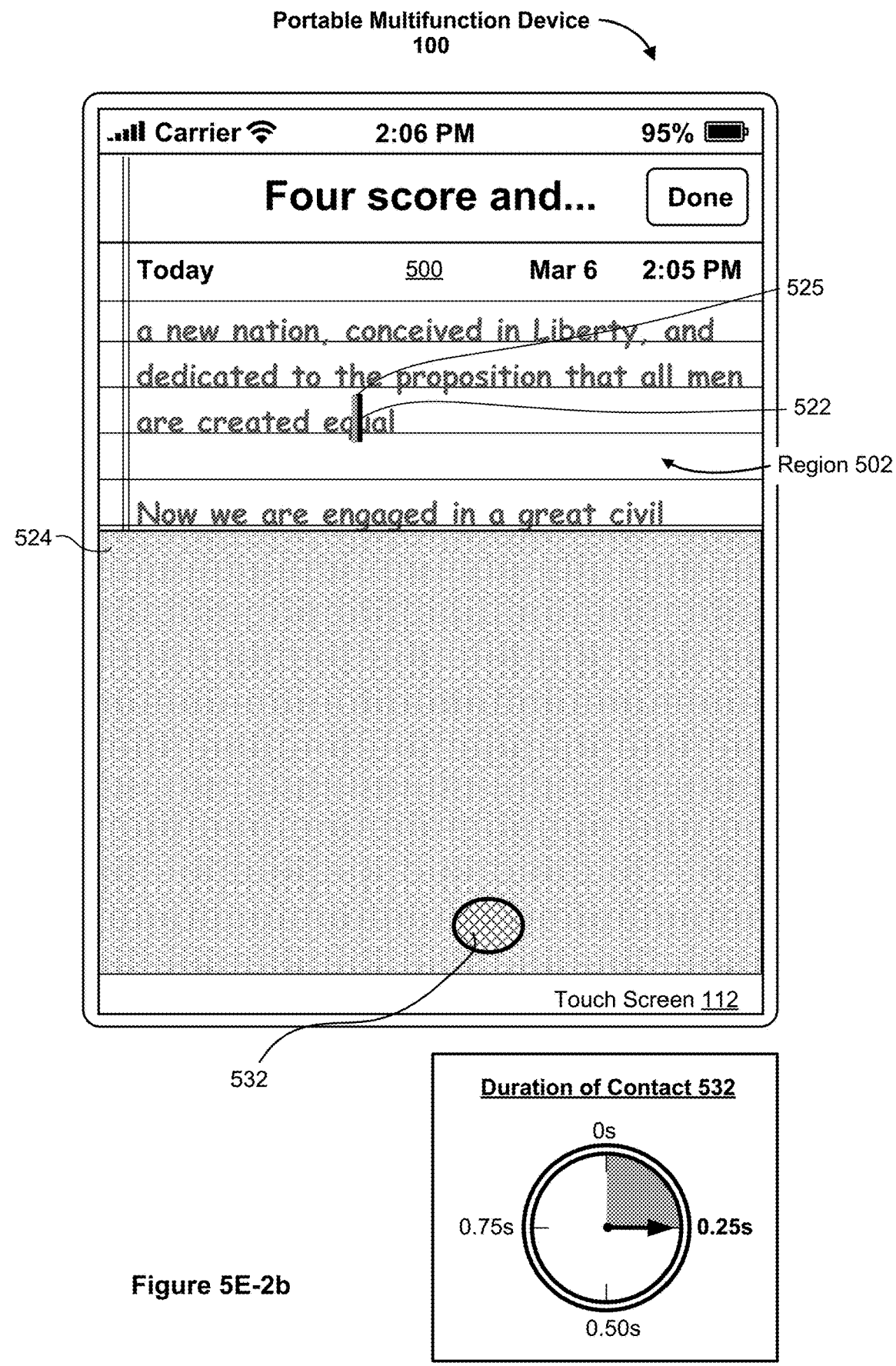
Figures 3, 5E:
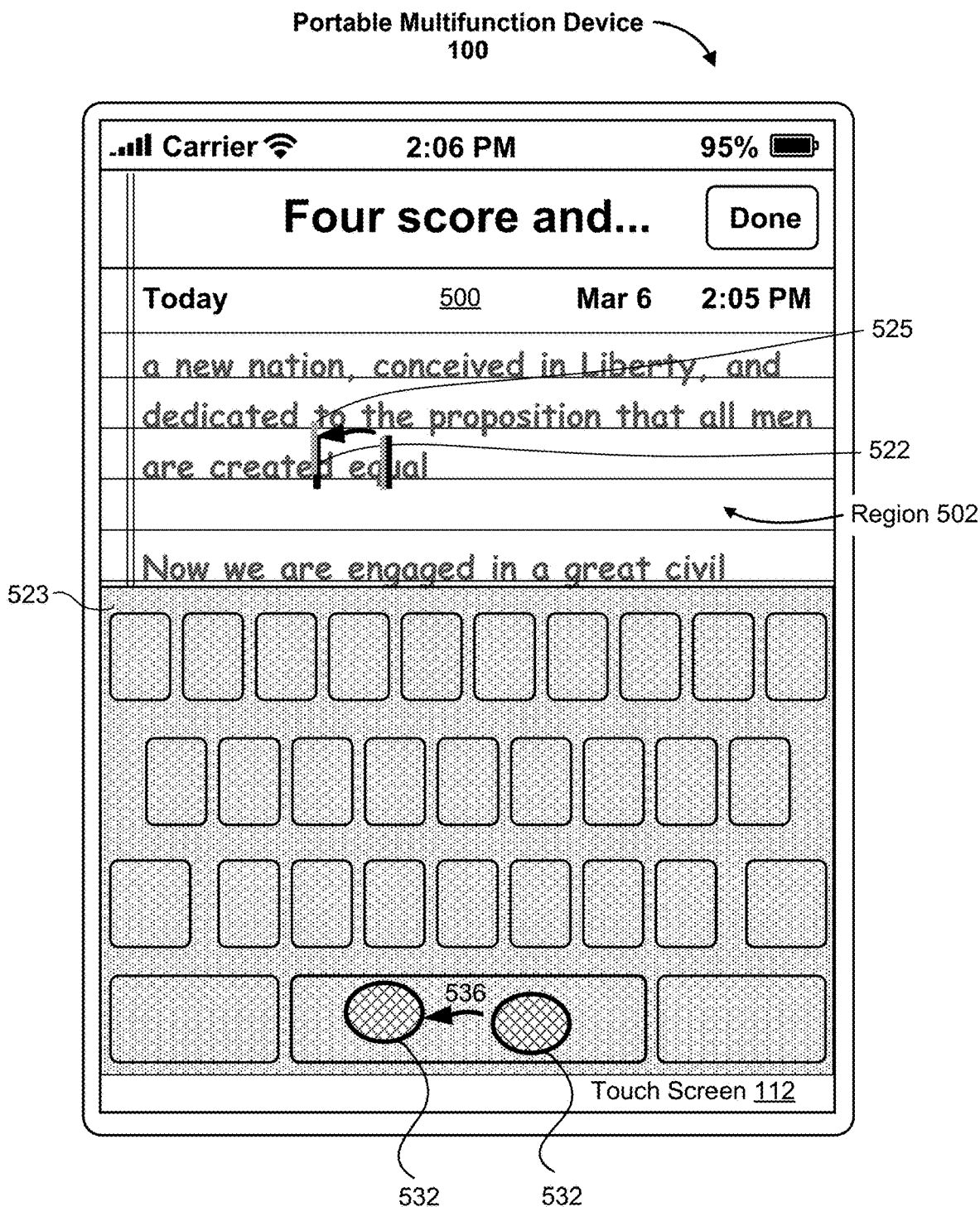
Figures 4, 5E:
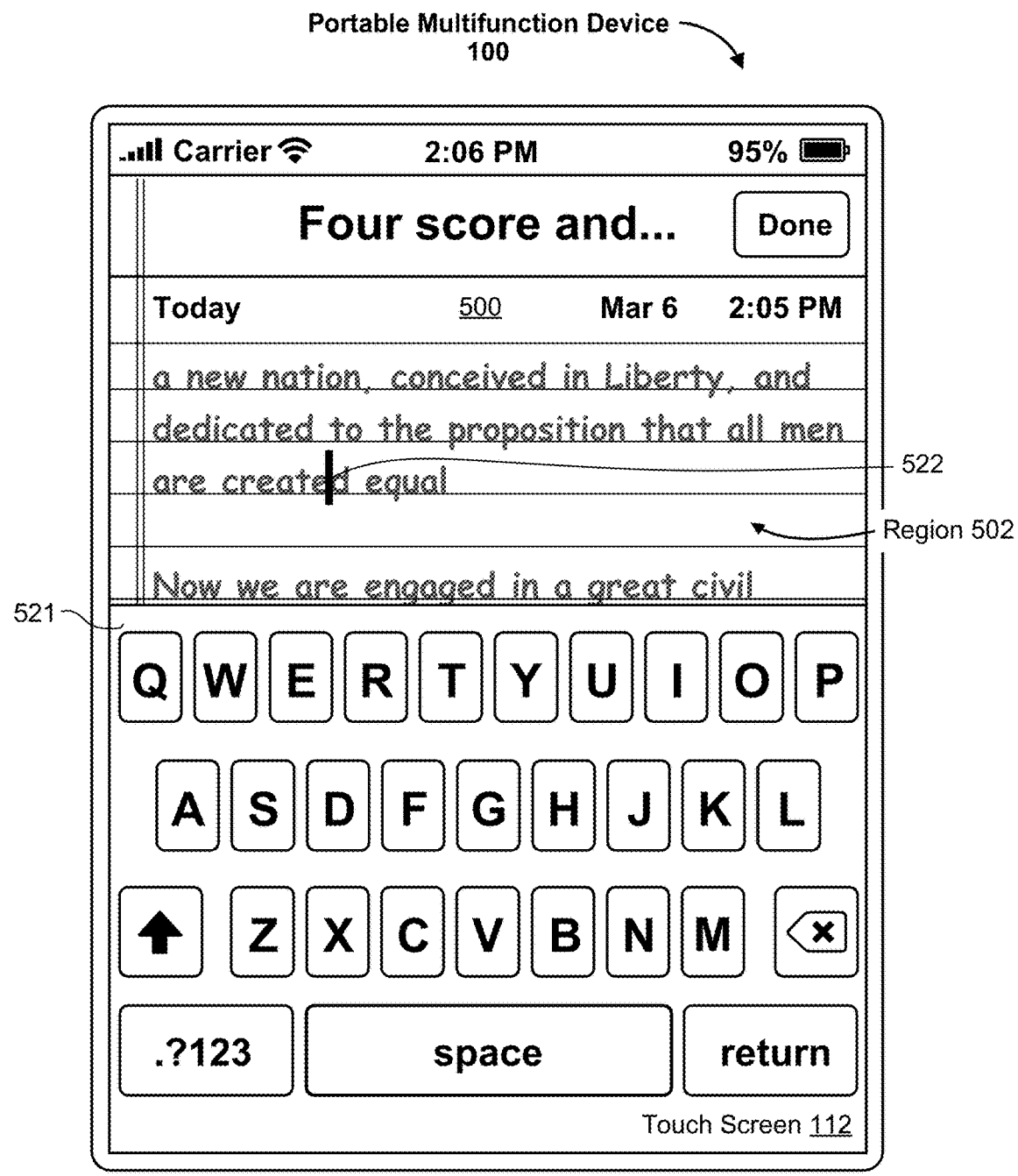

In some embodiments, as shown in FIG. 5E-1, when the device 100 detects that a contact input (e.g., contact input 532) remains on the spacebar for 0.24 seconds without a lift-off from the touch screen, the device 100 determines that the contact input 532 is still not an extended contact. As shown in FIG. 5E-2, when a duration of the contact input 532 reaches 0.25 seconds, which equals to the extended-contact-duration threshold, the device 100 determines that the contact input 532 is an extended contact (418—Yes, FIG. 4). In response, the device 100 (e.g., using the input switching module 163-3, FIG. 1A) switches the input mode from the keyboard mode to a trackpad mode (422). As shown in FIG. 5E-2a, the device 100 alters the virtual keyboard (e.g., ceases to display symbols on the keyboard) upon entering the trackpad mode.

In some embodiments and as shown in FIG. 5E-2a, the soft trackpad 523 may still include key boundaries but no symbols are displayed, to provide the user with a clear visual cue that the device has switched to trackpad mode. In some embodiments and as shown in FIG. 5E-2b, the soft trackpad 524 further removes the boundaries of the virtual keys from the virtual keyboard to simulate the appearance of a trackpad more completely.

In addition, in some embodiments, the color, hue, saturation, brightness, and/or contrast of the virtual keyboard 521 in FIG. 5E-1 is also changed (e.g., to gray and semi-transparent) in the soft trackpad 523 to indicate that the application has entered a mode (i.e., the trackpad mode) that is different from a keyboard input mode. In the trackpad mode, the soft trackpad 523 is not responsive to contact inputs for text entries, but rather serves as an onscreen touchpad or track pad for moving the cursor or for selecting content.

In some embodiments as shown in FIGS. 5E-2a and 5E-2b, once the trackpad mode is activated, the device 100 further displays a ghost cursor 525 offset from the current location of the real cursor 522. In some embodiments, the ghost cursor 525 indicates where the cursor 522 will be located after a lift-off of the finger contact. In some embodiments, the ghost cursor 525 is a modified version of the original cursor 522 displayed on the screen (e.g., the ghost cursor 525 is in grey color, while the original cursor 522 as shown in FIG. 5E-2 is in black color). In some embodiments, the ghost cursor 525 is linked to the real cursor 522, so that when the real cursor 522 moves around the screen, so does the ghost cursor 525. In some embodiments, while the real cursor 522 is moved around the screen by the user, the ghost cursor 525 shows the closest offset position (e.g., to the left or right) for the real cursor 522. When the device 100 detects a lift-off event of the contact input 532, the real cursor 522 replaces the ghost cursor 525 at the position of the ghost cursor 525 when the lift-off event occurred.

In some embodiments, after entering the trackpad mode (422), the device 100 detects (423) a movement of the contact input. For example, as shown in FIG. 5E-3, the device 100 detects a movement 536 of the contact input 532 on the trackpad 523.

In some embodiments, in response to detecting the movement 536 of the contact input 532, the device 100 determines (424) whether the contact input 532 satisfies one or more predetermined movement parameters. In some embodiments, the one or more predetermined movement parameters include a predetermined distance threshold, e.g., movement of inch across the touch-sensitive display. In some embodiments, the one or more predetermined movement parameters include a predetermined moving speed threshold of the cursor, e.g., 5 pixels/second of movement across the touch-sensitive display.

Use of these movement parameters allows the device to decide when the trackpad mode should be exited and when it should be maintained, as is discussed in more detail below.

In some embodiments, the device 100 determines that the movement of the contact input 532 does not satisfy the one or more predetermined movement parameters (424—No, FIG. 4). For example, as shown in FIG. 5E-3, the device 100 detects that the movement 536 of the contact input 532 on the soft trackpad 523 corresponds to a movement of less than 1 inch across the touch-sensitive display and that the speed of the movement is less than 5 pixels/second. Thus the movement 536 of the contact input 532 in FIG. 5E-3 does not satisfy the predetermined movement parameters.

In some embodiments, the device 100 further proceeds to determine (426) whether the movement 536 of the contact input 532 is a precise movement corresponding to a user's intention to precisely place the cursor at a specific location on the content presentation region 502. In some embodiments, the device 100 determines whether a moving speed of the contact input 532 is equal to or below a threshold, such as 5 pixels/second. If so, the device 100 determines that the movement 536 of the contact input 532 is a precise movement (426—Yes, FIG. 4). For example, the device 100 determines that the user intends to precisely place the cursor at a specific location (e.g., between the letters "e" and "d" of the word "created") by the movement 536 of the contact input 532 on the soft trackpad 523. As shown in FIG. 5E-3, in response to the finger movement 536 on the soft trackpad, the ghost cursor 525 and the actual cursor 522 move (428) 4 characters to the intended location in the content presentation region 502.

In some embodiments and as shown in FIG. 5E-4, in response to detecting a lift-off event following the precise movement 536 in FIG. 5E-3, the device 100 immediately exits (430) the trackpad mode to display the virtual keyboard 521. There is no delay in switching from the soft trackpad 523 to the soft keyboard 521, because the user has carefully placed the cursor and is not likely to want to remain in the trackpad mode any longer. In some embodiments, the actual cursor 522 stays at where the actual cursor 522 is when the lift-off event occurs and the ghost cursor 525 disappears.

Figures 1, 5F:
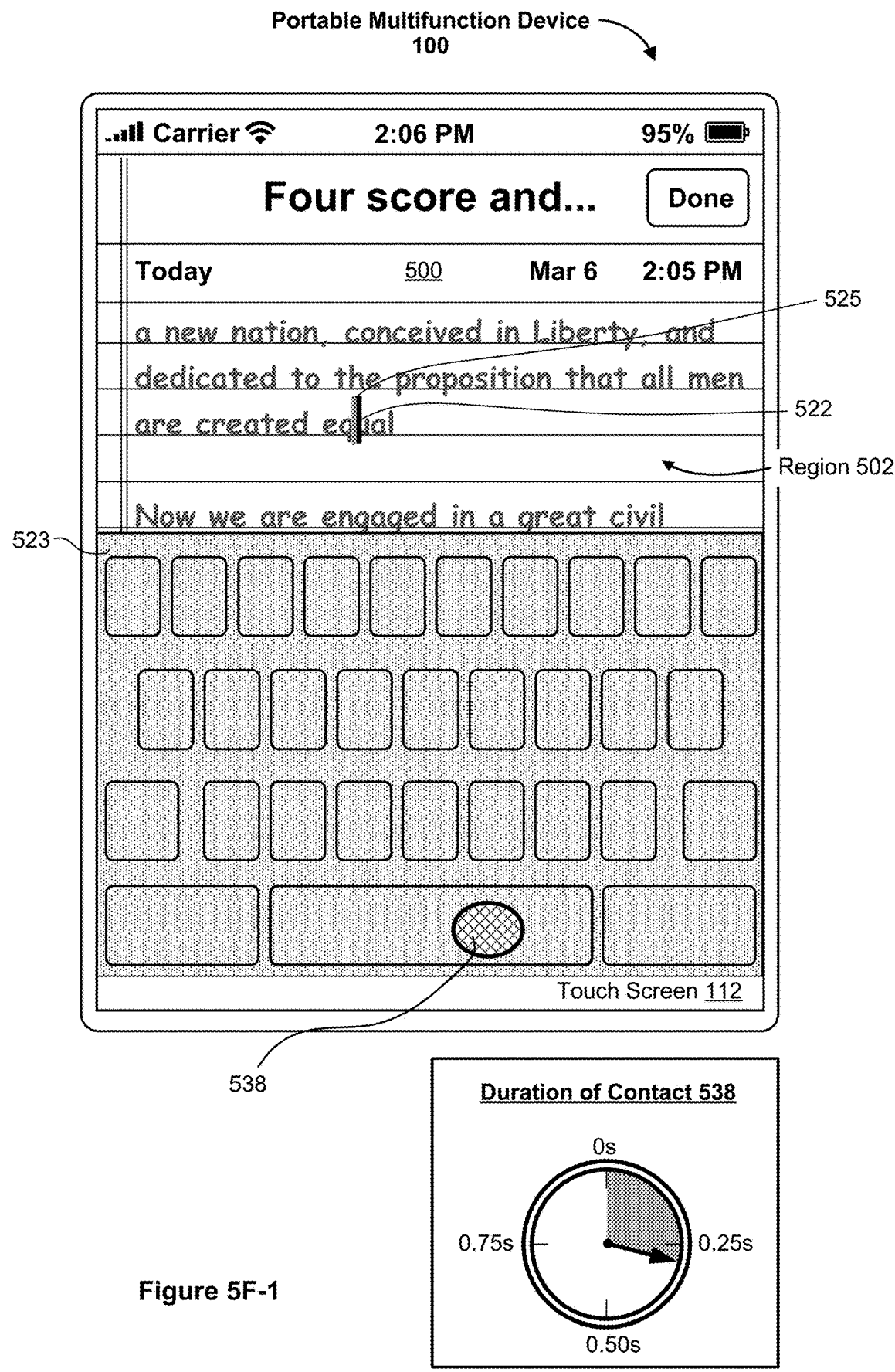
Figures 2, 5F:
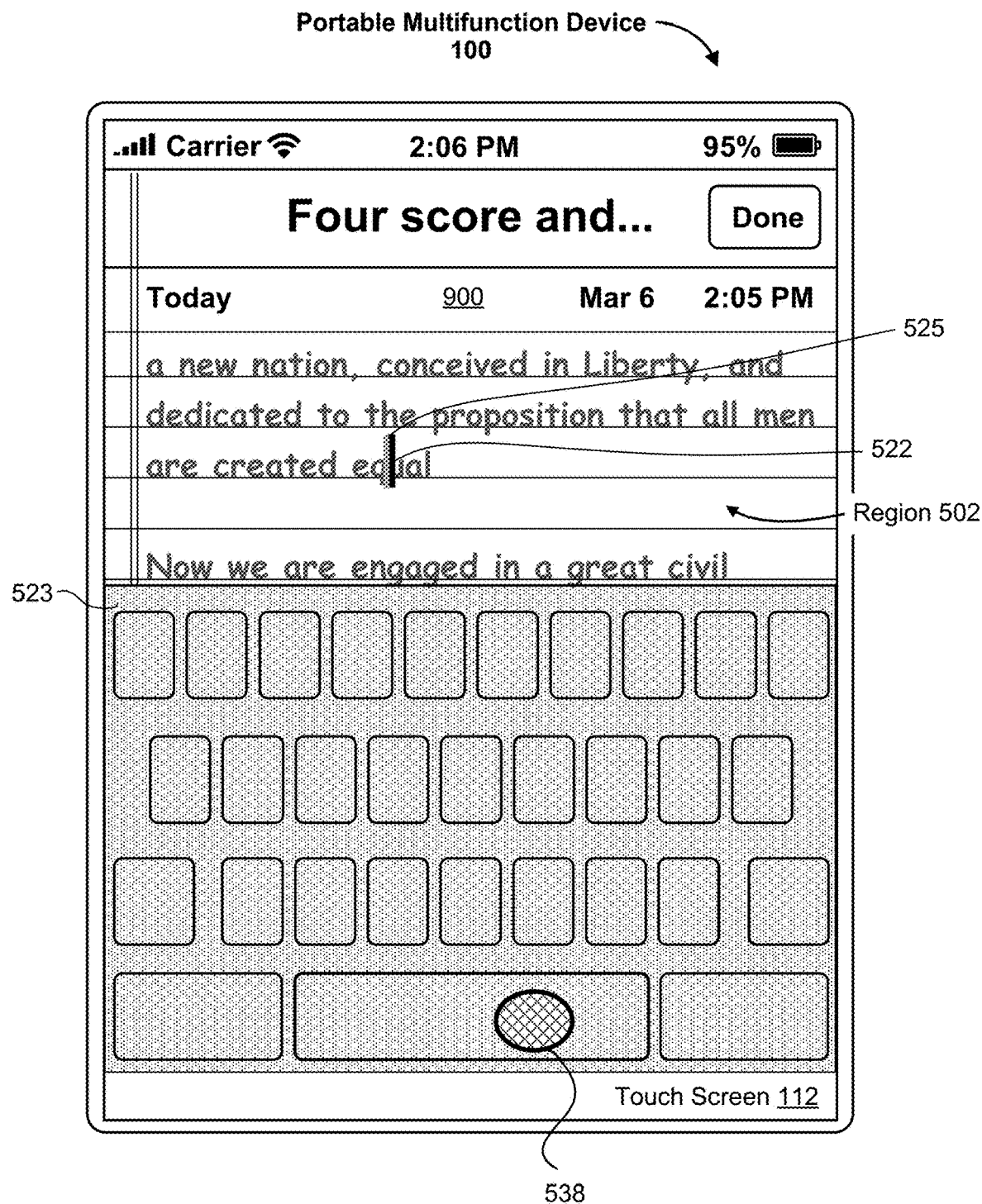
Figures 3, 5F:
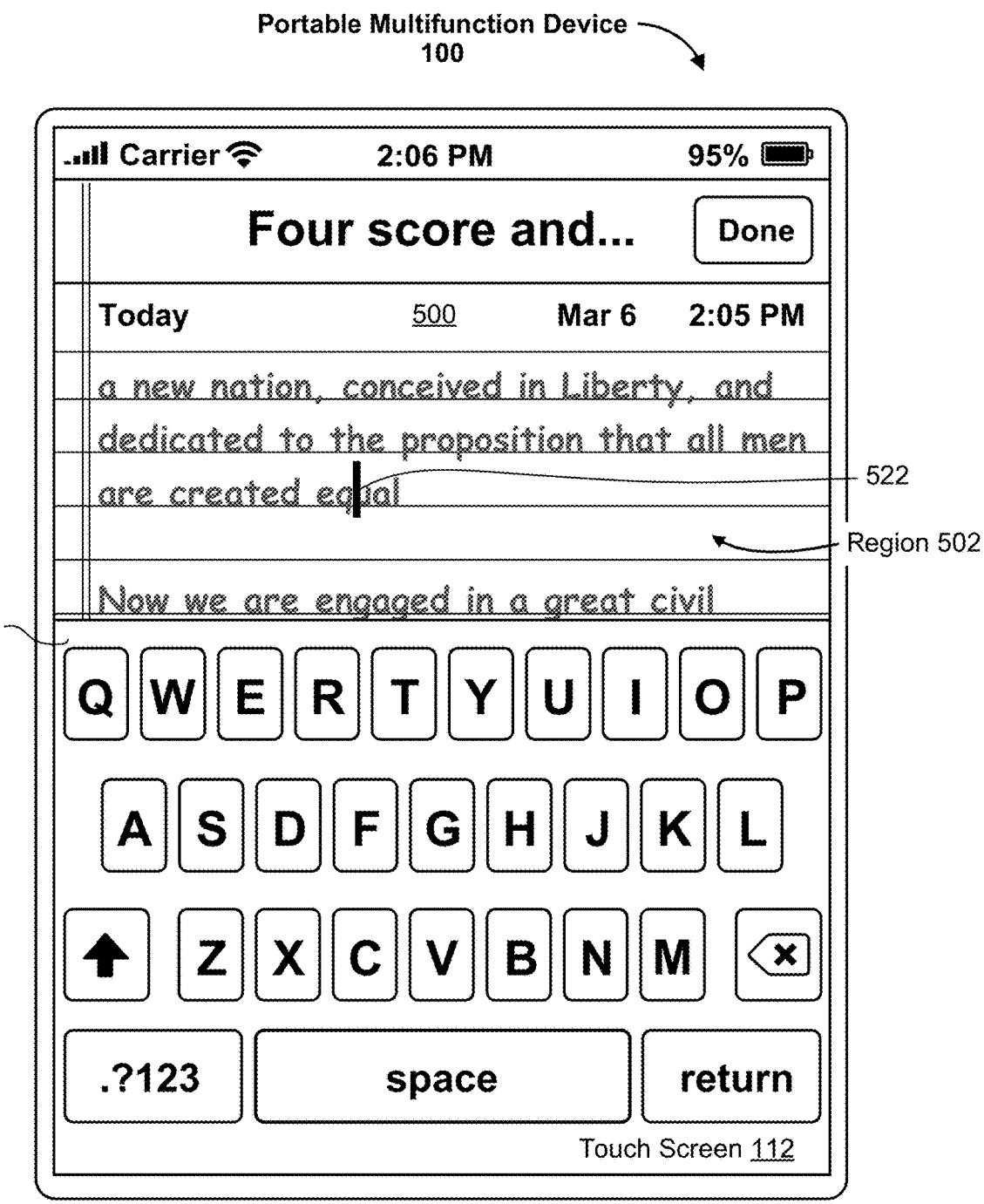

In some embodiments and as shown in FIG. 5F-1, after the device 100 detects that a duration of a contact 538 is longer than the extended-contact-duration threshold (e.g., 0.25 seconds), the contact 538 is determined to be an extended contact and the trackpad mode is activated. The device 100 determines whether the contact input 538 is static or whether a movement of the contact input 538 is a precise movement (e.g., whether a movement of the cursor by the contact input is below the predetermined minimum movement threshold (e.g., 1 inch)). For example, as shown in FIG. 5F-2, if no movement is detected, the device 100 determines that the contact input 538 does not have a precise movement component (426—No, FIG. 4). For example, the user may accidentally activate the trackpad mode by pressing the spacebar for an extended period of time with no intention to use the soft trackpad 523. In response, the device 100 freezes (432) the actual cursor 522 and the ghost cursor 525 without incurring any movement in the content presentation region 502.

In some embodiments as shown in FIG. 5F-3, in response to detecting a lift-off of the contact input 538, the device 100 immediately exits (434) the trackpad mode to display the virtual keyboard 521. There is no delay in switching from the soft trackpad 523 to the soft keyboard 521. In some embodiments, the actual cursor 522 stays at where the actual cursor 522 is when the lift-off event occurs and the ghost cursor 525 disappears.

In an alternative embodiment distinct from FIG. 5F-3, in response to detecting a lift-off event for the static contact input 538, instead of exiting the trackpad mode, the device 100 remains in the trackpad mode (e.g., also referred to as a trackpad sticky mode). The static contact input 538 may be used to activate the trackpad stickiness mode, such that the soft trackpad can be preserved for a certain period of time (e.g., 0.5 seconds, 1 seconds, or 2 seconds, etc.) after detecting the lift-off.

Figures 1, 5G:
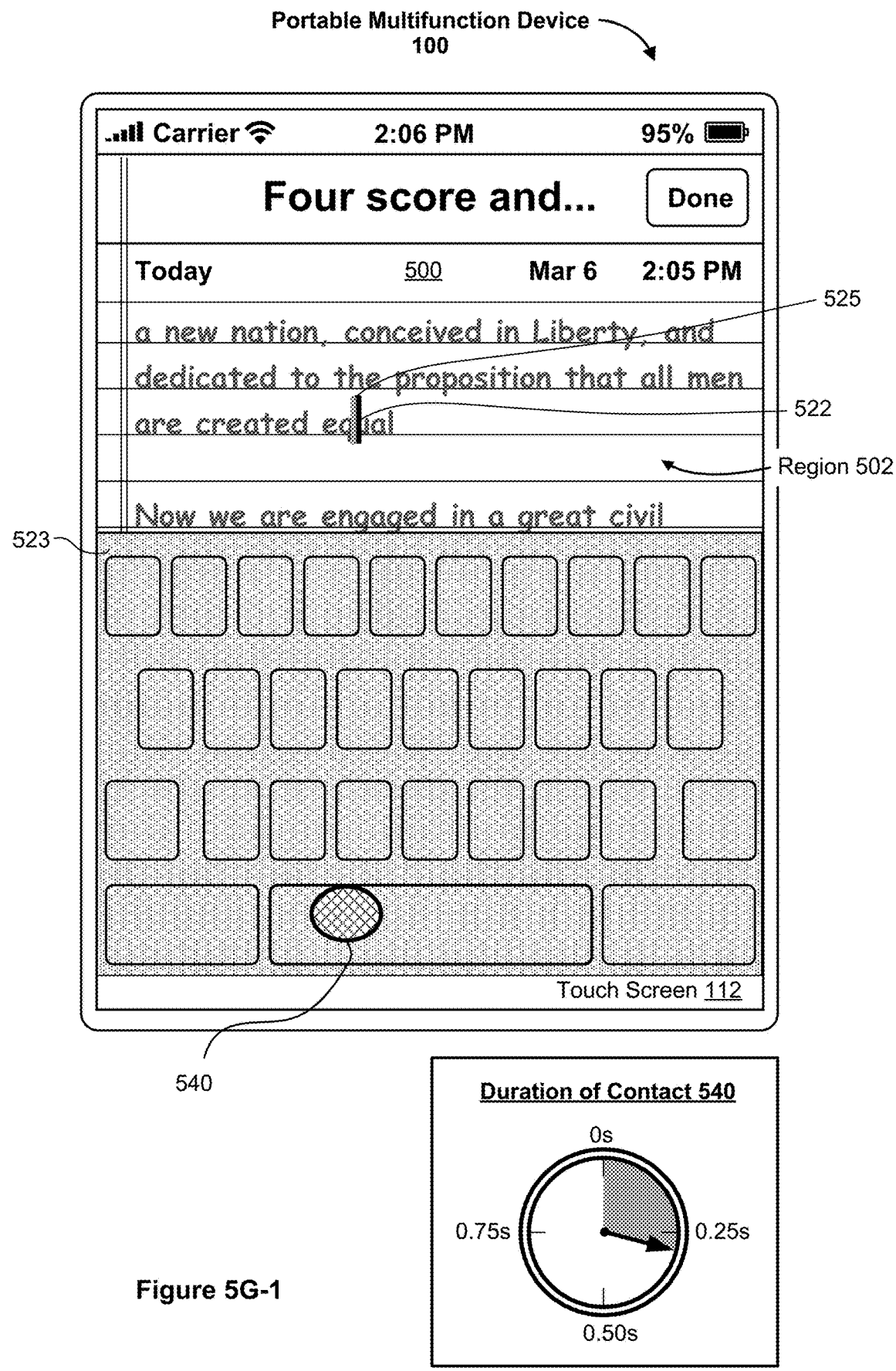
Figures 2, 5G:
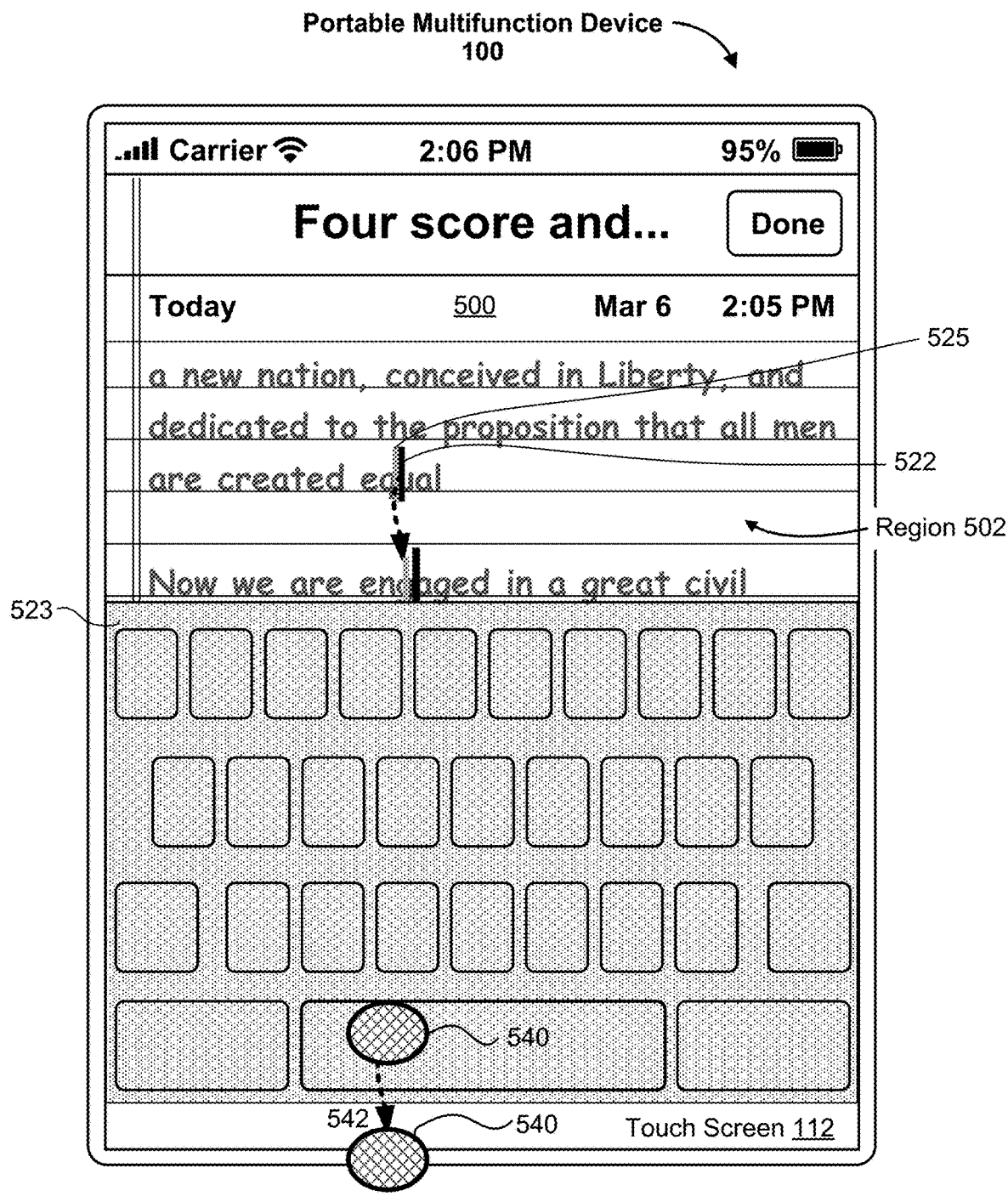
Figures 3, 5G:
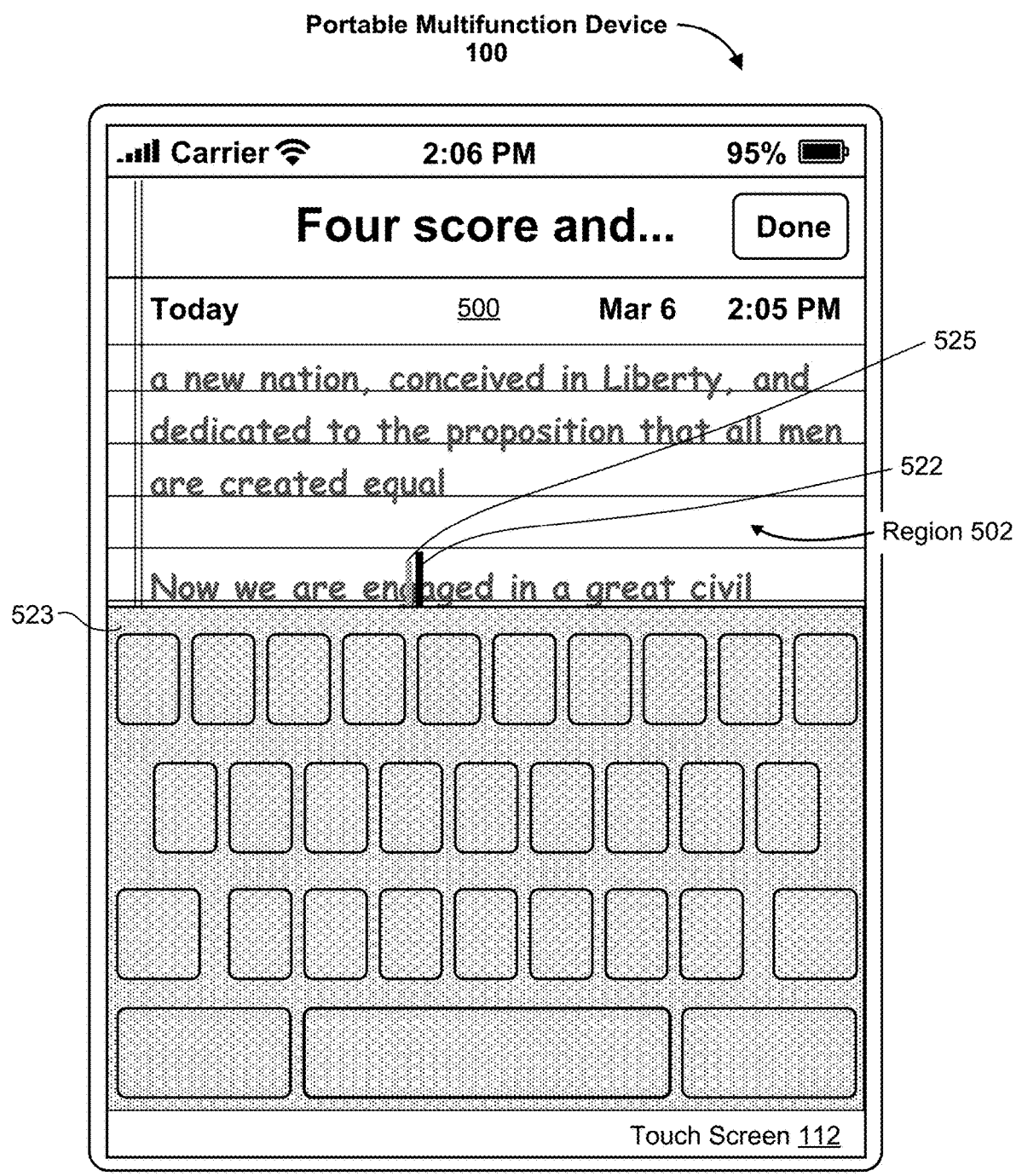
Figures 4, 5G:
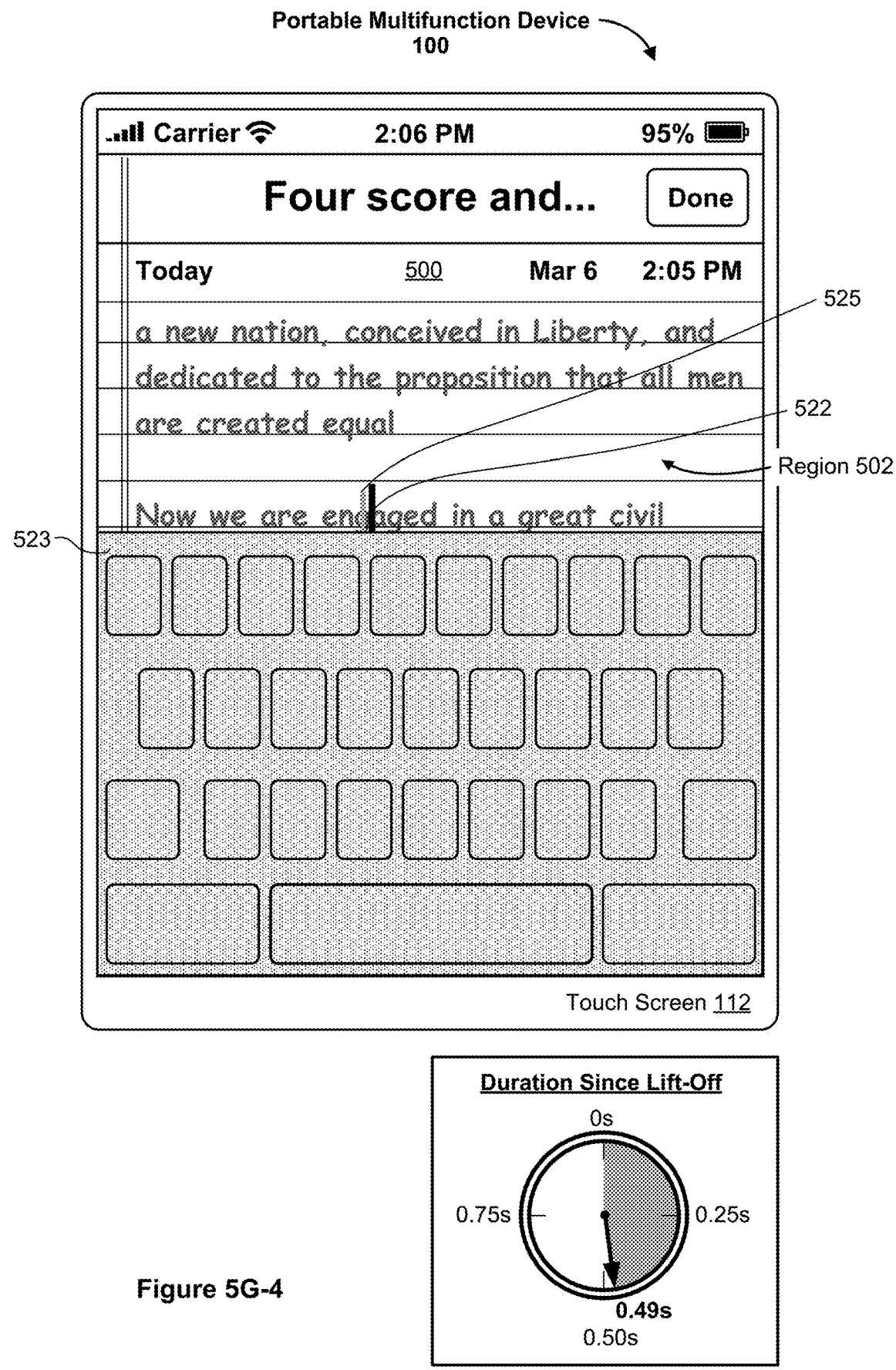

In some embodiments and as shown in FIG. 5G-1, after the device 100 detects that a duration of a contact 540 on the spacebar is longer than a predetermined time threshold (e.g., 0.25 seconds), the contact 540 is determined to be an extended contact and the trackpad mode is activated.

In some embodiments and as shown in FIG. 5G-2, in response to detecting (423) a movement of the contact input 540 following the display of the trackpad 523 (e.g., in trackpad mode 422, FIG. 4), the device 100 determines (424) whether the movement of the contact input 540 satisfies the one or more predetermined movement parameters. In some embodiments, the one or more predetermined movement parameters include a predetermined moving distance threshold and/or a predetermined moving speed threshold, as was discussed above. In some embodiments, the one or more predetermined movement parameters include a movement direction parameter that reflects whether the contact moved in a downward direction.

For example, as shown in FIG. 5G-2, the device 100 determines that a downward movement 542 of the contact input 540 on the spacebar satisfies the one or more predetermined movement parameters (424—Yes, FIG. 4). The device 100 moves (436) the cursor, including both the actual cursor 522 and the ghost cursor 525, in the content presentation region 502 in accordance with the movement 542. Because there is not much screen real estate left as the movement 542 progresses, after lift-off of the contact 540, the device stays in the trackpad mode to give the user an opportunity to reposition their finger in a place that affords them more space to continue moving the cursor.

For example, as shown in FIG. 5G-3, the device 100 detects (438) a lift-off event of the contact input 540. Instead of exiting the trackpad mode, the device 100 stays (440) in the trackpad mode and the soft trackpad 523 remains. In some embodiments, both the actual cursor 522 and the ghost cursor 525 are preserved at their respective locations when the lift-off event is detected. In some embodiments, the device 100 continues to detect (442) whether there is a second contact within a predetermined period of time since detecting the lift-off (e.g., within 0.5 seconds of detecting the lift-off).

In some embodiments, the device 100 stays in the trackpad mode for a predetermined period of time (e.g., also referred to as a trackpad stickiness mode). For the sake of illustration and not intended to be limiting, the present disclosure uses 0.5 seconds as the predetermined period of time. However, a person of ordinary skill in the art would understand that such predetermined period of time for staying in the trackpad mode can be any suitable time period, such as 1 second, 0.75 seconds, or 0.5 seconds. Such predetermined period of time can also be pre-set by the manufacturer or designer, and later customized by the user using a settings interface on the device.

In some embodiments, the device 100 continuously monitors whether a second contact input is received since detecting (438) the lift-off event. The device 100 also tracks a time duration (e.g., the time passed) since the lift-off event, as illustrated visually by the timer in FIG. 5G-4, and the device remains in the trackpad mode while monitoring for another contact.

Figures 5, 5G:
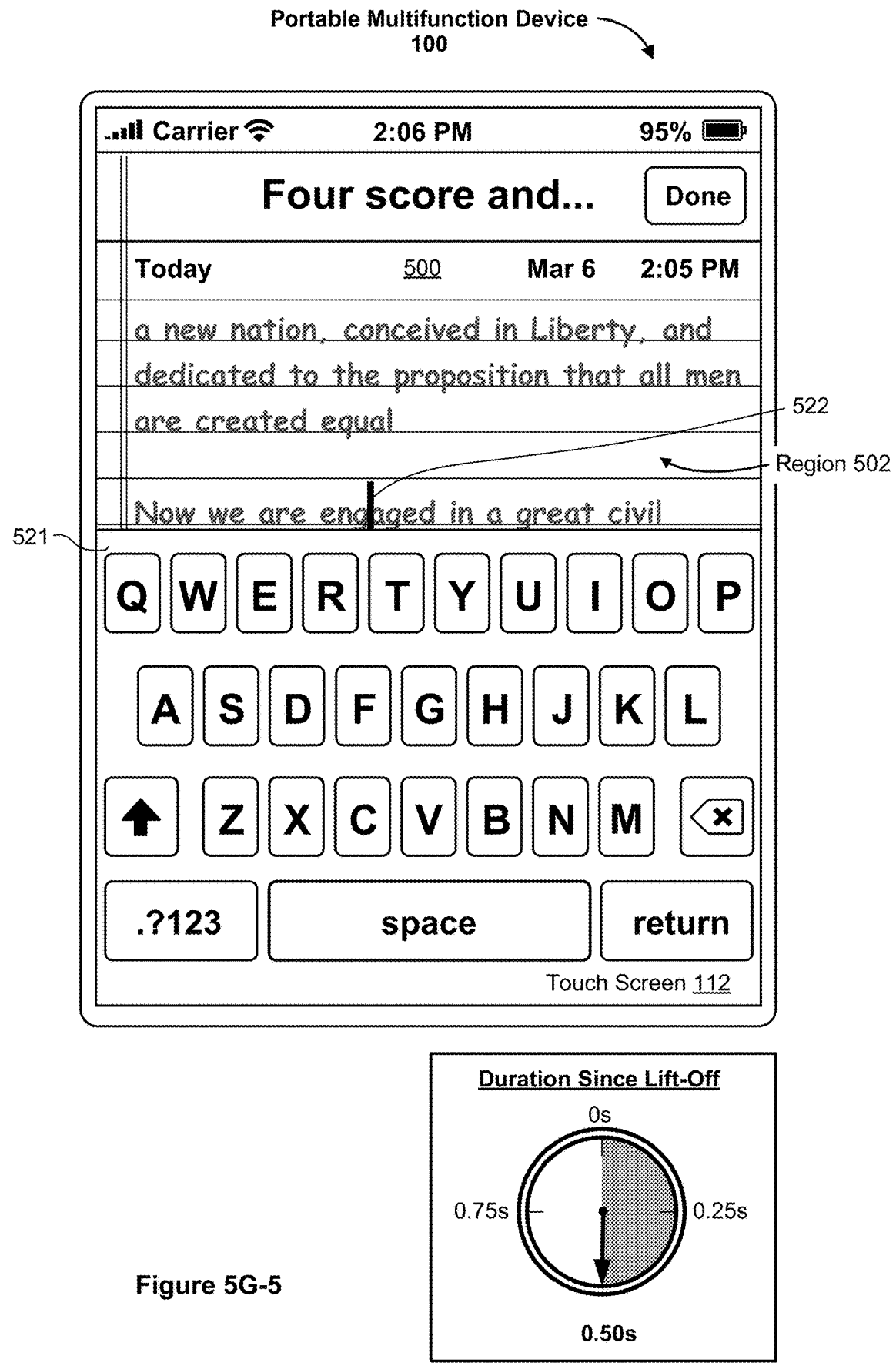

In some embodiments and as shown in FIG. 5G-5, the device 100 does not detect any contact input by the end of the predetermined period of time (e.g., 0.5 seconds in FIG. 5G-5). That is, no second contact has been detected for a duration of 0.5 seconds since the lift-off event (442—No, FIG. 4). At 0.5 seconds, the device 100 exits (444) the trackpad mode to display the virtual keyboard 521. In some embodiments, the actual cursor 522 stays at where the actual cursor 522 was when the lift-off event occurred, and the ghost cursor 525 is no longer displayed.

Figures 1, 5H:
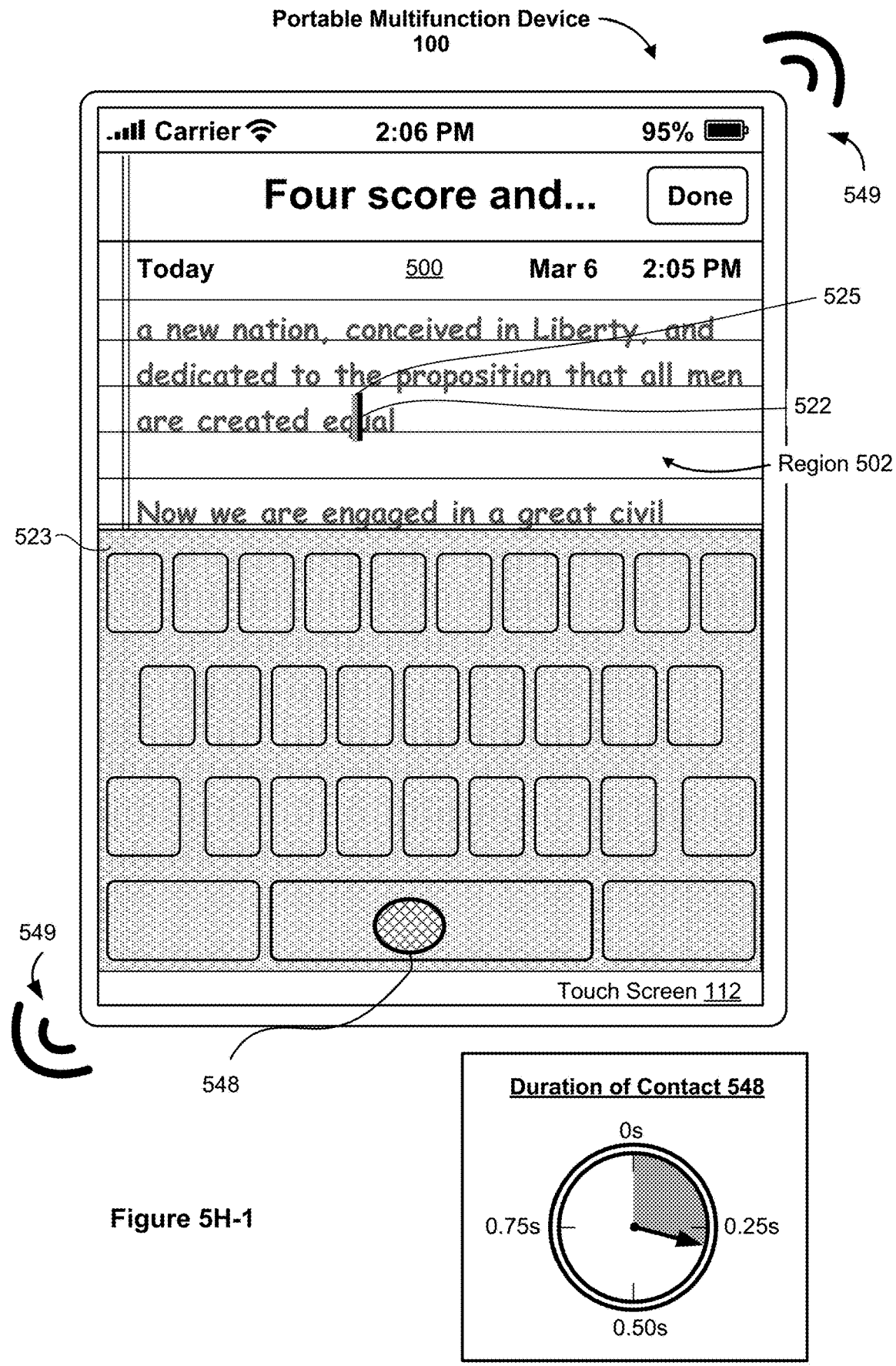
Figures 2, 5H:
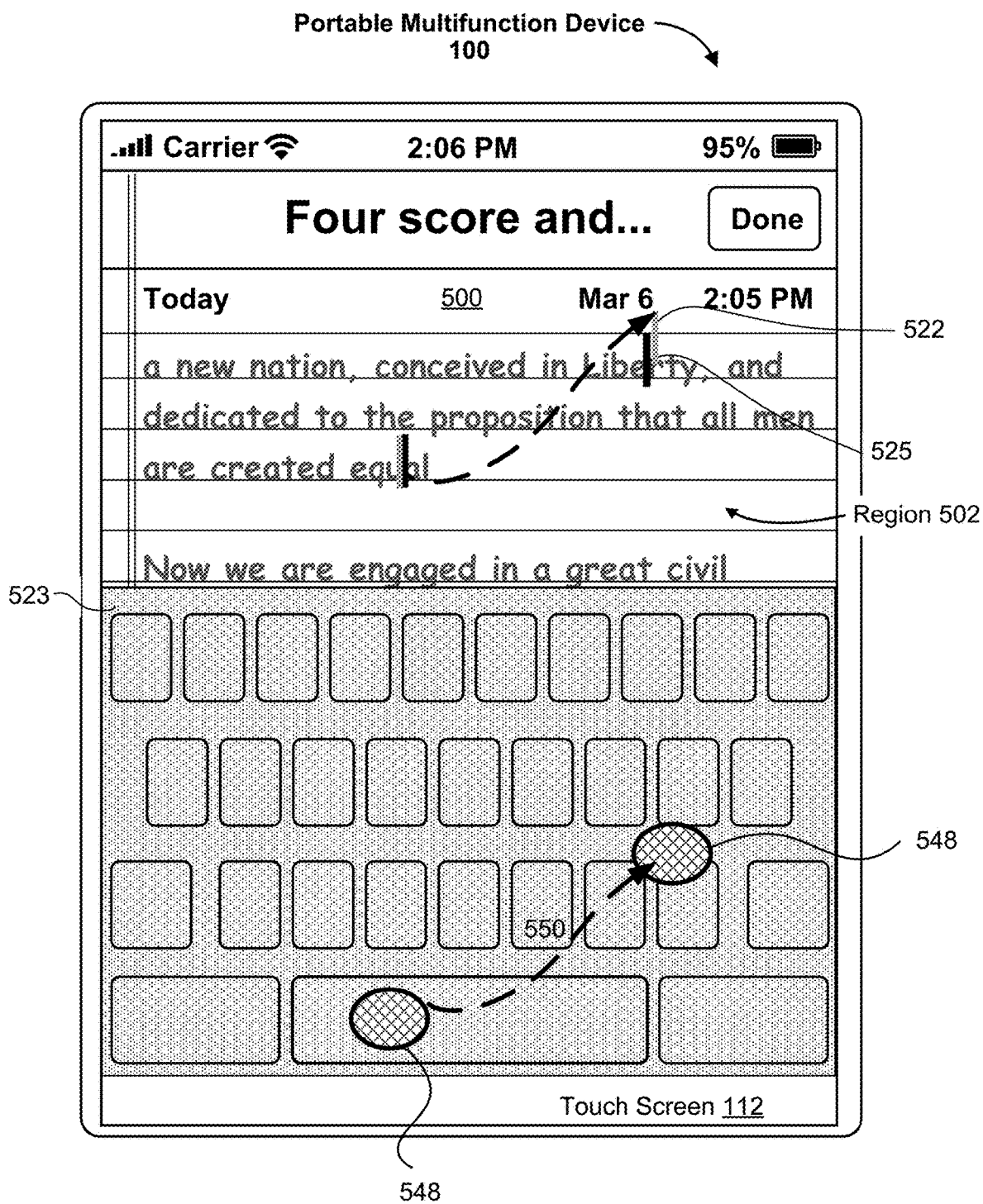
Figures 3, 5H:
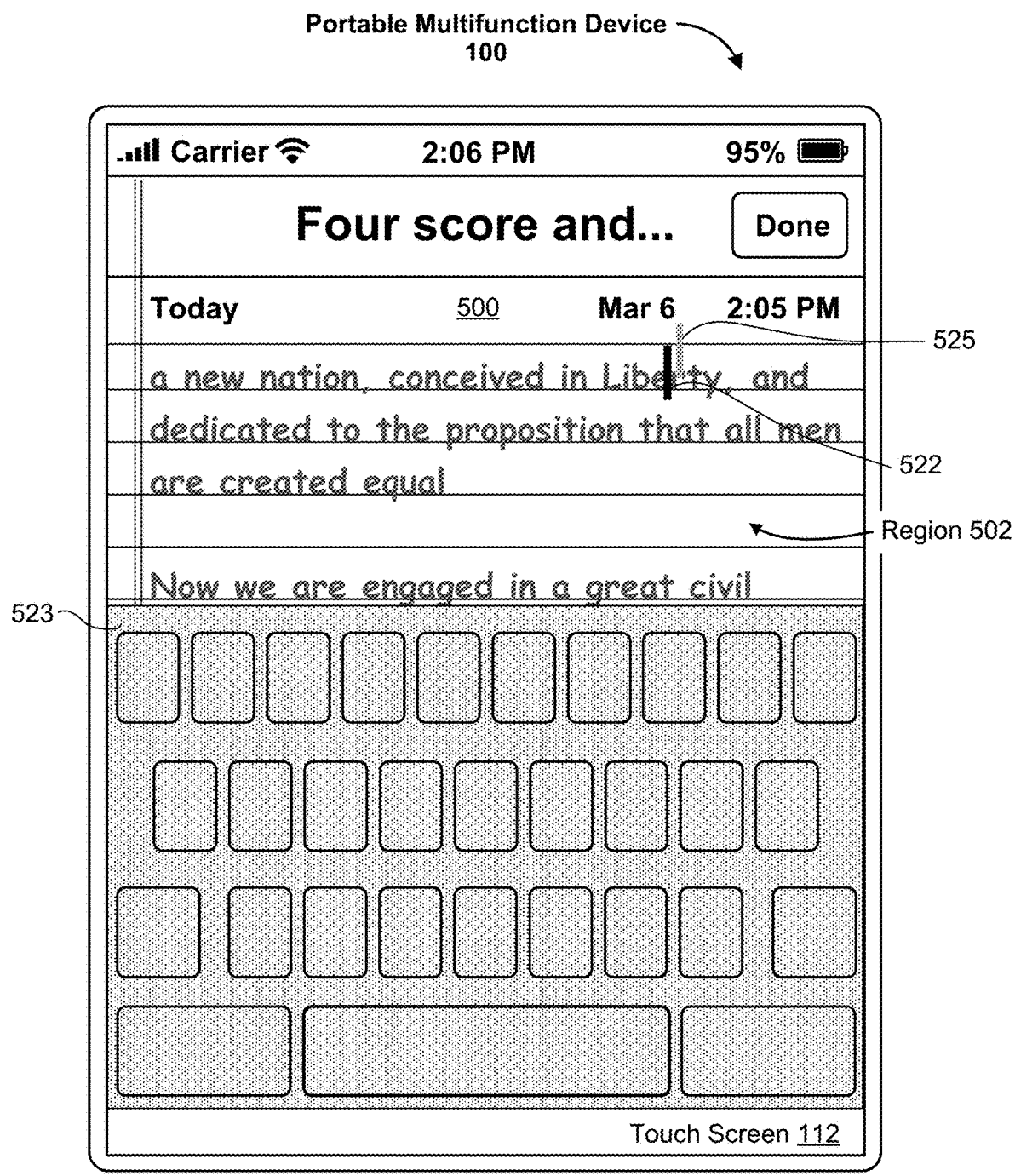

In some embodiments as shown in FIG. 5H-1, after the device 100 detects that a duration of a contact 548 over the mode-switching area (e.g., over the spacebar key) is longer than a predetermined time threshold (e.g., 0.25 seconds), the contact 540 is determined to be an extended contact and the trackpad mode is activated. In some embodiments, the device 100 further provides a haptic feedback 549 in response to the activation of the trackpad mode to alert the user that trackpad mode has been entered. For example, the device 100 vibrates once upon activation of the trackpad mode, or the device may provide a localized vibration near to the contact 548.

In some embodiments as shown in FIG. 5H-2, the device 100 detects a movement 550 of the contact input 548. In some embodiments, in accordance with a determination that the movement 550 satisfies the movement parameter (e.g., the movement 550 is at a speed that is greater than the predetermined speed threshold and/or a distance moved during the movement 550 is greater than the predetermined distance threshold), the movement 550 is determined to satisfy a respective movement parameter (424—Yes, FIG. 4). The device 100 moves (436) the cursor, including both the actual cursor 522 and the ghost cursor 525, in the content presentation region 502 in accordance with the movement 550.

In some embodiments as shown in FIG. 5H-3, the device 100 detects (438) a lift-off event of the contact input 548. The device 100 stays (440) in the trackpad mode and the soft trackpad 523 remains on display. As discussed above with reference to FIGS. 5G-3 to 5G-5, the trackpad mode remains for a predetermined period of time, e.g. 0.5 seconds, without detecting a second contact on the display.

Figures 1, 5I:
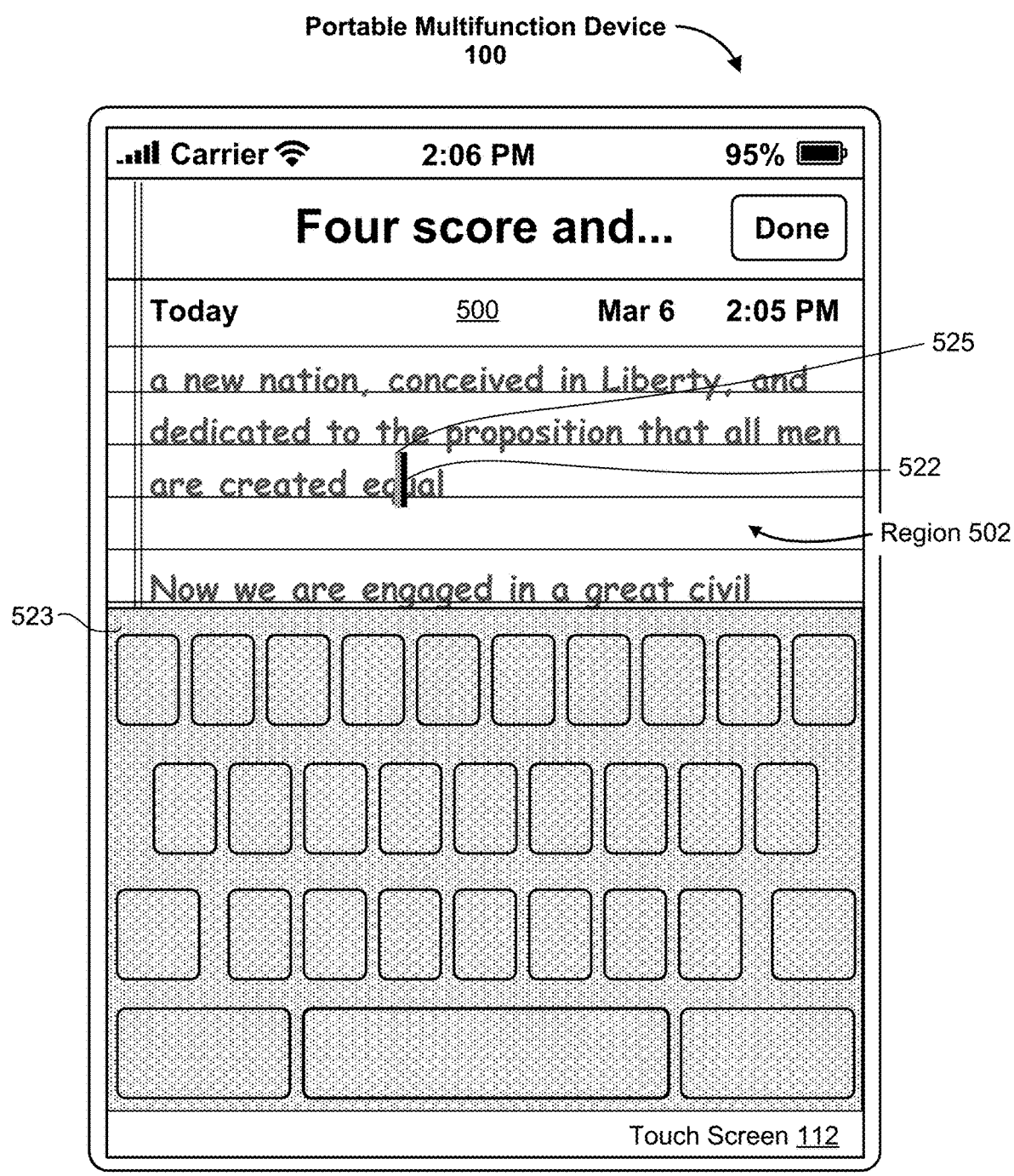
Figures 2, 5I:
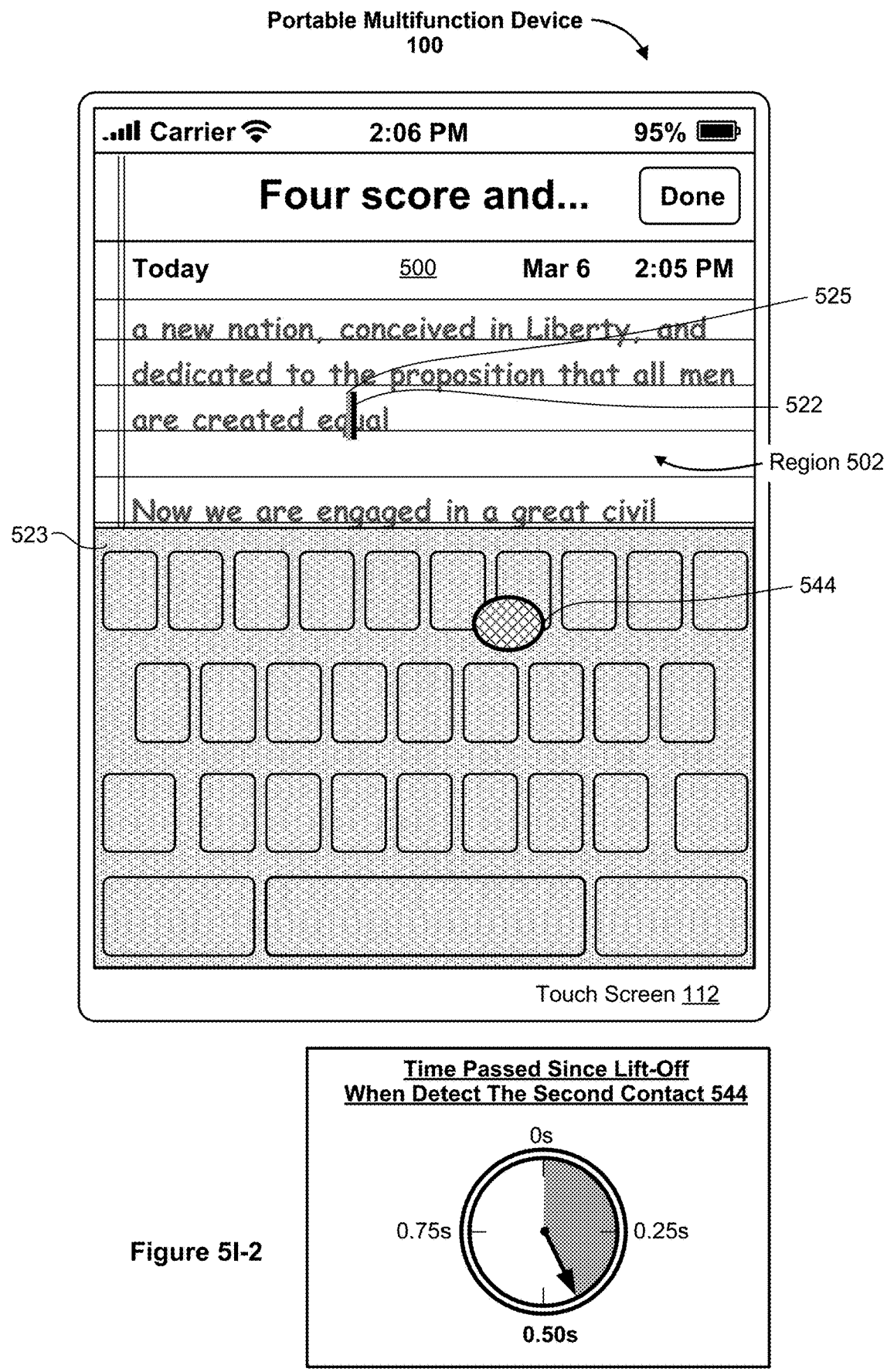
Figures 3, 5I:
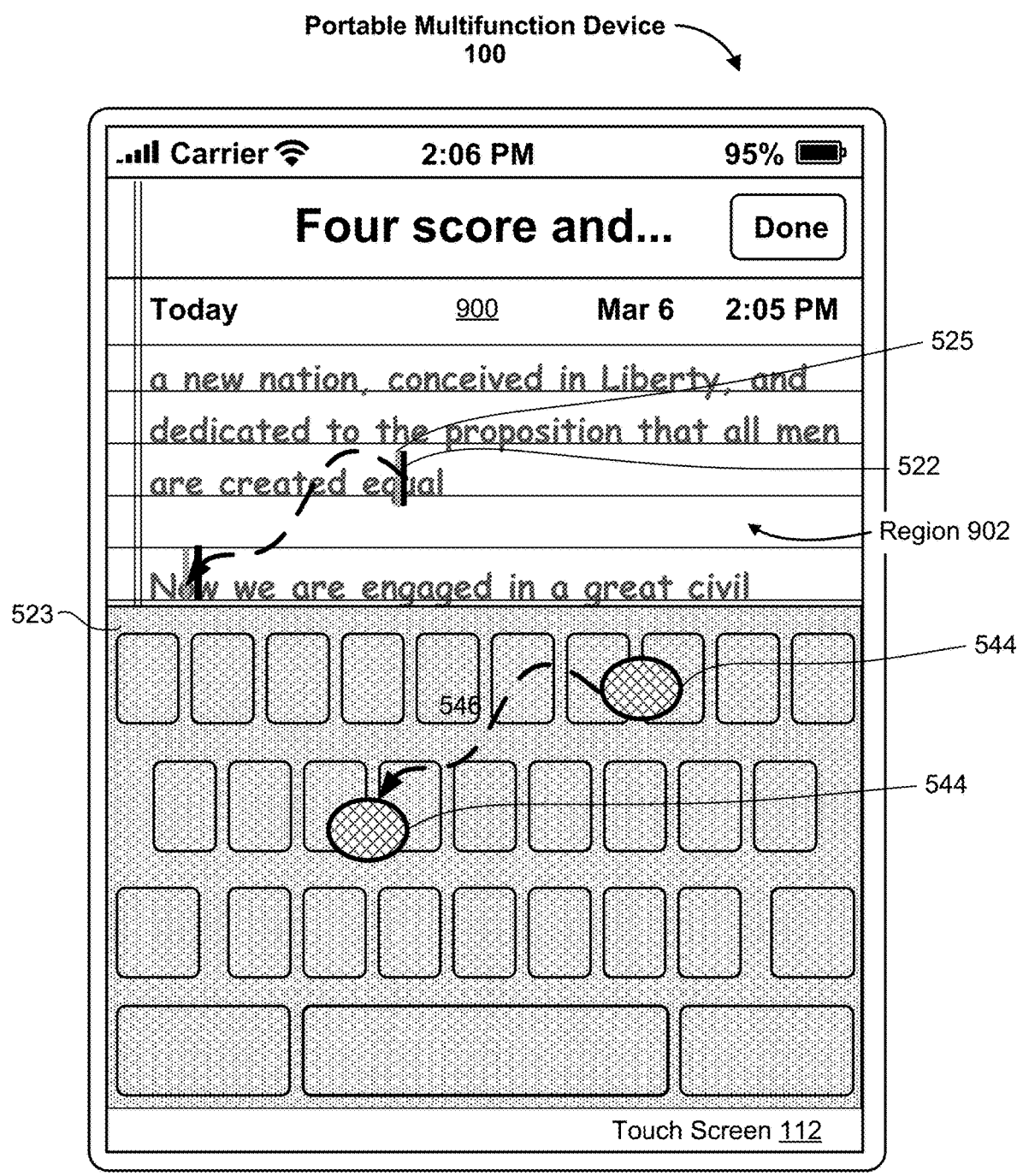
Figures 4, 5I:
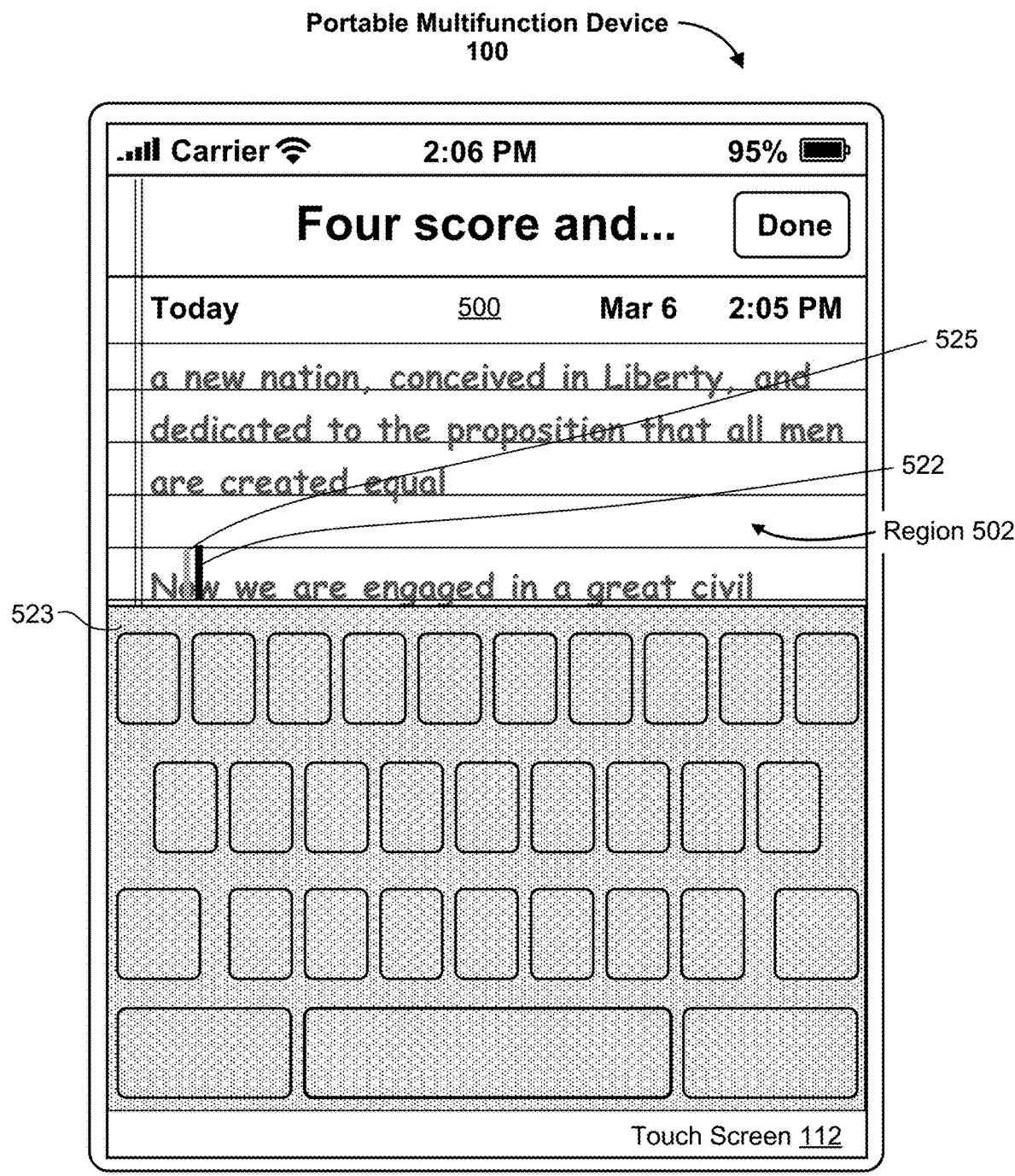

FIG. 5I-1 also shows that the device remains in the trackpad mode after determining that the movement of a contact input satisfies a respective movement parameter (424—Yes, FIG. 4).

In some embodiments and as shown in FIG. 5I-2, if the device 100 detects a second contact input 544 before the trackpad mode expires (e.g., before 0.5 seconds since the lift-off event) (442—Yes, FIG. 4), the device 100 continues to determine (446) the touch type of the second contact 544. In some embodiments, the device 100 determines that the contact input 544 is (456) a single touch. In response, the device 100 remains (458) in trackpad mode.

For example, as shown in FIG. 5I-3, the device 100 detects a movement 546 of the contact input 544 while the device is still in the trackpad mode. In response, the actual cursor 522 and the ghost cursor 525 move in the content presentation region 502 in accordance with the movement 546 of the contact input 544 on the soft trackpad 523. In some embodiments and as shown in FIG. 5I-4, upon detecting a lift-off of the contact 544 from the touch-sensitive display, the device 100 remains in the trackpad mode. In some other embodiments and as discussed above at step 424 with reference to FIGS. 4, 5E-3 to 5E-4, 5F-2 to 5F-3, 5G-2 to 5G-5, and 5H-2 to 5H-3, when detecting lift-off of the contact 544, the device 100 may determine whether the movement 546 of the contact input 544 satisfies the one or more movement parameters and perform functions thereafter accordingly. In yet some other embodiments (not shown), upon detecting a lift-off event following the single touch 544, the device 100 immediately exits the trackpad mode.

Figures 1, 5J:
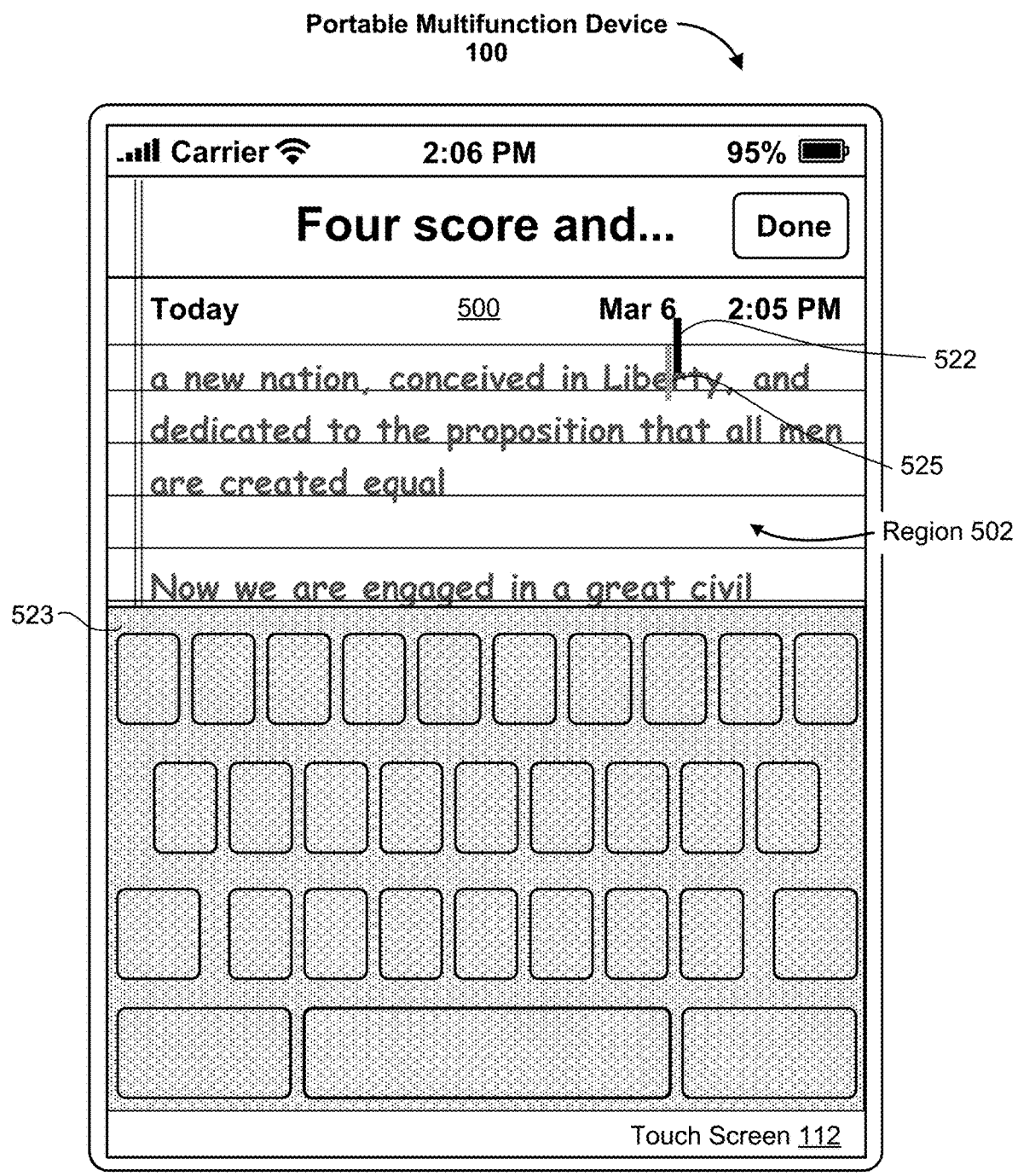
Figures 2, 5J:
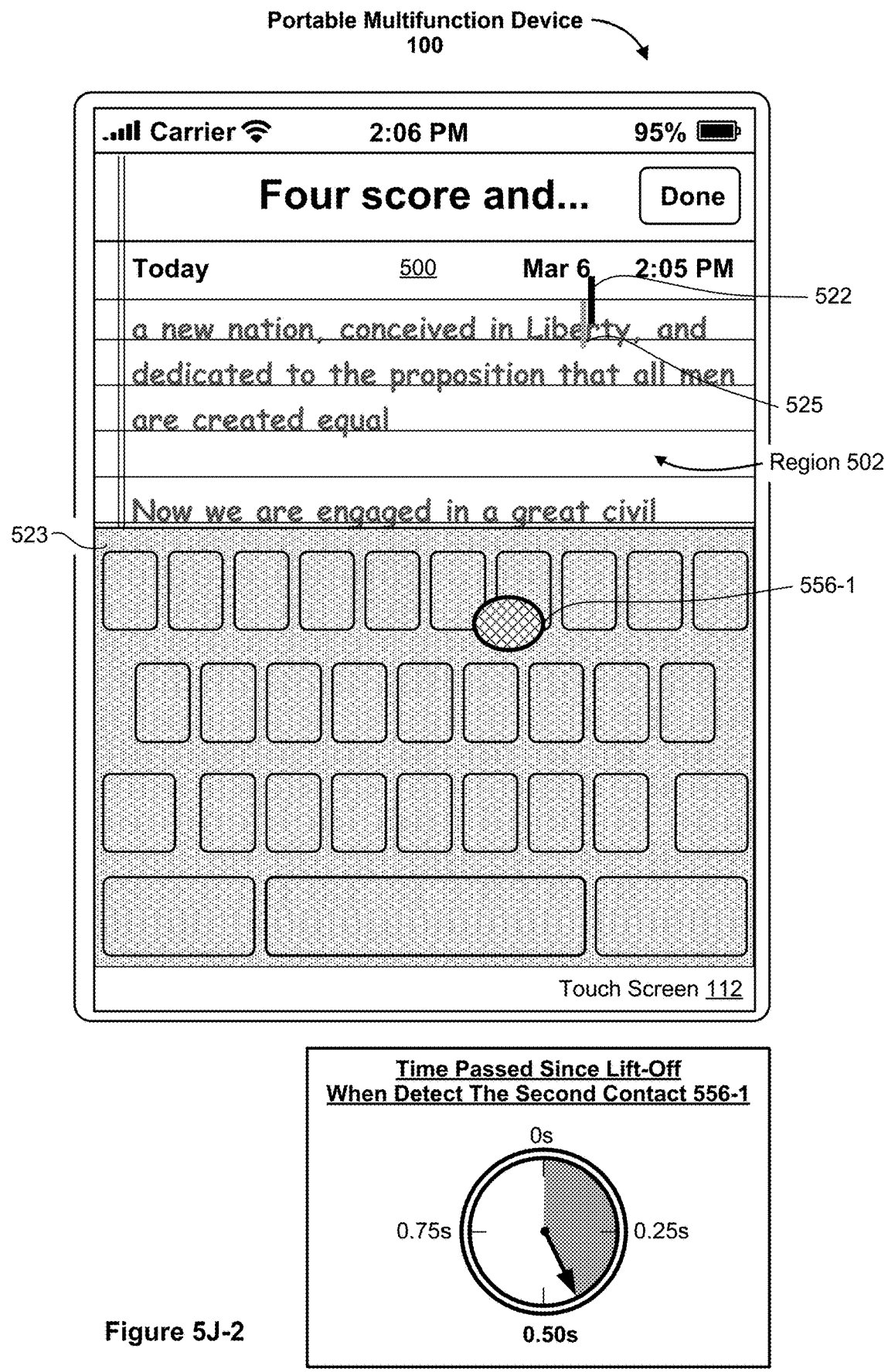
Figures 3, 5J:
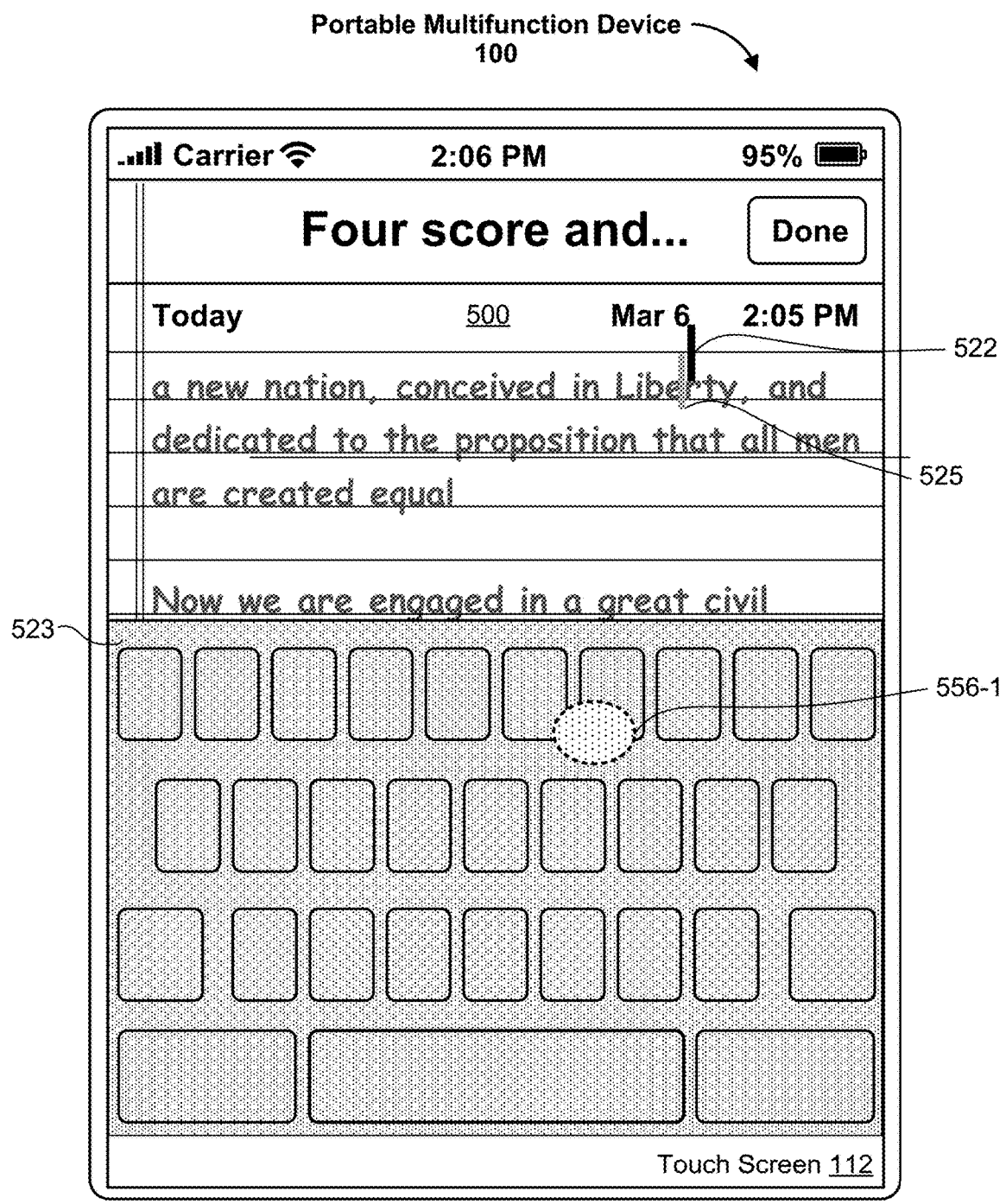
Figures 4, 5J:
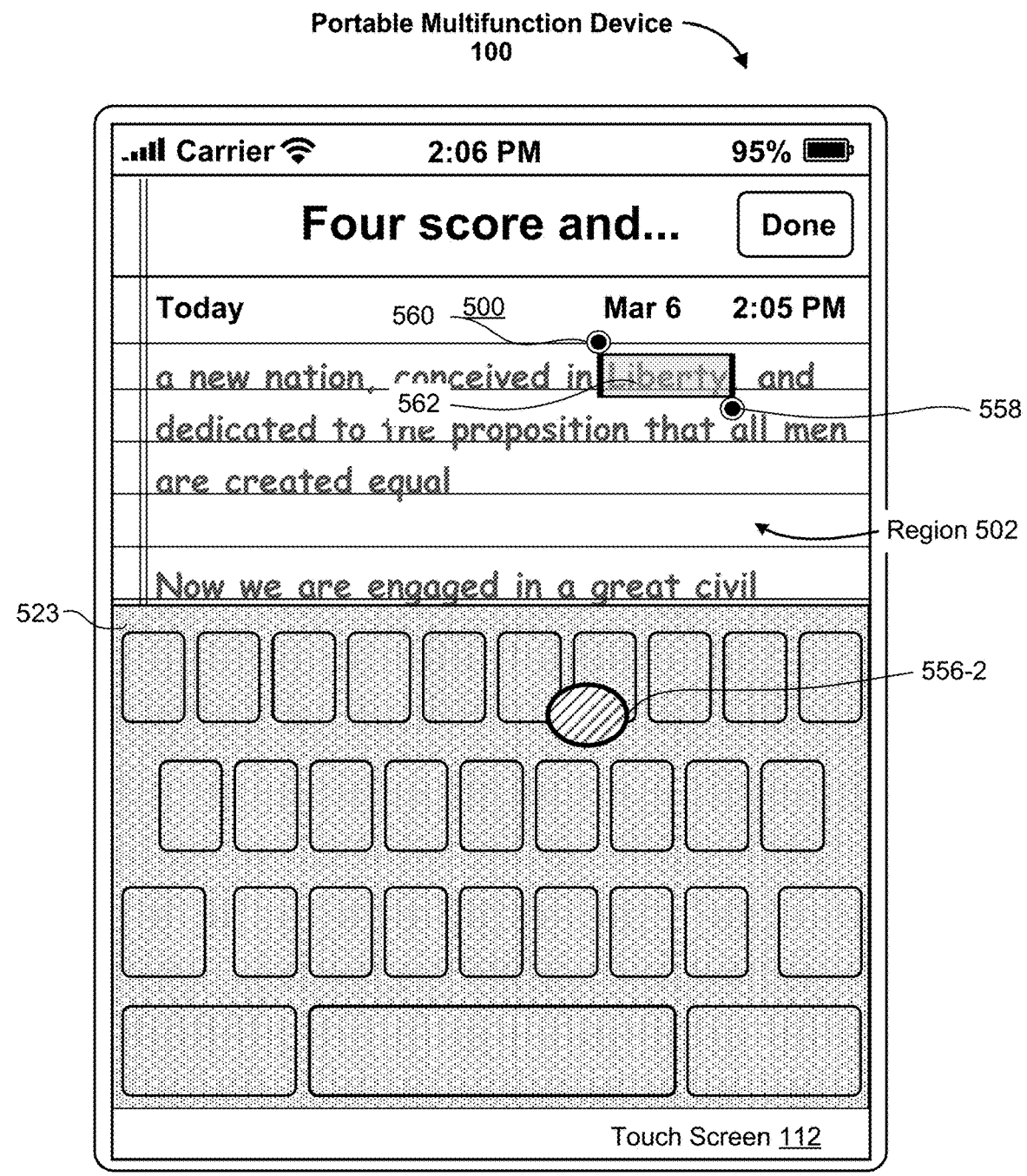
Figures 5, 5J:
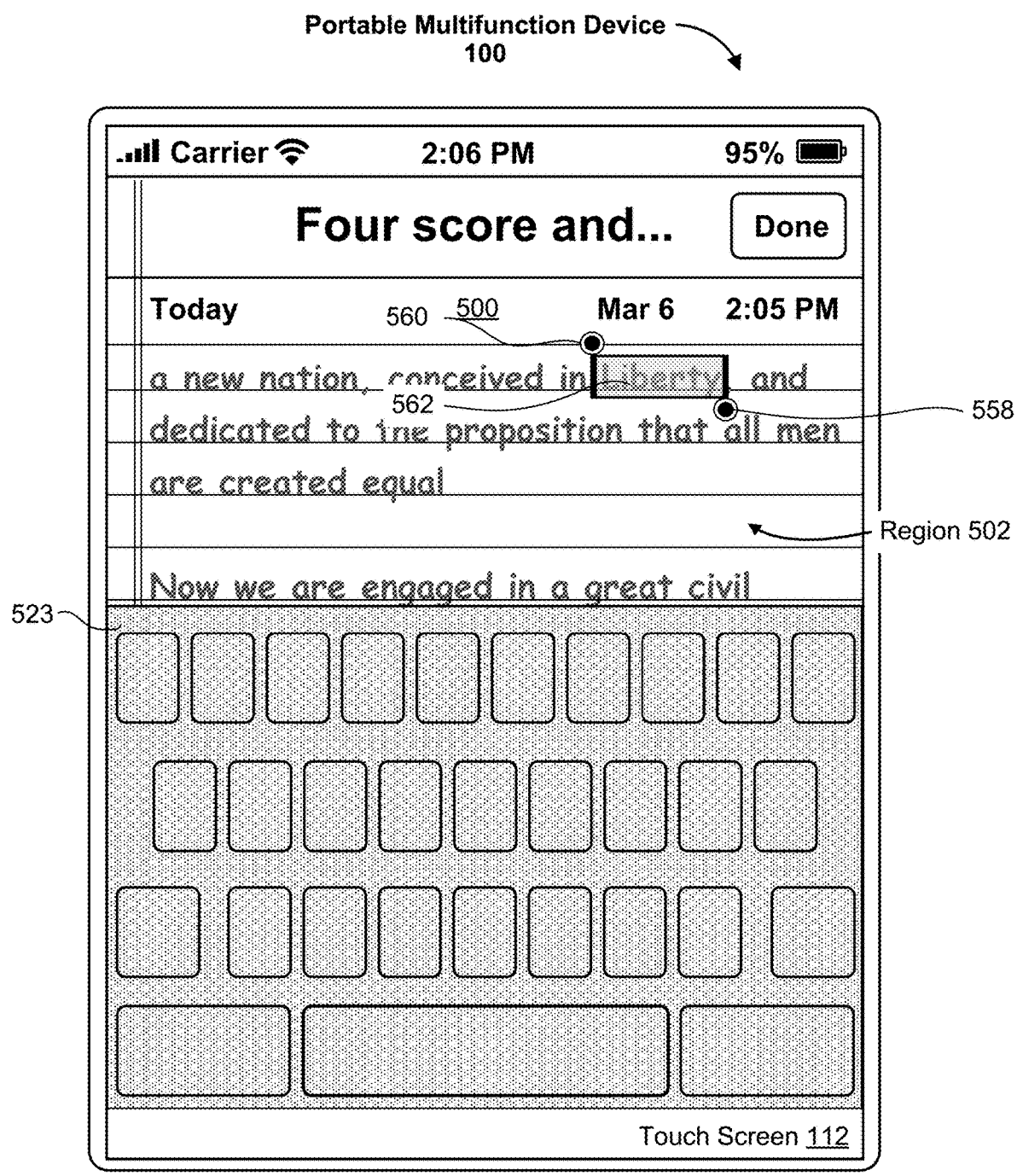

FIG. 5J-1 also starts with the device remaining in the trackpad mode (e.g., extended contact may have been used to activate the mode and then movement of that contact satisfied a respective movement parameter). In some embodiments and as shown in FIG. 5J-2, if the device 100 detects a second contact input 556-1 before the trackpad mode expires (e.g., before 0.5 seconds since the lift-off event) (442—Yes, FIG. 4), the device 100 continues to determine (446) the touch type of the second contact 556-1. In some embodiments, the device 100 detects (460) a quick double tap on the touch screen to trigger (462) text selection.

For example, in FIG. 5J-2, the device 100 may detect that a duration of the contact 556-1 is shorter than a predetermined threshold (e.g., 0.05 seconds), which is immediately followed by a lift-off event of the contact 556-1 as illustrated in FIG. 5J-3 by the dashed line). Since the lift-off event, if the device 100 further detects a second contact 556-2 within a predetermined threshold (e.g., 0.05 seconds) as shown in FIG. 5J-4, the device 100 determines that a quick double tap has been received on the touch-sensitive display. In response, as shown in FIG. 5J-4, the device 100 selects a portion of the content 500 (e.g., a word where the cursor is at) and displays the selection 562. For example, the word "Liberty" is highlighted as being selected. In some embodiments, the device 100 displays markers, such as a start-point object 560 and an end-point object 558 at respective ends of "Liberty" to indicate the selection 562.

In some embodiments as shown in FIG. 5J-5, when the device 100 detects a lift-off event after the double tap, the device 100 remains in the trackpad mode and the selection 562 remains on display. In some other embodiments (not shown), when the device 100 detects a lift-off event after the double tap, the device 100 immediately exits the trackpad mode while preserving the selection 562 on display.

Figures 1, 5K:
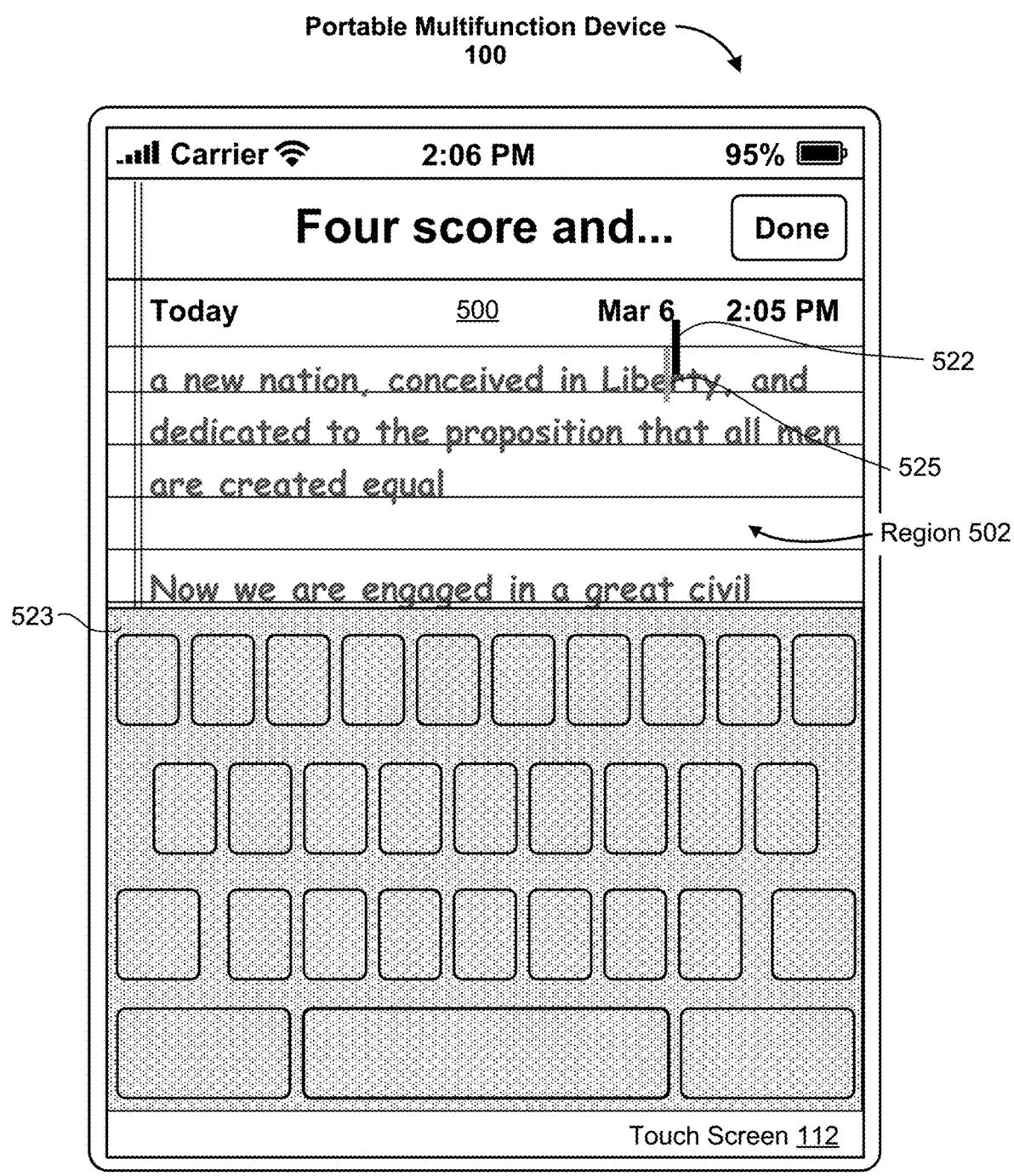
Figure 5K:
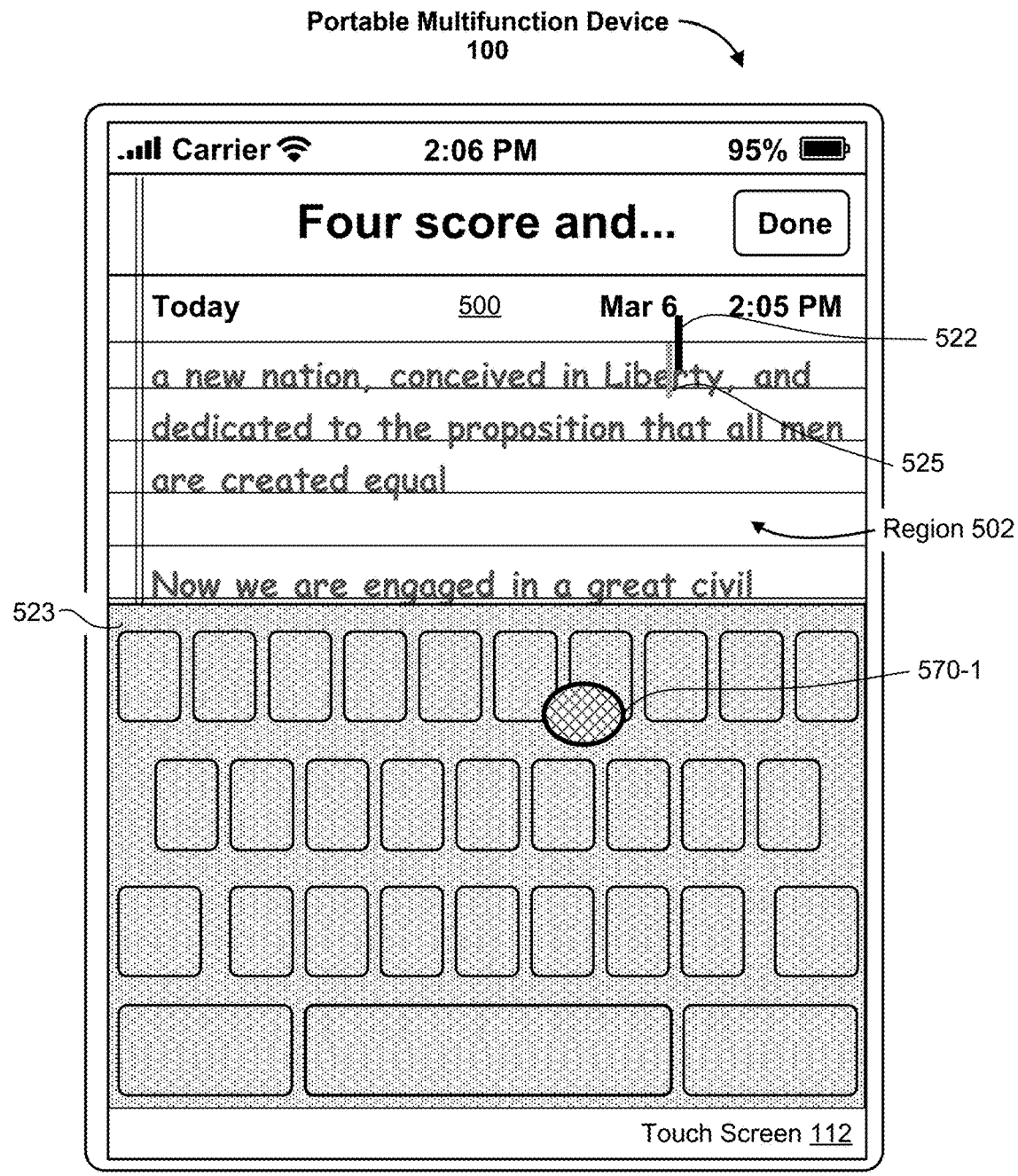
Figure 2:
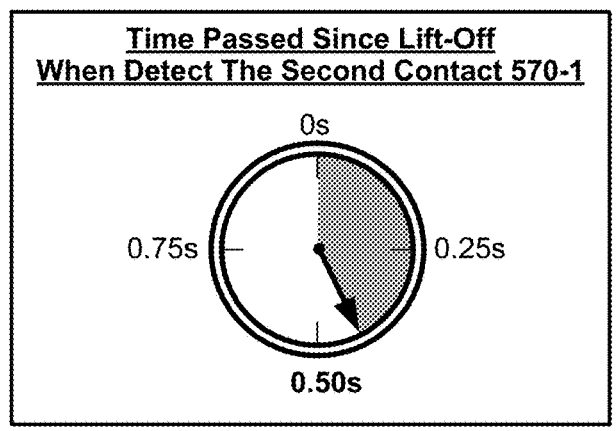
Figures 3, 5K:
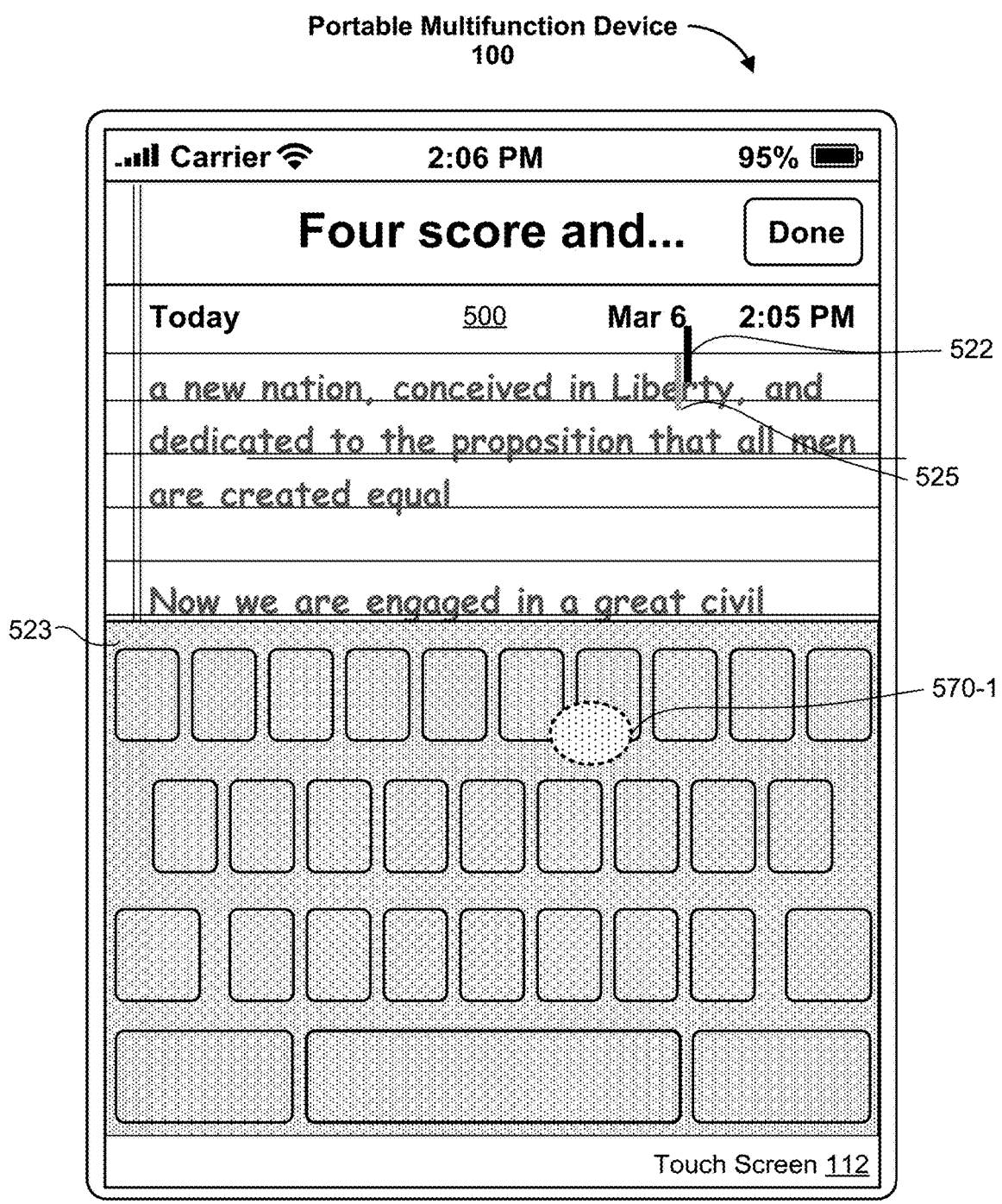
Figures 4, 5K:
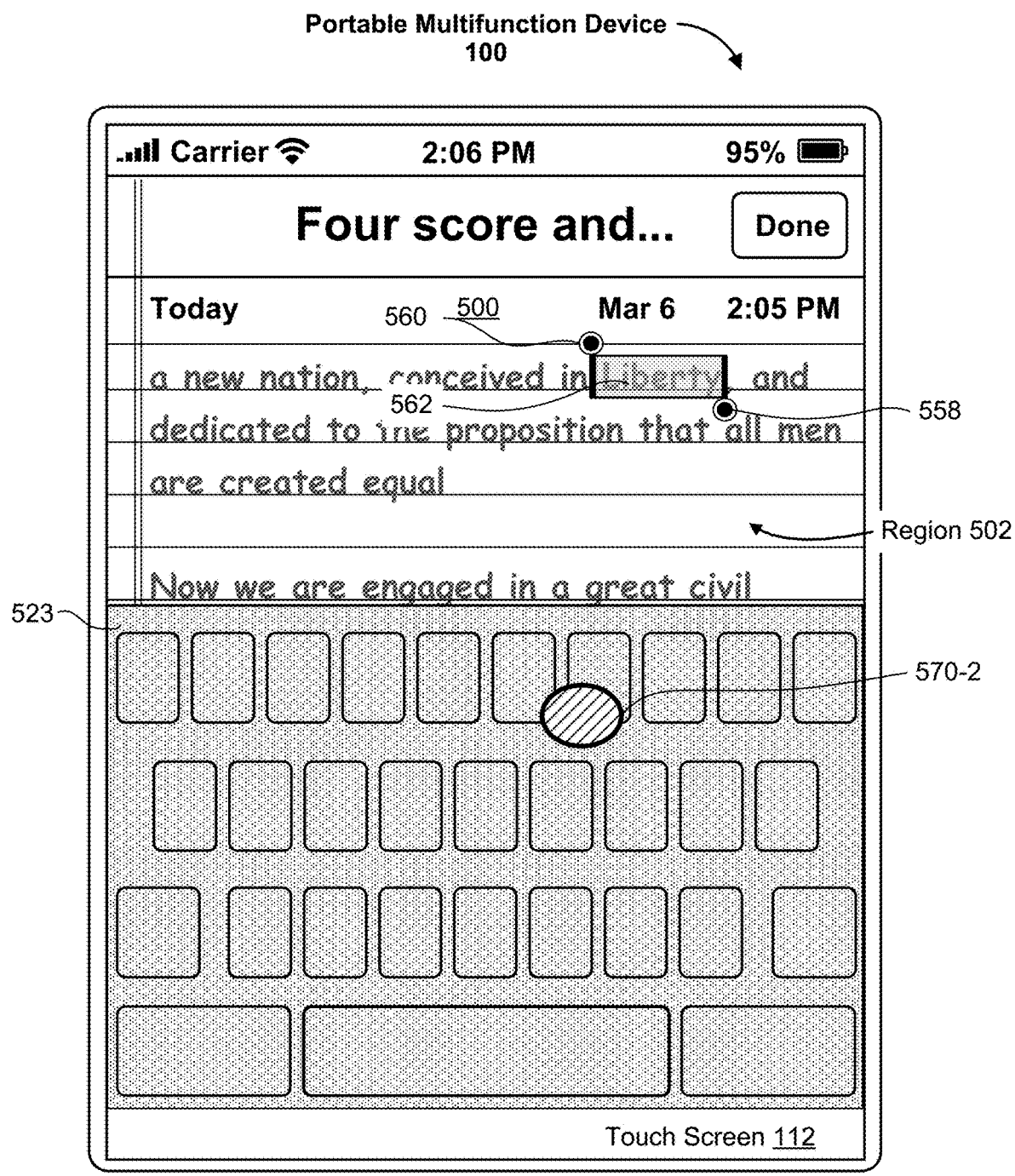
Figures 5, 5K:
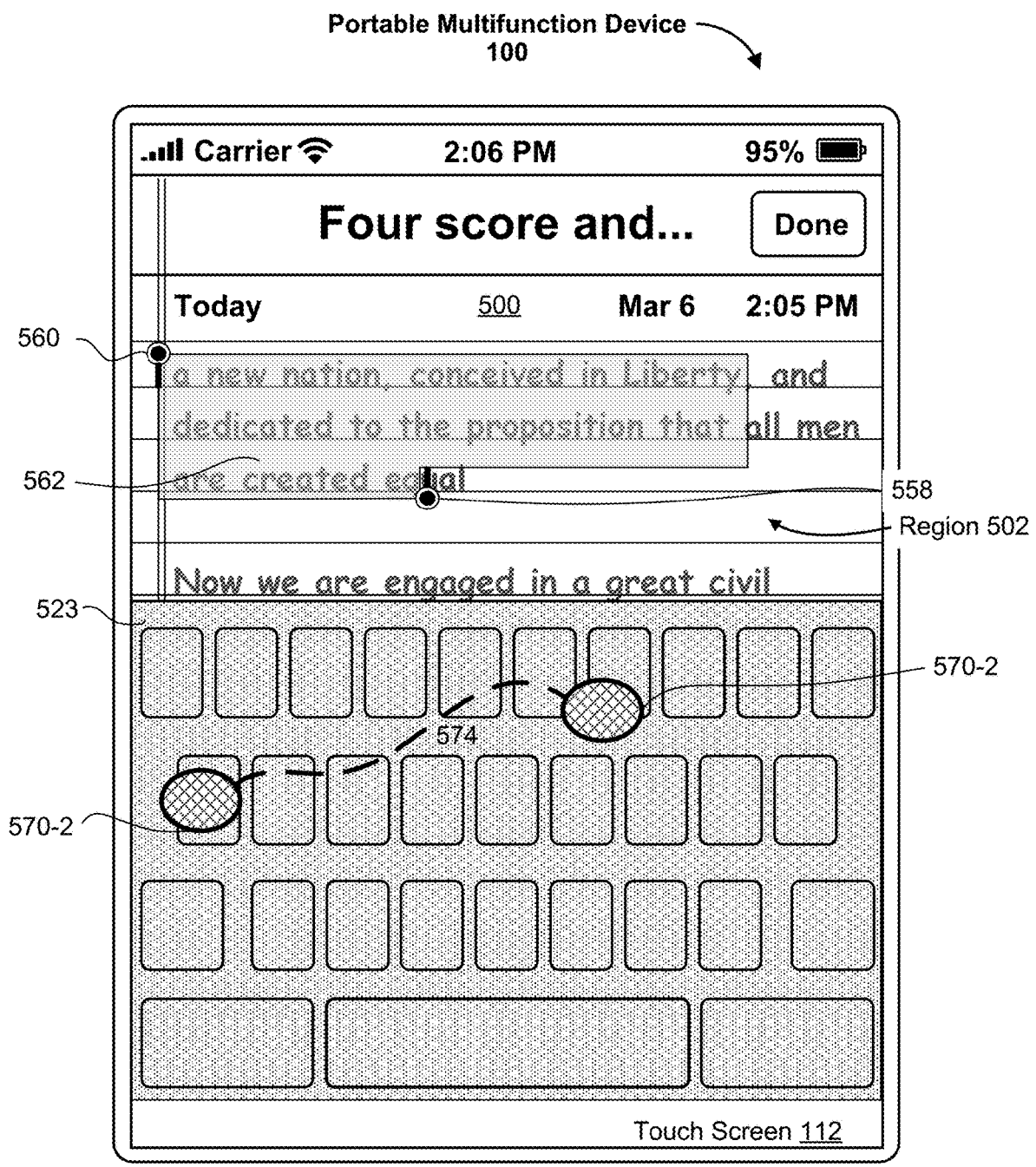

FIG. 5K-1 shows the device operating in the trackpad mode (e.g., extended contact may have been used to activate the mode and then movement of that contact satisfied a respective movement parameter). In some embodiments and as shown in FIGS. 5K-2 to 5K-4, the device 100 detects a quick double tap (e.g., tap 570-1, FIG. 5K-2), then lift-off in FIG. 5K-3, and tap 570-2 in FIG. 5K-4). Following text selection 562 in response to the quick double tap in FIG. 5K-4, the device 100 may further detect (464) a hold-and-drag gesture 574 of the contact 570-2 as shown in FIG. 5K-5. In response, as illustrated in FIG. 5K-5, the device 100 selects (466) more object (e.g., additional words in the region 502) in accordance with the movement 574 on the trackpad.

Figures 5, 5K, 6:
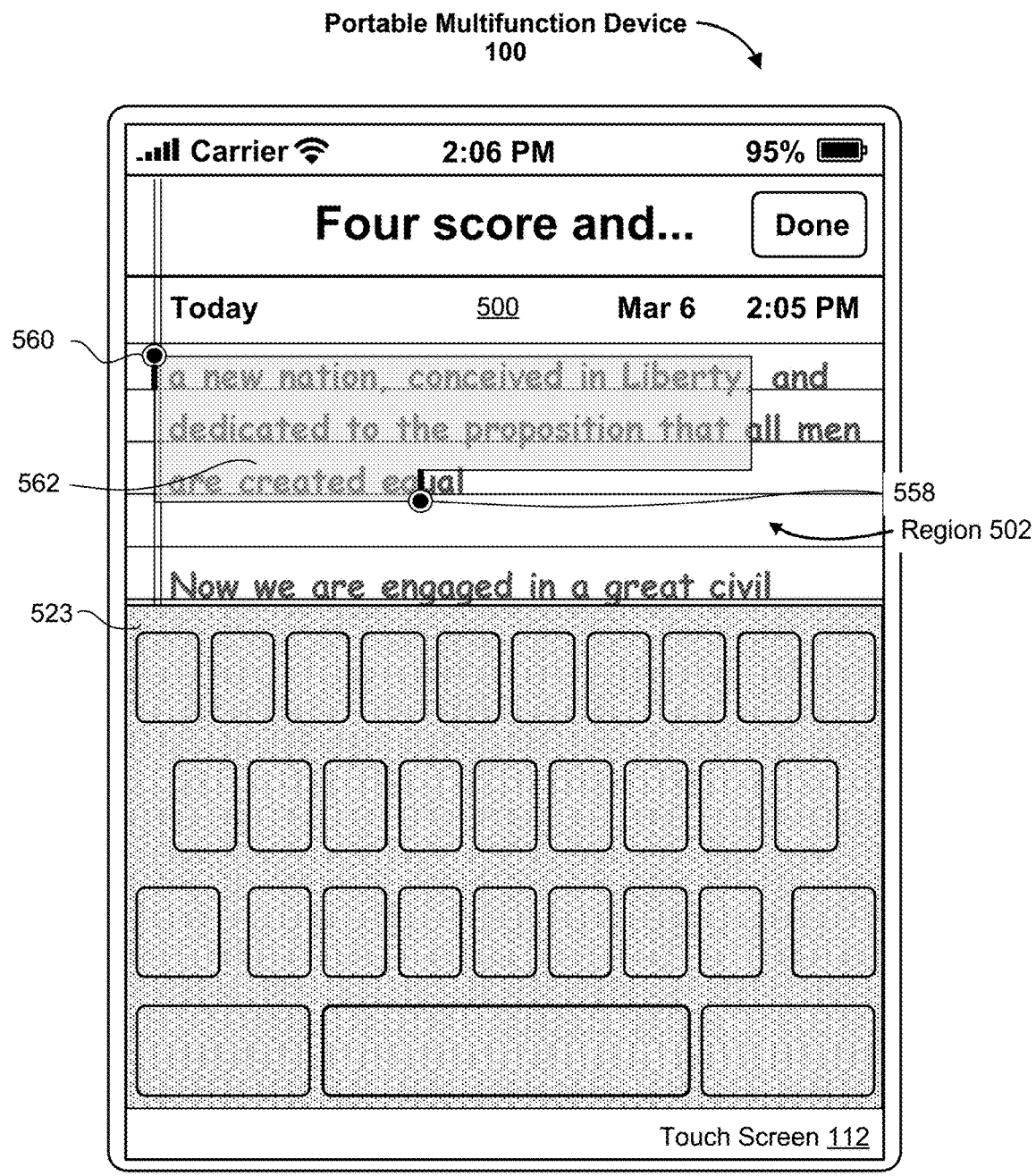

In some embodiments as shown in FIG. 5K-6, when the device 100 detects a lift-off event after the double-tap and hold-and-drag gesture, the device 100 remains in the trackpad mode and the selection 562 of more text remains on the touch-sensitive display. In some other embodiments (not shown), when the device 100 detects a lift-off event after the double-tap and hold-and-drag event, the device 100 immediately exits the trackpad mode while preserving the selection 562 on display.

FIGS. 6A-6F are flowcharts illustrating a method 600 of activating a touchpad mode using an extended contact over a virtual keyboard, in accordance with some embodiments. The method 600 is performed at a portable multifunction device (e.g., the device 100 in FIG. 1A) with a touch-sensitive display (e.g., the touch screen display 112 in FIG. 1A). As described below, the method 600 provides a mechanism for activating a trackpad mode at a portable multifunction device with a touch-sensitive display. This method does not require the portable multifunction device to include a contact intensity sensor (e.g., a force sensor, or a pressure sensor), thus reducing the cost for designing and manufacturing the portable multifunction device. The method is also intuitive to a user, thereby reducing the number, extent, and/or nature of the inputs from the user when activating the trackpad mode, and creating a more efficient human-machine interface. A more efficient input mechanism also requires less computing resources, thereby increasing battery life of the device.

Figure 6A:
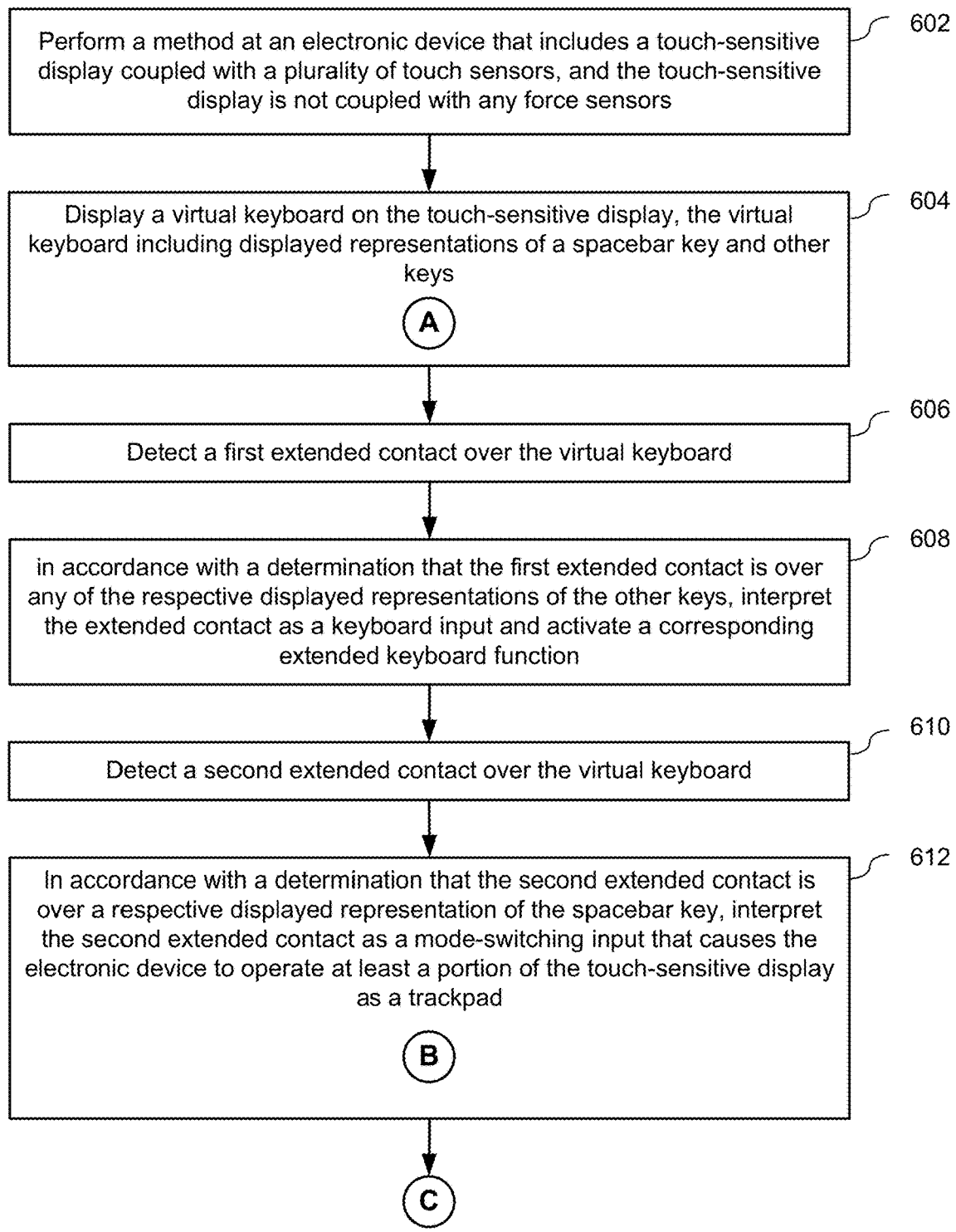

Turning to FIG. 6A, the method 600 is performed (602) at electronic device that includes a touch-sensitive display coupled with a plurality of touch sensors. In some embodiments, the touch-sensitive display is not coupled with any force sensors. The electronic device may not be able to directly detect changes in intensities of contact, as the device lacks any force sensors. In some other embodiments, the touch-sensitive display is coupled with one or more force sensors, but detection of the single-finger gestures, as discussed herein, does not require use of any of the force signals that might be generated by such force sensors. In other words, even if the device includes force sensors, such force sensors are not required to detect the single-finger trackpad-activation gestures discussed herein, e.g., the tip-to-print roll gesture and the extended contact over a predetermined mode-switching area of a virtual keyboard. In some embodiments, the touch sensors of the plurality of touch sensors are capacitive touch sensors.

In performing the method 600, the electronic device displays (604) a virtual keyboard on the touch-sensitive display, the virtual keyboard including displayed representations of a spacebar key and other keys. For example, as shown in FIG. 5A-1, the displayed virtual keyboard 521 includes displayed representations of a spacebar key (in the bottom row of the virtual keyboard 521) and displayed representations of a number of other keys.

The electronic device also detects (606) a first extended contact over the virtual keyboard. Extended contacts are also referred to herein as "long presses" and include a contact over the touch-sensitive display that lasts for at least an extended-contact detection threshold (e.g., 0.25 seconds). An example of the first extended contact is shown in FIG. 5B-1 by way of extended contact 514, which is a contact that lasts for 0.25 seconds (as is shown in FIG. 5B-2, where after it is detected that the extended contact lasted for 0.25 seconds, then a corresponding extended keyboard function for the "e" keyboard is activated in FIG. 5B-2).

In accordance with a determination that the first extended contact is over any of the respective displayed representations of the other keys (e.g., is over the representation of the "e" key in FIGS. 5B-1 and 5B-2, the electronic device interprets (608) the first extended contact as a keyboard input and activates a corresponding extended keyboard function (e.g., the accented options are shown in FIG. 5B-2). In some embodiments, the corresponding extended keyboard function is activated only upon detecting that the first extended contact has lasted for at least the extended-contact-during threshold (e.g., 0.25 seconds). Some of the other keys can be associated with only one keyboard function or with both a keyboard function (e.g., activated based on a momentary contact) and an extended keyboard function (e.g., activated based on an extended contact). In instances in which the first extended contact is over a key that is associated with only one keyboard function, then that one keyboard function is both the keyboard function and the extended keyboard function for that key (e.g., as shown in FIG. 5C-1, an extended contact 518 that lasts for 0.25 seconds over the "q" key still causes activation of the "q" key, as both the keyboard function and extended keyboard function for the "q" are the same).

The electronic device next detects (610) a second extended contact (e.g., distinct from the first extended contact, such as extended contact 532 depicted in FIG. 5E-1) over the virtual keyboard. In accordance with a determination that the second extended contact is over a respective displayed representation of the spacebar key (as is shown for extended contact 532 in FIG. 5E-1), the device interprets (612) the second extended contact as a mode-switching input that causes the electronic device to operate at least a portion of the touch-sensitive display as a trackpad. For example, as shown in FIG. 5E-2a, after the extended contact 532 has remained over the spacebar key for at least the extended-contact-duration threshold, then the device operates at least a portion of the touch-sensitive display as a trackpad. In some embodiments, the electronic device operates at least the portion of the touch-sensitive display as the trackpad before the second extended contact has lifted-off of the touch-sensitive display, allowing users to both activate the trackpad and immediately begin use of the trackpad in one fluid motion. In some embodiments, the portion of the touch-sensitive display is all of the touch-sensitive display.

On devices that do not include force sensors, devising a single-finger gesture that allows for switching to a trackpad mode, while also avoiding unnecessary confusion with other gestures is a very difficult task. Allowing a user to provide an extended contact over a spacebar key (or over another designated area of the virtual keyboard, such as a bottom portion of the virtual keyboard that does not include keys) to then operate the electronic device as a trackpad affords the user with a convenient way to quickly switch from a keyboard-input mode and to a trackpad mode. Providing this interaction at electronic devices that do not include force sensors enhances operability of these devices and makes the human-machine interfaces on these devices more efficient (e.g., by allowing users to easily switch to a trackpad mode using a simple gesture without have to waste time trying to place a cursor without using a trackpad mode or having to waste time using a complicated sequence of user inputs or menu options to activate the trackpad mode).

Turning now to FIG. 6B and continuing from operation 612, while operating the portion of the touch-sensitive display as the trackpad, the device detects (614) a lift-off of the second extended contact from the touch-sensitive display. Examples of such lift-offs are shown in the following figures: (1) as shown in FIG. 5E-4, extended contact 532 has lifted-off from the touch-sensitive display; (2) as shown in FIG. 5F-3 extended contact 538 has lifted-off from the touch-sensitive display; (3) as shown in FIG. 5G-3, extended contact 540 has lifted-off from the touch-sensitive display; and (4) as shown in FIG. 5H-3, extended contact 548 has lifted-off from the touch-sensitive display.

In response to detecting the lift-off of the second extended contact, the device optionally determines (614) whether any movement of the second extended contact across the touch-sensitive display prior to the lift-off satisfies a movement parameter.

Use of the movement parameter can allow the electronic device to accurately determine when to continue operating in the trackpad mode or when to exit the trackpad mode. By making the determination as to whether any movement of the second extended contact across the touch-sensitive display satisfies the movement parameter in response to detecting lift-off, the device preserves computing resources and only uses them to make this determination when the determination is immediately needed. In this way, operability of these devices is enhanced and the human-machine interfaces on these devices operates more efficiently (e.g., by avoiding wasting resources by making determinations before they are needed).

In some embodiments, the device determines (616) that movement of the second extended contact across the touch-sensitive display prior to the lift-off does not satisfy the movement parameter and, in response, ceases (616) to operate the portion of the touch-sensitive display as the trackpad. Examples of this behavior are shown in FIGS. 5E-3 to 5E-4 (slow movement, such as slower than 5 pixels/second of movement, before lift-off) and in FIGS. 5F-2 to 5F-3 (no or very little, such as less than 1 inch of, movement before lift-off). The ceasing can occur immediately, such as within 0.01 seconds after detecting the lift-off. In some embodiments, the device also re-displays the virtual keyboard and again operates the area in which the virtual keyboard was displayed in a keyboard-input mode.

Ceasing to operate the portion of the touch-sensitive display as the trackpad once it is determined that movement prior to the lift-off does not satisfy the movement parameter ensures that the trackpad mode is invoked only as long as the user needs it. By ensuring that the trackpad mode is invoked only as long as the user needs it, operability of the device is enhanced and the human-machine interfaces on this device operates more efficiently (e.g., by ensuring that the user is presented with the interface controls that they need and avoiding having users waste time trying to find the interface controls that they need).

In some embodiments, the determining that movement of the second extended contact across the touch-sensitive display prior to the lift-off does not satisfy the movement parameter includes determining (618) that the second extended contact moved less than a predetermined distance across the touch-sensitive display prior to the lift-off. For example, the second extended contact (e.g., extended contact 538, FIG. 5F-2) did not move at all, which indicates that the trackpad mode was accidentally invoked and, therefore switching right back to the keyboard-input mode is what the user will prefer. In some embodiments, the device also re-displays the virtual keyboard and again operates the area in which the virtual keyboard is displayed in a keyboard-input mode (as is shown in FIG. 5F-3).

Ceasing to operate the portion of the touch-sensitive display as the trackpad once it is determined that the second extended contact moved less than a predetermined distance across the touch-sensitive display prior to the lift-off ensures that the trackpad mode is invoked only as long as the user needs it. If the user moved the second extended contact a very short distance (or no distance at all), then this is an indication that the user has placed the cursor in a desired position and no longer needs to use the trackpad mode (or, when the contact moves no distance at all, this is an indication that the user accidentally invoked the trackpad mode). By ensuring that the trackpad mode is invoked only as long as the user needs it, operability of the device is enhanced and the human-machine interfaces on this device operates more efficiently (e.g., by ensuring that the user is presented with the interface controls that they need and avoiding having users waste time trying to find the interface controls that they need).

In some embodiments, the determining that movement of the second extended contact across the touch-sensitive display prior to the lift-off does not satisfy the movement parameter includes determining (620) that the second extended contact moved at less than a predetermined speed (e.g., less than a speed of 5 pixels/second or any appropriate speed that indicates that the user is finely placing the cursor) across the touch-sensitive display prior to the lift-off. This type of movement of the second extended contact can indicate that the user is moving cursor to a specific point and doesn't need trackpad any longer after they have placed the cursor at a desired position. An example is shown in FIG. 5E-3, in which prior to lift-off of contact 532, it moves 536 at a slow rate of speed (causing the cursor to be finely placed within the text appearing in region 502) and, thus, in FIG. 5E-4 the trackpad mode is exited.

Ceasing to operate the portion of the touch-sensitive display as the trackpad once it is determined that the second extended contact moved at less than a predetermined speed across the touch-sensitive display prior to the lift-off ensures that the trackpad mode is invoked only as long as the user needs it. If the user moved the second extended contact a slow speed, then this is an indication that the user has placed the cursor in a desired position and no longer needs to use the trackpad mode. By ensuring that the trackpad mode is invoked only as long as the user needs it, operability of the device is enhanced and the human-machine interfaces on this device operates more efficiently (e.g., by ensuring that the user is presented with the interface controls that they need and avoiding having users waste time trying to find the interface controls that they need).

The device can also determine (622) that movement of the second extended contact across the touch-sensitive display prior to the lift-off satisfies the movement parameter (e.g., the second extended contact moved quickly across the display after invoking the trackpad and before the lift-off, as is shown in FIG. 5H-2 for extended contact 548) and, in response, the device continues to operate the portion of the touch-sensitive display as the trackpad for at least a predetermined amount of time (e.g., for at least 0.5 seconds after detecting lift-off of the second extended contact from the touch-sensitive display).

Continuing to operate the portion of the touch-sensitive display as the trackpad once it is determined that the second extended contact satisfies the movement parameter ensures that the trackpad mode is invoked as long as the user needs it. If the user moved the second extended contact in a downward direction or at a quicker speed, then this is an indication that the user's lift-off of the second extended contact was done to allow the user to reposition their finger in order to continue moving the cursor (e.g., if they moved in a downward direction, they could run out of space and will need to lift-off to reposition their finger for continued movement of the cursor). By ensuring that the trackpad mode is invoked as long as the user needs it and without interrupting the user's movement of the cursor, operability of the device is enhanced and the human-machine interfaces on this device operates more efficiently (e.g., by ensuring that the user is presented with the interface controls that they need and avoiding having users waste time trying to find the interface controls that they need).

With reference now to FIG. 6C (which continues from operation 612 of FIG. 6A), the electronic device continues (624) to operate the portion of the touch-sensitive display as the trackpad for at least a predetermined amount of time after detecting a lift-off of the second extended contact from the touch-sensitive display. In some embodiments, the trackpad remains sticky (e.g., remains as the operating mode) even after a lift-off of the second extended contact is detected and no movement parameter is used to determine whether or not the trackpad should remain sticky. In some embodiments, the predetermined period of time is equal to or less than 1 second, equal to or less than 0.75 seconds, or equal to or less than 0.5 seconds.

In some embodiments, the trackpad is invoked (626) after the second extended contact has remained in contact with the touch-sensitive display for at least a second predetermined amount of time; and the second predetermined amount of time is less than the predetermined amount of time. For example, the second predetermined amount of time is the extended-contact-detection-time threshold discussed herein, such as 0.25 seconds. In some embodiments then, the trackpad thus remains sticky (in other words, the portion of the display continues to be operated as the trackpad for more than this 0.25 seconds) even after a lift-off is detected, which allows users to reposition their fingers without having to reactivate the trackpad mode again.

In some embodiments, the electronic device, in accordance with a determination that no input is detected over the portion of the touch-sensitive display for the predetermined amount of time after detecting the lift-off of the second extended contact, ceases to operate the portion of the touch-sensitive display as the trackpad. An example of this is shown in FIG. 5G-5, in which the portion of the touch-sensitive display is ceased to be operated as the trackpad after the predetermined amount of time (e.g., 0.5 seconds) has passed since detecting the lift-off of extended contact 540 in FIG. 5G-2.

Operation 630 depicted in FIG. 6C can follow operation 624/626 or can follow operation 614. In some embodiments, the electronic device detects (630) a double-tap input on the touch-sensitive display while operating the portion of the touch-sensitive display as the trackpad, the double-tap input being detected within a certain amount of time (e.g., 0.25 seconds or less) after detecting the lift-off of the second extended contact; and, in response to detecting the double-tap input, the device selects an object that is displayed on the touch-sensitive display. As an example, the object is located next to (on both sides, under, or adjacent) a cursor that is displayed in a content area of the touch-sensitive display that is outside of an area of the touch-sensitive display that was used to display the virtual keyboard. Selecting the object can include moving the cursor within the content area of the touch-sensitive display to provide a visual indication that the object has been selected. The object can be a word (or some other collection of alphanumeric characters and/or symbols), an image, or a combination of words and images.) An example double-tap input is shown in FIGS. 5J-2 to 5J-4, in which a first tap 556-1 is received (FIG. 5J-2), followed by lift-off of that tap (FIG. 5J-3), and followed by a second tap 556-2 (FIG. 5J-4). In response to detecting this double-tap, the device selects an object displayed in region 502, e.g., selects the word "Liberty" in FIG. 5J-5.

Allowing users to perform a double-tap input to select an object ensures that the users are able to select objects (e.g., text, images, or a combination of both) while in the trackpad mode. By ensuring that the trackpad mode allows for selection of objects, operability of the device is enhanced and sustained interactions with the device are then created.

In some embodiments, the device also detects a drag gesture (e.g., gesture 574, FIG. 5K-5) after the double-tap input and, in response, the device selects more of the object as the drag gesture moves (e.g., selects more of the displayed text within region 502). Stated another way, a user is able to perform a drag gesture immediately after a double-tap input selection gesture in order to adjust how much of the object to select. Allowing users to perform a drag gesture after a double-tap input to select more (or less) of an object ensures that the users are able to select only those portions of the object that they would like to select (e.g., portions of text, images, or a combination of both) while in the trackpad mode. By ensuring that the trackpad mode allows for fine-grained selection of objects, operability of the device is enhanced and sustained interactions with the device are then created.

With reference now to FIG. 6D, the device detects (634) a third extended contact over a part of the virtual keyboard below the displayed representation of the spacebar key, the part of the virtual keyboard not including any of the other keys (the third extended contact could be received before or after the second extended contact and represents another way to invoke the trackpad). In accordance with a determination that the third extended contact is over a part of the virtual keyboard that is below the displayed representation of the spacebar key and that is not used to display any of the representations of the other keys, the device interprets (636) the third extended contact as a mode-switching input that causes the electronic device to operate at least a portion of the touch-sensitive display as a trackpad. In some embodiments, a gray-space part of the virtual keyboard can also be used to invoke the trackpad mode, such as the area that is beneath the spacebar key (stated another way, instead of or in addition to using the displayed representation of the spacebar key as a mode-switching area, another area such as the area that is beneath the spacebar key may alternatively or additionally be used as a mode-switching area). In one example, when the virtual keyboard is in an emoji mode, then an extended contact at the bottom of the virtual keyboard beneath the individual emoji keys may be interpreted as the mode-switching input.

Moving on to FIG. 6E, an extended contact (or a momentary contact) over any of the respective displayed representations of the other keys causes (638) activation of a corresponding extended keyboard function and does not cause the electronic device to operate any portion of the touch-sensitive display as the trackpad. At least some of the other keys of the virtual keyboard can also be respectively associated (640) with a corresponding keyboard function that is activated in response to a momentary contact over the key and with a corresponding extended keyboard function that is activated in response to an extended contact over the key. As an example, as shown in FIG. 5B-2, an extended contact over the "e" key causes activation of an extended keyboard function for the "e" key (display of accented input options) and a momentary contact over the "e" key (FIG. 5A-1) causes activation of a default keyboard function, such as registering an actuation of the "e" key. For certain keys of the other keys, the corresponding extended keyboard function and corresponding default keyboard function may be the same, such as for the "q" key as depicted in FIGS. 5C-1 to 5C-2.).

In some embodiments, while the virtual keyboard is displayed and before operating as the trackpad, the area is operated in a keyboard-input mode in which user input at any of the other keys of the virtual keyboard is interpreted as keyboard input activating keyboard functions or extended keyboard functions, depending on the type of input received (either momentary or extended contacts). Both before and after the first extended contact, the area remains operating in the keyboard-input mode. In this way, only extended contacts over a predesignated mode-switching area, such as over the spacebar key or an area under the spacebar key, will cause activation of the trackpad.

Operating a same area of the display that was used for the virtual keyboard as the trackpad allows users to immediately begin using the trackpad without having to relocate/reposition their finger after invoking the trackpad, instead they simply begin moving their finger as desired to move a cursor and/or to select objects (e.g., using the double-tap and double-tap-and-drag gestures discussed above). Additionally, ceasing to display at least some of the displayed symbols of the virtual keyboard provides users with a clear visual indication that trackpad mode has been invoked. By providing these features, operability of the device is enhanced and sustained interactions with the device are then created (e.g., users do not need to waste time with finger repositioning and will not be confused as to when the trackpad has been invoked, thereby allowing for the sustained interactions with the device).

In some embodiments, the displayed virtual keyboard does not include (642) a function (fn) key, as is shown in FIG. 5D-1.

Turning now to FIG. 6F, the virtual keyboard is displayed (644) in an area of the touch-sensitive display and each of the displayed representations of the other keys includes a respective displayed symbol, and operating at least the portion of the touch-sensitive display as the trackpad includes (i) operating the area as part of the trackpad and (ii) ceasing to display at least some of the displayed symbols of the virtual keyboard. In other words, while operating as the trackpad, the area of the touch-sensitive display that was previously used to display the virtual keyboard is now operated as the trackpad (as is shown in FIG. 5E-2a, in which the area that was previously used to display the virtual keyboard in FIG. 5E-1 is now used as a part of the trackpad). In some embodiments, the device ceases to display all of the symbols on the virtual keyboard and can replace the displayed virtual keyboard with an image that represents a trackpad (depicted in FIG. 5E-2b). In some embodiments, the device can still show key boundaries while operating the portion of the touch-sensitive display as the trackpad, but does not display keyboard symbols (depicted in FIG.

5E-2a), and in this way the device provides a clear visual indication to a user that the area is now being operated as a trackpad)

Additionally, while operating the portion of the display as the trackpad, any input at the touch-sensitive display over at least the portion controls (646) movement of a cursor that is displayed in another portion of the touch-sensitive display. For example, while operating as the trackpad, swipe gestures that move across the touch-sensitive display cause a cursor that is displayed on the touch-sensitive display to be moved in accordance with movement of the swipe gesture.

In some embodiments, haptic feedback is also provided in conjunction with invoking operation of the portion of the touch-sensitive display as the trackpad (648). For example, once it is detected that there is an extended contact over the displayed representation of the spacebar key for at least the extended-contact-duration threshold (e.g., 0.25 seconds), then the device both switches to operate in the trackpad mode and also provides haptic/tactile feedback (FIG. 5H-1) to indicate that the mode has switched.

Although devices without any force sensors are used as a primary explanatory example above, the extended contact that is used to activate a trackpad mode in method 600 can also be implemented on devices that do include force sensors, but detection of these single-finger gestures does not require use any of the force signals that might be generated by such force sensors (stated another way, even if the device did have force sensors, such force sensors are not required to detect the single-finger trackpad-activation gesture, e.g., the extended contact over a predetermined mode-switching area of a virtual keyboard (examples of the mode-switching area include a spacebar key or an area of the virtual keyboard that is below the spacebar key)). Additionally, although an extended contact over a displayed representation of a spacebar key is used as a primary explanatory example of a trackpad-activation gesture above, the extended contact can also be received over another mode-switching area, such as over an area of the virtual keyboard that is located below the displayed representation of the spacebar key and that does not include any displayed representations of keys (e.g., an empty space of the virtual keyboard that does not include any keys).

It should be understood that the particular order in which the operations in FIGS. 6A-6F have been described is merely one example and is not intended to indicate that the described order is the only order in which the operations could be performed. One of ordinary skill in the art would recognize various ways to reorder the operations described herein and/or to combine the operations in various ways with the operations described with reference to FIGS. 4, 7, and 9A-9D.

FIG. 7 is a flowchart illustrating a method 700 of activating a trackpad mode using one or more single-finger gestures including a tip-to-print roll gesture, in accordance with some embodiments. The method 700 is performed at a portable multifunction device (e.g., the device 100 in FIG. 1A) with a touch-sensitive display (e.g., the touch screen display 112 in FIG. 1A). As described below, the method 700 provides a mechanism for activating a trackpad mode (e.g., from a keyboard mode) at a portable multifunction device with a touch-sensitive display. This method does not require the portable multifunction device to include a contact intensity sensor (e.g., a force sensor, or a pressure sensor), thus reducing the cost for designing and manufacturing the portable multifunction device. That said, in some embodiments, the method may still be used on a device having a force sensor. The method is also intuitive to a user, thereby reducing the number, extent, and/or nature of the inputs from the user when activating the trackpad mode, and creating a more efficient human-machine interface. A more efficient input mechanism also requires less computing resources, thereby increasing battery life of the device.

FIGS. 8A-1 to 8F illustrate examples of user interfaces for activating a trackpad mode using finger gestures including a tip-to-print roll gesture, in accordance with some embodiments. The user interfaces in FIGS. 8A-1 to 8F are used to illustrate the processes described with respect to FIG. 7 and FIGS. 9A-9D.

In FIG. 8A-1, editable content 800 is displayed in a content presentation region 802 while an application (e.g., notes application 153 or message application 141) is in a text editing mode. In some embodiments, the content 800 in the content presentation region 802 comprises text (e.g., plain text, unstructured text, formatted text, or text in a web page). In other embodiments, the content comprises graphics with or without text. Moreover, the content may be editable or read-only. In addition to displaying the content, when no content is selected, the device 100 may display a cursor (e.g., cursor 822) within the electronic document, e.g., for text entry. In addition, a virtual keyboard 821 is displayed for text input.

In some embodiments, the device 100 has capacitive sensor array (not shown, but described above in relation to FIG. 1A) that generate output signals for measuring proximity, position, displacement, and/or acceleration of one or more contacts with the touch-sensitive display. In some embodiments, the device 100 continuously monitors touch inputs and continuous movements of the touch inputs on the touch screen 112.

In some embodiments, while displaying the content of the electronic document, the device 100 detects a change in the output signal of the sensor array. In some embodiments, the device 100 determines a centroid of a contact input based on the signals registered with one or more sensors (e.g., capacitive electrodes) of the sensor array. The centroid is used to determine a location of a corresponding contact input on the touch screen. In some embodiments, the centroid is the geometric center of the contact area. In some embodiments, the centroid is the geometric center of an area of the touch sensitive surface that is being contacted or touched by the user (e.g., the area with a measured capacitance over a predetermined threshold). In some embodiments, the centroid is determined to be at a location corresponding to one or more sensors of the sensor array that output the strongest signals (e.g., the geometric center of the one or more sensors outputting the strongest signals).

In some embodiments, the device 100 determines what type of finger gesture has been made on the touch sensitive display by detecting one or more parameters selected from (1) a change in the contact area, (2) a change in the location of the centroid, (3) a change in the speed of the movement of the centroid, (4) a change in a saturation level of at least one of the plurality of touch sensors, and (5) a change in an angle of a user's finger making the contact relative to the touch sensitive display. These may occur, for example, when the user rolls their finger on the touch sensitive surface from the tip of the user's finger to the flatter part of the user's finger (e.g., the print or where the user's fingerprint is located).

Referring to FIGS. 7 and 8A-1, in some embodiments, the device 100 first detects a contact 830-1 on the keyboard 812. Based on the output signal from the sensor array of the device in response to the contact 830-1 that is detected on the sensor arrays, the device 100 may determine that contact 830-1 corresponds to a contact between a user's fingertip ("tip") and the touch screen.

In some embodiments, as shown in FIG. 8A-2, the output signal of the contact 830-2 may indicate that a contact area has increased from the contact 830-1 in FIG. 8A-1, and the location of the contact centroid has moved downward as the user further rolls their finger or presses harder. In some embodiments, the changes in the contact area and the location of the contact centroid are continuous from the contact 830-1 to the contact 830-2, i.e., there is no break in contact (e.g., a lift-off event). In some embodiments, as further monitored in FIG. 8A-3, the output signal of the contact 830-3 indicates that the contact area continues to increase and the contact centroid continues to move downward as the user further rolls their finger or presses harder. The device 100 may determine that contact 830-3 corresponds to a contact between a fingerprint portion ("print") of a user's finger and the touch screen.

In some embodiments, the device 100 determines that a tip-to-print roll gesture has been detected (702) from FIG. 8A-1 to FIG. 8A-3. In response to detecting a tip-to-print roll gesture, as shown in FIG. 8A-3, the device 100 enters (704) the trackpad mode. For example, the trackpad 823 replaces the keyboard 821, where the trackpad 823 does not display the alphanumeric characters on the keys. In some embodiments, the trackpad 823 shows the boundaries of each of the individual virtual keys without the alphanumeric characters. In some other embodiments as shown in FIG. 5E-2b, the trackpad removes the boundaries of the virtual keys from the virtual keyboard to provide a visual indication that the virtual keyboard has changed into a trackpad mode. In some embodiments, once the soft trackpad mode is activated, the device 100 further displays a ghost cursor 825 offset from the current location of the real cursor 822 as shown in FIG. 8A-3.

In some embodiments, the device 100 detects (705) a second gesture (e.g., a movement, a lift-off event, or another roll gesture, such as an unroll gesture). The device 100 proceeds to determine (706) a gesture type of the second gesture that follows the tip-to-print roll gesture detected at step 702.

In some embodiments, the device 100 detects that the print contact 830-3 moves (712) on the trackpad 823. For example, as shown in FIG. 8A-4, based on the output signal of contact 830-3, the device 100 can determine a curved movement path 834 of the centroid of the contact 830-3. Accordingly, the device 100 determines that the print contact 830-3 moves (834) along the same curved path. In response, the cursors move (714) in the content presentation region 802 along the same curved path. In some embodiments, the device 100 proceeds to detect (715) a next gesture (e.g., a continued movement of the contact, a lift-off event, or another roll gesture, etc.) The device then determines (706) the gesture type of this next gesture following the movement of the fingerprint contact and the cursor(s) on the touch screen (e.g., movement 834 in FIG. 8A-4).

In some embodiments as shown in FIG. 8B, the device 100 detects no output signal on the sensor array, and the device 100 determines (708) that a finger lift-off event of the print contact 830-3 has occurred. In response, the device 100 exits (710) the trackpad mode, and the keyboard 821 replaces the trackpad 823 on the touch screen.

In some embodiments as shown in FIG. 8C-1, based on the output signal from the device in response to the print contact 830-3 that follows the tip-to-print roll gesture (e.g., as discussed with reference to FIGS. 8A-1 to 8A-4) and without any lift-off event, the device 100 determines (705) a print contact 830-3 remains on the trackpad 823. In some embodiments, as shown in FIG. 8C-2, the output signal from the device in response to the contact indicates that a contact area has decreased from the contact 830-3 in FIG. 8C-1, and the location of the contact centroid has moved upward as the user further unrolls his or her finger (from fingerprint to fingertip) or presses lighter.

In some embodiments, as further monitored in FIG. 8C-3, the output signal of the contact 830-3 indicates that the contact area continues to decrease and the contact centroid continues to move upward as the user further unrolls his or her finger or presses lighter on the touch screen. The device 100 may determine that contact 830-1 corresponds to a contact between a fingertip portion ("tip") of a user's finger and the touch screen.

In some embodiments, after detecting the change of one or more parameters (e.g., area size, velocity, centroid movement, etc.) of the user's finger contact on the touch screen as discussed with reference to FIG. 8C-1 to FIG. 8C-3, the device 100 determines (716) that a print-to-tip unroll gesture has been detected. In response, as shown in FIG. 8C-3, the device 100 maintains (718) the trackpad mode. The device 100 then detects (719) a third gesture (e.g., a lift-off event, a movement of the contact, or another roll gesture, such as a re-roll gesture). The device 100 proceeds to determine (720) a gesture type of the third gesture.

In some embodiments, the device 100 detects that the fingertip contact 830-1 moves (726) on the trackpad 823. For example, as shown in FIG. 8C-4, based on the output signal from the device in response to the contact 830-1, the device 100 detects (719) a curved movement path 835 of the centroid of the contact 830-1. Accordingly, the device 100 determines that the fingertip contact 830-1 moves (835) along the same curved path. In response, the cursors move (728) in the content presentation region 802 along the same curved path. In some embodiments, the device 100 proceeds to detect (729) a next gesture (e.g., a continued movement of the contact, a lift-off event, or another roll gesture, etc.). The device then determines (720) the gesture type of this next gesture following the movement of the fingertip contact on the touch screen (e.g., movement 835 in FIG. 8C-4).

In some embodiments as shown in FIG. 8D, the device 100 detects no output signal on the sensor arrays, thus determines (722) that a finger lift-off event of the print contact 830-1 has occurred. In response, the device 100 exits (724) the trackpad mode, and the keyboard 821 replaces the trackpad 823 on the touch screen.

In some embodiments as shown in FIG. 8E-1, based on the output signal from the device in response to the fingertip contact 830-1 that follows the print-to-tip unroll gesture (e.g., as discussed with reference to FIGS. 8C-1 to 8C-4) and without any lift-off event, the device 100 determines (719) a fingertip contact 830-1 remains on the trackpad 823. In some embodiments, as shown in FIG. 8E-2, the output signal from the device in response to the contact indicates that a contact area has increased from the contact 830-1 in FIG. 8E-1, and the location of the contact centroid has moved downward as the user further rerolls his or her finger (from fingertip to fingerprint) or presses harder.

In some embodiments, as further monitored in FIG. 8E-3, the output signal of the contact 830-3 indicates that the contact area continues to increase and the contact centroid continues to move downward as the user further rerolls his or her finger or presses harder on the touch screen. The device 100 may determine that contact 830-3 corresponds to a contact between a fingerprint portion ("print") of a user's finger and the touch screen.

In some embodiments, after detecting the change of one or more parameters (e.g., area size, velocity, centroid movement, etc.) of the user's finger contact on the touch screen as discussed with reference to FIGS. 8E-1 to 8E-3, the device 100 determines the device 100 determines (730) that a tip-to-print re-roll gesture has been detected. In response, as shown in FIG. 8E-3, the device 100 selects (732) one or more objects (e.g., texts, image, etc.) on the touch screen. In some embodiments, the device 100 selects the object(s) associated with where the cursor(s) are located at on the touch screen.

The device 100 then detects (733) a fourth gesture (e.g., a lift-off event, a movement of the contact, or another roll gesture, etc.). The device 100 proceeds to determine (734) a gesture type of the fourth gesture.

In some embodiments, the device 100 detects that the fingerprint contact 830-3 moves (740) on the trackpad 823. For example, as shown in FIG. 8E-4, based on the output signal from the device in response to contact 830-3, the device 100 can determine a curved movement path 860 of the centroid of the contact 830-3. In some embodiments as shown in FIG. 8E-4, the device 100 selects (742) more object(s) displayed in the content presentation region 802. For example, as shown in FIG. 8E-4, the more selected texts are located proximate the area where the curved path 860 goes through in the content presentation region 802.

In some embodiments, the device 100 proceeds to detect (743) a next gesture (e.g., a continued movement of the contact, a lift-off event, or another roll gesture, etc.). The device then determines (734) the gesture type of this next gesture following the movement of the fingerprint contact on the touch screen (e.g., movement 860 in FIG. 8E-4).

In some embodiments as shown in FIG. 8F, the device 100 detects no output signal on the sensor arrays, thus determines (736) that a finger lift-off event of the print contact 830-3 has occurred. In response, the device 100 exits (738) the trackpad mode, and the keyboard 821 replaces the trackpad 823 on the touch screen.

FIGS. 9A-9D is a flow chart illustrating a method 900 of activating a touchpad mode using a single-finger roll gesture, in accordance with some embodiments. The method 900 is performed at a portable multifunction device (e.g., the device 100 in FIG. 1A) with a touch screen display (e.g., the touch screen display 112 in FIG. 1A). As described below, the method 900 provides a mechanism for activating a trackpad mode at a portable multifunction device with a touch screen display. This method does not require the portable multifunction device to include a contact intensity sensor (e.g., a force sensor, or a pressure sensor), thus reducing the cost for designing and manufacturing the portable multifunction device. The method is also intuitive to a user, thereby reducing the number, extent, and/or nature of the inputs from the user when activating the trackpad mode, and creating a more efficient human-machine interface. A more efficient input mechanism also requires less computing resources, thereby increasing battery life of the device.

Figure 9A:
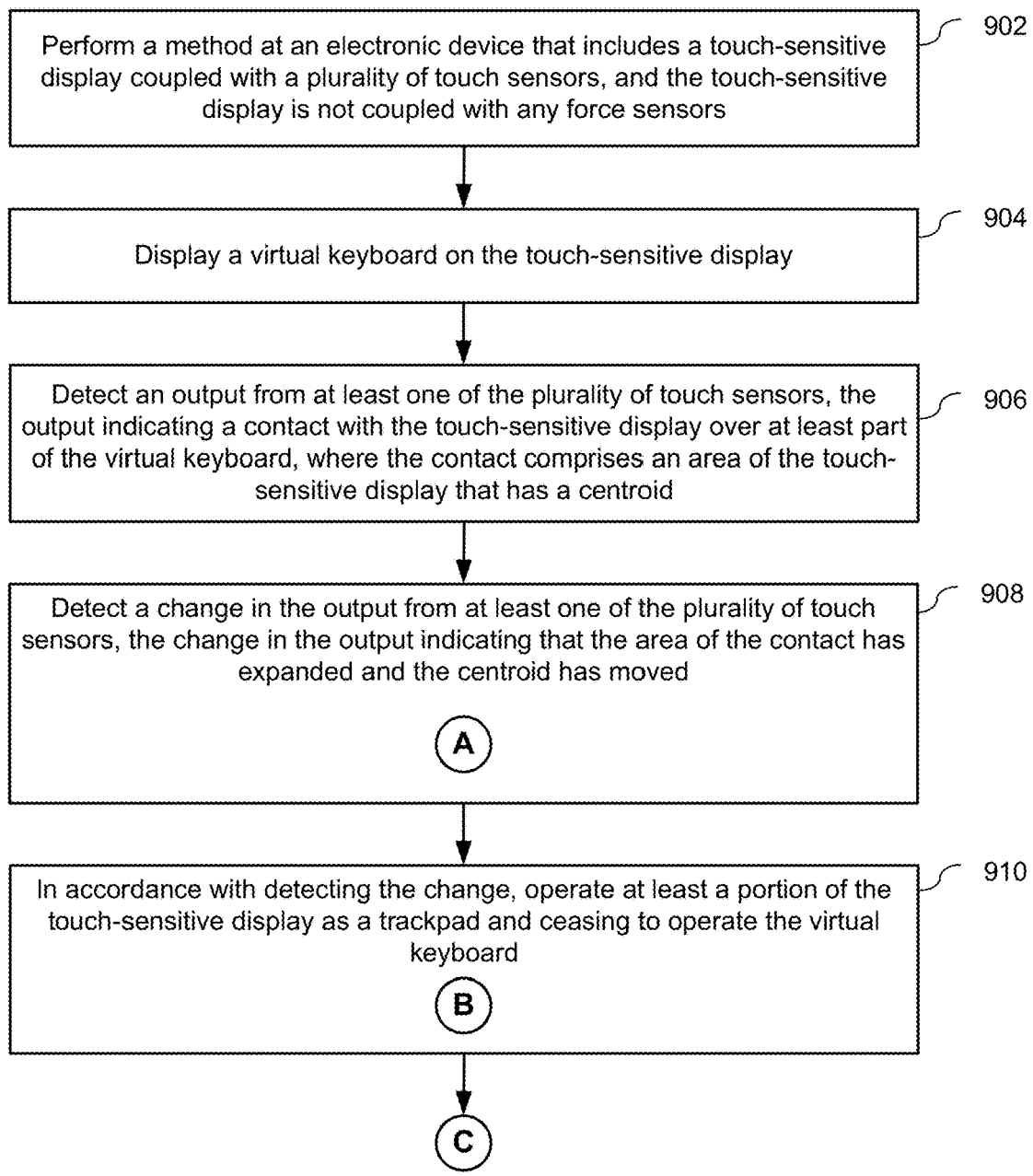

As shown in FIG. 9A, the method 900 is performed at an electronic device that includes a touch-sensitive display coupled with a plurality of touch sensors, wherein the touch-sensitive display is not coupled with any force sensors. In other words, the electronic device is not able to directly detect changes in intensities of contact, as the device lacks any force sensors. In some embodiments, the touch sensors of the plurality of touch sensors are capacitive touch sensors. Again, in some embodiments, force sensors are present in the device, but are not used in performing the method 900.

In performing the method 900, the device displays (904) a virtual keyboard on the touch-sensitive display (e.g., virtual keyboard 821 is shown as displayed in FIG. 8A-1). The device also detects (906) an output from at least one of the plurality of touch sensors, the output indicating a contact with the touch-sensitive display over at least part of the virtual keyboard, where the contact comprises an area of the touch-sensitive display that has a centroid. A representation of this output is shown in FIG. 8A-1 (in the bottom right corner), in which the device is able to derive information regarding the area contact by the contact and is also able to determine a centroid of this area.

The device also detects (908) a change in the output from at least one of the plurality of touch sensors, the change in the output indicating that the area of the contact has expanded and the centroid has moved. For example, the device may be detecting a roll of the user's finger that causes the user's finger to contact a different area of the touch-sensitive display, the different area (i) being larger than the first area and (ii) having a different centroid distinct and separate from the centroid, the different centroid being over at least part of the user interface element. In some embodiments, the device monitors the output from the touch sensors (e.g., capacitance signals) to determine a variety of parameters, including area of the contact and location of a centroid (among others that are discussed in more detail below). In this way, the device is able to finely discriminate between different types of gestures. An example is depicted in FIGS. 8A-1 to 8A-3, in which a user provides a roll gesture that beings in 8A-1 and concludes in 8A-3, and the representations of the touch sensor output in each of these figures shows how the area expands and the centroid moves.

The inventors have discovered that it is important to monitor both expansion of the area and movement of the centroid (and other input characteristics, such as saturation of capacitance sensors, velocity of movement of the centroid, and/or a calculated angle of a user's finger making the contact relative to the touch-sensitive display) in order to determine that a tip-to-print roll gesture has been detected. Monitoring only one of these parameters, and not both, results in inefficient recognition of the gesture, thereby, causing frustration to users that may accidentally invoke trackpad mode when it is not needed.

In accordance with detecting the change, the device operates (910) at least a portion of the touch-sensitive display as a trackpad and ceases to operate the virtual keyboard (e.g., so that inputs over the portion of the touch-sensitive display control movement of a cursor that is displayed in another area of the touch-sensitive display that is outside of the area).

Allowing a user to roll a single finger over the virtual keyboard to then operate the electronic device as a trackpad affords the user with a convenient way to quickly switch from a keyboard-input mode and to a trackpad mode using only a single finger; and detecting that roll by monitoring both expansion of the area and movement of the centroid ensures that the gesture is accurately detected and is not confused with other types of gestures. Providing this interaction at electronic devices that do not include force sensors enhances operability of these devices and makes the human-machine interfaces on these devices more efficient (e.g., by allowing users to easily switch to a trackpad mode using a simple gesture without have to waste time trying to place a cursor without using a trackpad mode or having to waste time using a complicated sequence of user inputs or menu options to activate the trackpad mode).

Turning now to FIG. 9B, in some embodiments, text is displayed on the touch-sensitive display in an area of the touch-sensitive display that is adjacent to the displayed virtual keyboard and a cursor is displayed at a position within the text. The device optionally, while continuing to operate the portion of the touch-sensitive display as the trackpad, detects (912) an additional change in the output from at least one of the plurality of touch sensors, the additional change in the output indicating that the area of the contact has reduced and the centroid has moved (e.g., un-roll of the user's finger, as depicted in FIGS. 8C-1 to 8C-3) and, in response to detecting the additional change in the output, the device maintains display (912) of the cursor at the position within the text (e.g., user can un-roll to begin moving the cursor, but that un-roll will not cause the cursor to move around). As shown in FIG. 8C-3, after the un-roll gesture is complete, the position of the cursor within region 802 is the same as it was in FIG. 8C-1 when the un-roll gesture began.

Ensuring that the cursor does not move (e.g., maintains its position) as a user un-rolls their finger over the touch-sensitive display, helps to ensure that the cursor is accurately placed based on the user's intent. When the user is just un-rolling their finger, they are doing so before they have started moving the cursor. Alternatively, an unroll gesture (e.g., a print-to-tip unroll) can also occur after the user moves the cursor but without lifting-off his or her finger from the touch screen. By maintaining the cursor in place during the un-roll, therefore, operability of the device is enhanced and the human-machine interface is made to operate more efficiently (e.g., by ensuring that the user need not waste time reversing unintended cursor movements).

In some embodiments, after detecting the additional change and while continuing to operate the portion of the touch-sensitive display as the trackpad, movement of the contact across the touch-sensitive display causes (914) the cursor to move to different positions within the text. For example, as shown in FIG. 8C-4, movement 834 of the contact 836-3 across the touch-sensitive display 112 causes corresponding movement of the cursor within region 802.

In some embodiments, the electronic device also, while continuing to operate the portion of the touch-sensitive display as the trackpad: detects (916) one more change in the output from at least one of the plurality of touch sensors, the one more change indicating that the area of the contact has expanded and the centroid has moved (e.g., another tip-to-print gesture is detected); and in response to detecting the one more change, the device selects (916) at least a part of the text. For example, as shown in FIG. 8E-1 to 8E-3, a new roll gesture is detected while the device is already operating the portion of the touch-sensitive display as the trackpad, and, therefore in response to the new roll gesture, text is selected within the region 802 (as depicted in FIG. 8E-3).

In some embodiments, the electronic device detects (918) a lift-off of the contact from the touch-sensitive display, and, in response, ceases (918) to operate the portion of the touch-sensitive display as the trackpad. For example, as shown in FIG. 8F, after lift-off of the contact 840-3 is detected, the device then ceases to operate the portion of the touch-sensitive display as the trackpad (as is shown in FIG. 8F).

Turning now to FIG. 9C, in some embodiments, the output and the change in the output are detected (920) based at least in part on capacitance signals registered or measured by at least one of the plurality of touch sensors. Detecting the output and the change in the output based at least in part on capacitance signals helps to ensure that the gesture is accurately detected and is not confused with other types of gestures, and enables devices that do not include force sensors to accurately detected new gesture types, such as the roll/tip-to-print gesture discussed herein. Providing this accurate detection at electronic devices that do not include force sensors enhances operability of these devices and makes the human-machine interfaces on these devices more efficient (e.g., by allowing users to easily switch to a trackpad mode using a simple gesture without have to waste time trying to place a cursor without using a trackpad mode or having to waste time using a complicated sequence of user inputs or menu options to activate the trackpad mode).

In some embodiments, the change in the output is detected (922) based on one or more of: (i) a velocity of movement of the centroid; (ii) change in size of the area; (iii) saturation level of at least one of the plurality of touch sensors; and (iv) a calculated angle of a user's finger making the contact relative to the touch-sensitive display.

In some embodiments, the change in the output is further detected (924) based on a velocity of movement of the centroid.

In some embodiments, the change in the output is further detected (926) based on a change in size of the area.

In some embodiments, the change in the output is further detected (928) based on a saturation level of at least one of the plurality of touch sensors.

In some embodiments, the change in the output is further detected (930) based on a calculated angle of a user's finger making the contact relative to the touch-sensitive display.

Monitoring the other pieces of data discussed above (e.g., with respect to operations 922 to 930) to detect the output and the change in the output helps to ensure that the gesture is accurately detected and is not confused with other types of gestures, and enables devices that do not include force sensors to accurately detected new gesture types, such as the roll/tip-to-print gesture discussed herein. Monitoring this additional data helps to improve the accuracy of detecting this new gesture at electronic devices that do not include force sensors, thereby enhancing operability of these devices and making the human-machine interfaces on these devices more efficient (e.g., by ensuring that the gesture is accurately detected, users will not have to waste time reversing activation of undesired functions).

Figure 9D:
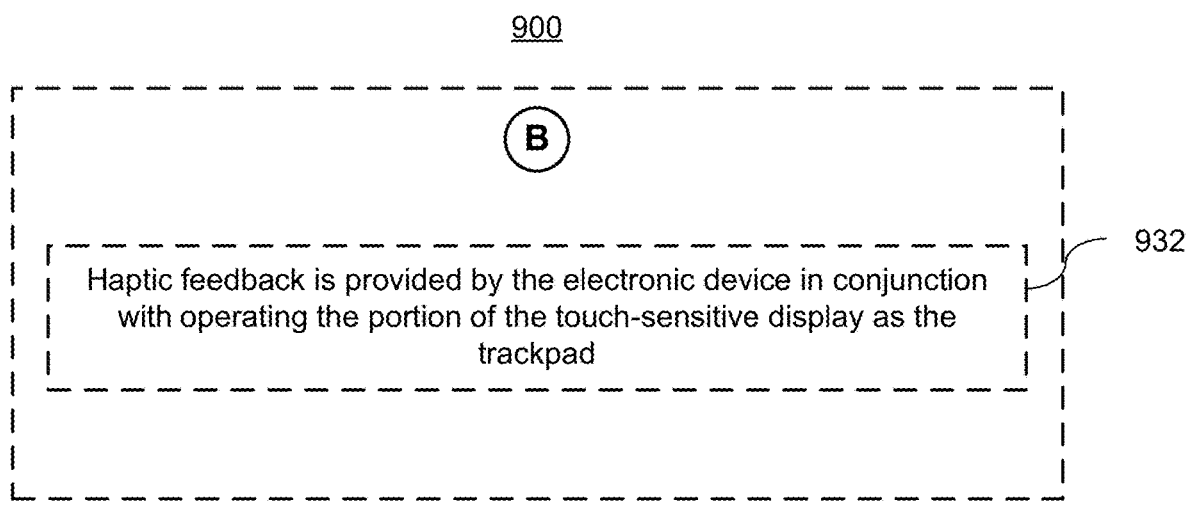

Turning now to FIG. 9D, in some embodiments, haptic/tactile feedback is provided in conjunction with (e.g., at the same time as) operating the portion of the touch-sensitive display as the trackpad. For example, once the tip-to-print roll gesture is detected (e.g., expansion of the contact area and movement of the centroid is detected), then the haptic/tactile feedback is provided at the same time as the portion of the touch-sensitive display is switched to operate as the trackpad.

In some embodiments, the roll gesture can be used in addition to or as an alternative to the extended contact gesture discussed above. As such, the features discussed above regarding the extended contact gesture used to invoke the trackpad mode (e.g., method 600) may be used in addition to the features described here regarding the roll gesture.

It should be understood that the particular order in which the operations in FIGS. 9A-9D have been described is merely one example and is not intended to indicate that the described order is the only order in which the operations could be performed. One of ordinary skill in the art would recognize various ways to reorder the operations described herein and/or to combine the operations in various ways with the operations described with reference to FIGS. 4, 7, and 6A-6F.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device that includes a touch-sensitive display coupled with a plurality of touch sensors, wherein the touch-sensitive display is not coupled with any force sensors:
displaying a virtual keyboard on the touch-sensitive display, the virtual keyboard including displayed representations of a spacebar key and other keys;
detecting a first extended contact over the virtual keyboard;
in accordance with a determination that the first extended contact is over any of the respective displayed representations of the other keys, interpreting the first extended contact as a keyboard input and activating a corresponding extended keyboard function; and
detecting a second extended contact over the virtual keyboard; and
in accordance with a determination that the second extended contact is over a respective displayed representation of the spacebar key:
interpreting the second extended contact as a mode-switching input that causes the electronic device to operate at least a portion of the touch-sensitive display as a trackpad; and
changing a visual appearance of the virtual keyboard from a virtual keyboard appearance to a trackpad appearance; and
maintaining the trackpad appearance for at least a predetermined amount of time after detecting a lift-off of the second extended contact from the touch-sensitive display, wherein the predetermined amount of time is a non-zero amount of time.

2. The method of claim 1, further comprising,
while operating as the trackpad:
in response to detecting the lift-off of the second extended contact, determining whether any movement of the second extended contact across the touch-sensitive display prior to the lift-off satisfies a movement parameter.

3. The method of claim 2, further comprising:
determining that movement of the second extended contact across the touch-sensitive display prior to the lift-off does not satisfy the movement parameter and, in response, ceasing to operate the portion of the touch-sensitive display as the trackpad.

4. The method of claim 3, wherein the determining that movement of the second extended contact across the touch-sensitive display prior to the lift-off does not satisfy the movement parameter includes determining that the second extended contact moved less than a predetermined distance across the touch-sensitive display prior to the lift-off.

5. The method of claim 3, wherein the determining that movement of the second extended contact across the touch-sensitive display prior to the lift-off does not satisfy the movement parameter includes determining that the second extended contact moved at less than a predetermined speed across the touch-sensitive display prior to the lift-off.

6. The method of claim 2, further comprising:
determining that movement of the second extended contact across the touch-sensitive display prior to the lift-off satisfies the movement parameter and, in response, continuing to operate the portion of the touch-sensitive display as the trackpad for at least the predetermined amount of time.

7. The method of claim 6, further comprising:
detecting a double-tap input on the touch-sensitive display while operating the portion of the touch-sensitive display as the trackpad, the double-tap input being detected within a certain amount of time after detecting the lift-off of the second extended contact; and,
in response to detecting the double-tap input, selecting an object that is displayed on the touch-sensitive display.

8. The method of claim 7, further comprising, detecting a drag gesture after the double-tap input and, in response, selecting more of the object as the drag gesture moves.

9. The method of claim 1, further comprising:
in conjunction with maintaining the trackpad appearance, continuing to operate the portion of the touch-sensitive display as the trackpad for at least the predetermined amount of time after detecting a lift-off of the second extended contact from the touch-sensitive display.

10. The method of claim 9, wherein the trackpad is invoked after the second extended contact has remained in contact with the touch-sensitive display for at least a second predetermined amount of time; and the second predetermined amount of time is less than the predetermined amount of time.

11. The method of claim 9, further comprising, in accordance with a determination that no input is detected over the portion of the touch-sensitive display for the predetermined amount of time after detecting the lift-off of the second extended contact, ceasing to operate the portion of the touch-sensitive display as the trackpad.

12. The method of claim 1, wherein an extended contact over any of the respective displayed representations of the other keys causes activation of a corresponding extended keyboard function and does not cause the electronic device to operate any portion of the touch-sensitive display as the trackpad.

13. The method of claim 12, wherein:
the virtual keyboard is displayed in an area of the touch-sensitive display and each of the displayed representations of the other keys includes a respective displayed symbol, and wherein
operating at least the portion of the touch-sensitive display as the trackpad includes (i) operating the area as part of the trackpad, and (ii) ceasing to display at least some of the displayed symbols of the virtual keyboard.

14. The method of claim 1, further comprising:
detecting a third extended contact over a part of the virtual keyboard below the displayed representation of the spacebar key, where the part of the virtual keyboard does not include any of the other keys; and
in accordance with a determination that the third extended contact is over the part of the virtual keyboard, interpreting the third extended contact as a mode-switching input that causes the electronic device to operate at least a portion of the touch-sensitive display as a trackpad.

15. The method of claim 1, wherein, while operating as the trackpad, any input at the touch-sensitive display over at least the portion controls movement of a cursor that is displayed in another portion of the touch-sensitive display.

16. The method of claim 1, wherein at least some of the other keys of the virtual keyboard are respectively associated with a corresponding keyboard function that is activated in response to a momentary contact over the key and with a corresponding extended keyboard function that is activated in response to an extended contact over the key.

17. The method of claim 1, further comprising:
providing haptic feedback in conjunction with invoking operation of the portion of the touch-sensitive display as the trackpad.

18. The method of claim 1, wherein the displayed virtual keyboard does not include a function (fn) key.

19. The method of claim 1, wherein the mode-switching input causes the electronic device to operate all of the touch-sensitive display as a trackpad.

20. The method of claim 19, wherein:
while operating all of the touch-sensitive display as the trackpad, any input at the touch-sensitive display controls movement of a cursor that is displayed on the touch-sensitive display, and
a swipe gesture that moves across the touch-sensitive display causes the cursor that is displayed on the touch-sensitive display to be moved in accordance with movement of the swipe gesture, the swipe gesture including upward and/or downward movement.

21. The method of claim 1, wherein the extended contact is a long press that remains in a stationary position over the respective displayed representation of the spacebar key.

22. A non-transitory computer-readable storage medium storing executable instructions that, when executed by one or more processors of an electronic device with a touch-sensitive display, wherein the electronic device is not coupled with any force sensors, cause the electronic device to:
display a virtual keyboard on the touch-sensitive display, the virtual keyboard including displayed representations of a spacebar key and other keys;
detect a first extended contact over the virtual keyboard;
in accordance with a determination that the first extended contact is over any of the respective displayed representations of the other keys, interpret the first extended contact as a keyboard input and activating a corresponding extended keyboard function; and
detect a second extended contact over the virtual keyboard; and
in accordance with a determination that the second extended contact is over a respective displayed representation of the spacebar key:
interpret the second extended contact as a mode-switching input that causes the electronic device to operate at least a portion of the touch-sensitive display as a trackpad; and
change a visual appearance of the virtual keyboard from a virtual keyboard appearance to a trackpad appearance; and
maintain the trackpad appearance for at least a predetermined amount of time after detecting a lift-off of the second extended contact from the touch-sensitive display, wherein the predetermined amount of time is a non-zero amount of time.

23. The non-transitory computer-readable storage medium of claim 22, wherein the mode-switching input causes the electronic device to operate all of the touch-sensitive display as a trackpad.

24. The non-transitory computer-readable storage medium of claim 23, wherein:
while operating all of the touch-sensitive display as the trackpad, any input at the touch-sensitive display controls movement of a cursor that is displayed on the touch-sensitive display, and
a swipe gesture that moves across the touch-sensitive display causes the cursor that is displayed on the touch-sensitive display to be moved in accordance with movement of the swipe gesture, the swipe gesture including upward and/or downward movement.

25. The non-transitory computer-readable storage medium of claim 22, wherein the extended contact is a long press that remains in a stationary position over the respective displayed representation of the spacebar key.

26. An electronic device, comprising:
one or more processors;
a touch-sensitive display; and
memory storing one or more programs that are configured for execution by the one or more processors, wherein the electronic device is not coupled with any force sensors, and wherein the one or more programs include instructions for:
displaying a virtual keyboard on the touch-sensitive display, the virtual keyboard including displayed representations of a spacebar key and other keys;
detecting a first extended contact over the virtual keyboard;
in accordance with a determination that the first extended contact is over any of the respective displayed representations of the other keys, interpreting the first extended contact as a keyboard input and activating a corresponding extended keyboard function; and
detecting a second extended contact over the virtual keyboard; and
in accordance with a determination that the second extended contact is over a respective displayed representation of the spacebar key:
interpreting the second extended contact as a mode-switching input that causes the electronic device to operate at least a portion of the touch-sensitive display as a trackpad; and
changing a visual appearance of the virtual keyboard from a virtual keyboard appearance to a trackpad appearance; and
maintaining the trackpad appearance for at least a predetermined amount of time after detecting a lift-off of the second extended contact from the touch-sensitive display, wherein the predetermined amount of time is a non-zero amount of time.

27. The electronic device of claim 26, wherein the mode-switching input causes the electronic device to operate all of the touch-sensitive display as a trackpad.

28. The electronic device of claim 26, wherein:
while operating all of the touch-sensitive display as the trackpad, any input at the touch-sensitive display controls movement of a cursor that is displayed on the touch-sensitive display, and
a swipe gesture that moves across the touch-sensitive display causes the cursor that is displayed on the touch-sensitive display to be moved in accordance with movement of the swipe gesture, the swipe gesture including upward and/or downward movement.

29. The electronic device of claim 26, wherein the extended contact is a long press that remains in a stationary position over the respective displayed representation of the spacebar key.

* * * * *